(12) United States Patent
Geerligs et al.

(10) Patent No.: US 11,874,149 B2
(45) Date of Patent: Jan. 16, 2024

(54) IRRIGATION FLOW SENSOR SYSTEMS AND METHODS OF DETECTING IRRIGATION FLOW

(71) Applicant: Rain Bird Corporation, Azusa, CA (US)

(72) Inventors: Steven D. Geerligs, Tucson, AZ (US); Russell Churchill, Phoenix, AZ (US); Randy R. Montgomery, Tucson, AZ (US); Chong Wang Kwak, Tucson, AZ (US); Joseph G. Porrazzo, Jr., Sahuarita, AZ (US); Michael A. Landis, Gilbert, AZ (US); Angel Reyes Archundia, Tijuana (MX)

(73) Assignee: Rain Bird Corporation, Azusa, CA (US)

(*) Notice: Subject to any disclaimer, the term of this patent is extended or adjusted under 35 U.S.C. 154(b) by 243 days.

(21) Appl. No.: 17/242,253

(22) Filed: Apr. 27, 2021

(65) Prior Publication Data

US 2021/0333135 A1     Oct. 28, 2021

Related U.S. Application Data

(60) Provisional application No. 63/161,127, filed on Mar. 15, 2021, provisional application No. 63/016,159, filed on Apr. 27, 2020.

(51) Int. Cl.
*G01F 1/115*     (2006.01)
*A01G 25/16*    (2006.01)
*G01F 15/06*    (2022.01)

(52) U.S. Cl.
CPC ............ *G01F 1/1155* (2013.01); *A01G 25/16* (2013.01); *G01F 15/066* (2013.01)

(58) Field of Classification Search
CPC ...... G01F 1/1155; G01F 15/066; A01G 25/16
(Continued)

(56) References Cited

U.S. PATENT DOCUMENTS 4,101,874 A * 7/1978 Denison .................. G01F 1/075
                                                                116/274
4,980,825 A * 12/1990 Tootell ..................... G01F 1/125
                                                                 702/83

(Continued)

OTHER PUBLICATIONS

Asahi Kasei Microdevcies Corporation; "AK8776 Hall IC for Pulse Encoder"; MS1317-E-00;Jul. 2011; pp. 1-11.
(Continued)

*Primary Examiner* — Nathaniel T Woodward
(74) *Attorney, Agent, or Firm* — Fitch, Even, Tabin & Flannery LLP

(57) ABSTRACT

Some embodiments provide an irrigation flow sensor system, comprising: a housing forming a fluid channel to cooperate with conduits of an irrigation system; a paddle wheel device with at least a first blade of a set of the blades comprises a magnetic element; the paddle wheel device is positioned with at least a portion of the blades extends into the fluid channel as the blades rotate about an axis; a magnetic sensor proximate a pathway of the magnetic element as it rotates configured to provide a sensor output every time the magnetic element passes the magnetic sensor; a switch coupled to the magnetic sensor and a current loop, wherein the switch in an activate state is configured to temporarily change the current in the current loop in response to the sensor output, with a rate of change in current corresponding to a flow rate of the fluid flowing.

29 Claims, 36 Drawing Sheets

(58) Field of Classification Search
USPC ...................................................... 73/861.94
See application file for complete search history.

(56) References Cited

U.S. PATENT DOCUMENTS

| | | | |
|---|---|---|---|
| 5,779,911 A * | 7/1998 | Haug | B01D 61/12 |
| | | | 210/85 |
| 5,970,801 A | 10/1999 | Ciobanu | |
| 6,079,263 A | 6/2000 | Beddies | |
| 6,106,705 A | 8/2000 | Giordano | |
| 6,216,727 B1 | 4/2001 | Genova | |
| 6,240,950 B1 | 6/2001 | Harris | |
| 6,250,151 B1 | 6/2001 | Tingleff | |
| 6,284,129 B1 | 9/2001 | Giordano | |
| 6,336,361 B1 | 1/2002 | Uramachi | |
| 6,345,541 B1 | 2/2002 | Hendey | |
| 6,502,602 B1 | 1/2003 | Stroup | |
| 6,513,375 B2 | 2/2003 | Uramachi | |
| 6,517,707 B2 | 2/2003 | Giordano | |
| 6,539,814 B1 | 4/2003 | Popp | |
| 6,591,694 B2 | 7/2003 | Tsai | |
| 6,634,237 B2 | 10/2003 | Neubert | |
| 6,648,240 B2 | 11/2003 | Simmons | |
| 6,691,924 B1 | 2/2004 | Vestergaard | |
| 6,705,489 B2 | 3/2004 | Henry | |
| 6,729,182 B2 | 5/2004 | Uramachi | |
| 6,758,104 B2 | 7/2004 | Leys | |
| 6,766,835 B1 | 7/2004 | Fima | |
| 6,832,625 B2 | 12/2004 | Ford | |
| 6,845,886 B2 | 1/2005 | Henry | |
| 6,895,995 B2 | 5/2005 | Kirkman | |
| 6,926,821 B2 | 8/2005 | Giordano | |
| 6,959,611 B2 | 11/2005 | Schehl | |
| 6,968,856 B1 | 11/2005 | Goza | |
| 6,973,705 B2 | 12/2005 | Leys | |
| 7,069,944 B2 | 7/2006 | Morikawa | |
| 7,290,680 B2 | 11/2007 | Henry | |
| 7,322,231 B2 | 1/2008 | Trygg | |
| 7,395,708 B2 | 7/2008 | Kirchner | |
| 7,444,886 B2 | 11/2008 | Furkert | |
| 7,549,348 B2 | 6/2009 | Brown | |
| 7,549,439 B2 | 6/2009 | Kimura | |
| 7,637,152 B2 | 12/2009 | Ushigusa | |
| 7,669,594 B2 | 3/2010 | Downie | |
| 7,693,606 B2 | 4/2010 | Ahmad | |
| 8,104,340 B2 | 1/2012 | Speldrich | |
| 8,172,200 B2 | 5/2012 | Kroemmer | |
| 8,205,508 B2 | 6/2012 | Healey | |
| 8,205,632 B2 | 6/2012 | Fishwick | |
| 8,256,304 B2 | 9/2012 | Therrian | |
| 8,353,221 B2 | 1/2013 | Schmid | |
| 8,439,068 B2 | 5/2013 | Croibier | |
| 8,464,582 B2 | 6/2013 | Roux | |
| 8,511,338 B2 | 8/2013 | Karihara | |
| 8,517,051 B2 | 8/2013 | Fazekas | |
| 8,587,441 B2 | 11/2013 | Laubach | |
| 8,590,395 B2 | 11/2013 | Ge | |
| 8,607,645 B2 | 12/2013 | Laubach | |
| 8,640,522 B2 | 2/2014 | Royse | |
| 8,662,005 B2 | 3/2014 | Chen | |
| 8,690,117 B2 | 4/2014 | Dunn | |
| 8,733,155 B2 | 5/2014 | Hill | |
| 8,800,473 B1 | 8/2014 | Deverse | |
| 8,834,134 B2 | 9/2014 | Baker | |
| 8,866,634 B2 | 10/2014 | Williamson | |
| 8,910,887 B2 | 12/2014 | Helmsderfer | |
| 8,918,293 B2 | 12/2014 | Carmichael | |
| 9,010,360 B1 | 4/2015 | Older | |
| 9,032,998 B2 | 5/2015 | O'Brien | |
| 9,079,053 B2 | 7/2015 | Karihara | |
| 9,086,305 B2 | 7/2015 | Nelson | |
| 9,120,116 B2 | 9/2015 | Gorman | |
| 9,140,255 B2 | 9/2015 | Wetherill | |
| 9,140,377 B2 | 9/2015 | Becker | |
| 9,157,540 B2 | 10/2015 | Larsen | |
| 9,222,490 B2 | 12/2015 | Fishwick | |
| 9,258,952 B2 | 2/2016 | Walker | |
| 9,275,536 B2 | 3/2016 | Wetherill | |
| 9,297,150 B2 | 3/2016 | Klicpera | |
| 9,353,757 B2 | 5/2016 | Jones | |
| 9,410,636 B2 | 8/2016 | Older | |
| 9,435,682 B2 | 9/2016 | Royse | |
| 9,476,517 B2 | 10/2016 | Gomes, II | |
| 9,494,480 B2 | 11/2016 | Klicpera | |
| 9,506,785 B2 | 11/2016 | Turk | |
| 9,527,102 B2 | 12/2016 | Hill | |
| 9,574,923 B2 | 2/2017 | Williamson | |
| 9,581,474 B2 | 2/2017 | Alekseyev | |
| 9,597,699 B2 | 3/2017 | Helmsderfer | |
| 9,724,708 B2 | 8/2017 | Helmsderfer | |
| 9,749,792 B2 | 8/2017 | Klicpera | |
| 9,778,081 B2 | 10/2017 | Neilson | |
| 9,832,939 B2 | 12/2017 | Russell | |
| 9,847,265 B2 | 12/2017 | Donner | |
| 9,857,805 B2 | 1/2018 | Halimi | |
| 9,955,636 B2 | 5/2018 | Wherley | |
| 10,039,240 B2 | 8/2018 | Darnold | |
| 10,060,774 B1 | 8/2018 | Bartlett | |
| 10,119,537 B2 | 11/2018 | Wetherill | |
| 10,172,989 B2 | 1/2019 | Giordano | |
| 10,203,232 B2 | 2/2019 | Neilson | |
| 10,209,108 B2 | 2/2019 | Alekseyev | |
| 10,219,733 B2 | 3/2019 | Shimokawa | |
| 10,234,048 B2 | 3/2019 | Korten | |
| 10,267,663 B2 | 4/2019 | Skelding | |
| 10,280,909 B2 | 5/2019 | Jones | |
| 10,302,454 B2 | 5/2019 | Mackie | |
| 10,309,811 B2 | 6/2019 | Kalvoda | |
| 10,330,507 B2 | 6/2019 | Winter | |
| 10,357,750 B2 | 7/2019 | Carbone, II | |
| 10,410,501 B2 | 9/2019 | Klicpera | |
| 10,422,669 B2 | 9/2019 | Da Pont | |
| 10,422,670 B2 | 9/2019 | Mohr | |
| 10,422,671 B2 | 9/2019 | Sankaran | |
| 10,468,868 B2 | 11/2019 | Stepp | |
| 10,512,227 B2 | 12/2019 | Rainone | |
| 10,525,487 B2 | 1/2020 | Helmsderfer | |
| 10,527,516 B2 | 1/2020 | Banerjee | |
| 10,561,078 B2 | 2/2020 | Darnold | |
| 10,564,014 B2 | 2/2020 | Robinson | |
| 10,571,937 B1 | 2/2020 | Hurst | |
| 10,625,008 B2 | 4/2020 | Giordano | |
| 10,634,529 B2 | 4/2020 | Paris | |
| 10,634,538 B2 | 4/2020 | Allen | |
| 10,648,842 B2 | 5/2020 | Croteau | |
| 10,662,907 B2 | 5/2020 | Dirnberger | |
| 10,663,984 B2 | 5/2020 | Kilcran | |
| 10,704,946 B2 | 7/2020 | Seehoffer | |
| 10,712,221 B2 | 7/2020 | Cimberio | |
| 10,751,680 B2 | 8/2020 | Carbone, II | |
| 10,768,030 B1 | 9/2020 | Chang | |
| 10,798,886 B2 | 10/2020 | Russell | |
| 10,809,106 B2 | 10/2020 | Stuyvenberg | |
| 10,832,512 B2 | 11/2020 | Savaëte | |
| 10,852,173 B2 | 12/2020 | Gottlieb | |
| 10,866,601 B2 | 12/2020 | Halimi | |
| 10,934,992 B2 | 3/2021 | Kuroishi | |
| 11,513,025 B1 | 11/2022 | Warsowe | |
| 2009/0309755 A1 | 12/2009 | Williamson | |
| 2012/0239211 A1* | 9/2012 | Walker | A01G 25/16 |
| | | | 700/284 |
| 2016/0037736 A1 | 2/2016 | Rainone | |
| 2016/0113220 A1 | 4/2016 | Walker | |
| 2016/0163177 A1 | 6/2016 | Klicpera | |
| 2016/0197467 A1 | 7/2016 | Stepp | |
| 2016/0219805 A1 | 8/2016 | Romney | |
| 2016/0377464 A1* | 12/2016 | Adlon | G01F 1/075 |
| | | | 73/861.08 |
| 2017/0020088 A1* | 1/2017 | Wherley | A01G 25/16 |
| 2017/0061727 A1 | 3/2017 | Savaëte | |
| 2017/0259226 A1 | 9/2017 | Bayer | |
| 2017/0318761 A1 | 11/2017 | Rainone | |
| 2017/0370754 A1 | 12/2017 | Croteau | |
| 2018/0136673 A1 | 5/2018 | Halimi | |

(56) References Cited

U.S. PATENT DOCUMENTS

| | | |
|---|---|---|
| 2018/0220600 A1 | 8/2018 | Russell |
| 2018/0259982 A1 | 9/2018 | Halimi |
| 2018/0338435 A1 | 11/2018 | Darnold |
| 2019/0101421 A1 | 4/2019 | Sankaran |
| 2019/0120671 A1 | 4/2019 | Allen |
| 2019/0136492 A1 | 5/2019 | Trescott |
| 2019/0211941 A1 | 7/2019 | Korten |
| 2019/0231244 A1 | 8/2019 | Swan |
| 2019/0234786 A1 | 8/2019 | Klicpera |
| 2019/0271575 A1 | 9/2019 | Winter |
| 2019/0277672 A1 | 9/2019 | Van Beurden |
| 2019/0281371 A1 | 9/2019 | Klicpera |
| 2019/0297797 A1 | 10/2019 | Nickerson |
| 2019/0388719 A1 | 12/2019 | Meyer |
| 2020/0015438 A1 | 1/2020 | Klicpera |
| 2020/0016311 A1 | 1/2020 | Giordano |
| 2020/0032494 A1 | 1/2020 | Trescott |
| 2020/0093077 A1 | 3/2020 | Darnold |
| 2020/0157784 A1 | 5/2020 | Trescott |
| 2020/0191633 A1 | 6/2020 | Gottlieb |
| 2020/0271500 A1 | 8/2020 | Croteau |
| 2020/0284638 A1 | 9/2020 | Seehoffer |
| 2021/0400674 A1 | 12/2021 | Hickenlooper |

OTHER PUBLICATIONS

Creative Sensor Technology; "Creative Sensor Technology"; <https://www.creativesensortechnology.com/>; Aug. 11, 2020; pp. 1-2; retrieved from Internet Archive Wayback Machine <http://web.archive.org/web/20200811152704/https://www.creativesensortechnology.com/> on Jul. 27, 2021.

Creative Sensor Technology; "Elf Series Flow Sensor"; <https://www.creativesensortechnology.com/copy-of-pct-120>; Aug. 11, 2020; pp. 1-2; retrieved from Internet Archive Wayback Machine <http://web.archive.org/web/20200811152323/https://www.creativesensortechnology.com/copy-of-pct-120> on Jul. 27, 2021.

* cited by examiner

IRRIGATION FLOW SENSOR SYSTEMS AND METHODS OF DETECTING IRRIGATION FLOW

CROSS-REFERENCE TO RELATED APPLICATIONS

This application claims the benefit of: U.S. Provisional Application No. 63/016,159 filed Apr. 27, 2020, and U.S. Provisional Application No. 63/161,127 filed Mar. 15, 2021, each of which is incorporated herein by reference in its entirety.

BACKGROUND

1. Field of the Invention

The present invention relates generally to determining flow rates within irrigation systems.

2. Discussion of the Related Art

Many types of irrigation systems enable automated irrigation of plant life. With some plant life and/or in some geographic regions irrigating can be costly. The amount of water applied to the plant life can be critical. Accordingly, some systems utilize sensor data to aid in controlling the irrigation system and/or the quantity of water applied.

BRIEF SUMMARY OF THE INVENTION

Several embodiments of the invention advantageously address the needs above as well as other needs by providing a system to determine and track water flow in a conduit, which can be used in controlling irrigation. Some embodiments provide an irrigation flow sensor system, comprising: a housing secured with and/or forming at least a portion of a fluid channel. The fluid channel comprises a first port and a second port and is configured to transport fluid between the first port and the second port, wherein the first port is configured to couple with a first conduit of a fluid path, and the second port is configured to couple with a second conduit of the fluid path of an irrigation system to transport water to irrigation distribution devices configured to distribute water over a geographic area; a paddle wheel device comprising a set of blades configured to rotate about an axis due to a fluid flowing through the fluid channel, wherein at least a first blade of the set of the blades comprises a magnetic element, and wherein the paddle wheel device is positioned relative to the fluid channel such that at least a portion of each of the blades sequentially extend into the fluid channel as the blades rotate about the axis; a magnetic sensor within a sealed portion of the housing outside of the fluid channel and proximate to a pathway of the magnetic element as the magnetic element and blades rotate about the axis, wherein the magnetic sensor is configured to provide a sensor output at a first state every time the magnetic element passes the magnetic sensor; a switch coupled to the magnetic sensor, wherein the switch is coupled to a current loop, wherein the switch in an active state is configured to temporarily change the current in the current loop to a first current flow value in response to the sensor output from the magnetic sensor being in the first state such that the current loop varies between a second current flow value when the switch is not active in a non-active state and the first current flow value when the switch is in the active state based on the first state of the sensor output from the magnetic sensor, wherein a frequency of the transitions between the second current flow value and the first current flow value correspond to a flow rate of the fluid flowing through the flow conduit.

Additionally, some embodiments provide methods of obtaining a rate of fluid flow through an irrigation conduit, comprising: detecting, by a magnetic sensor positioned within a sealed portion of a housing of an irrigation flow sensor system and proximate blades of a paddle wheel device of the irrigation flow sensor system while not being exposed to a fluid passing through a fluid channel secured with and/or formed in the housing and into which at least a portion of each of the blades of the paddle wheel device sequentially extend as the blades rotate about an axis in response to the irrigation fluid flowing through the fluid channel of the irrigation flow sensor system, a magnetic element cooperated with a first blade of the blades of the paddle wheel device as the magnetic element moves along a circular pathway as the magnetic element rotates about the axis; and controlling a switch coupled with the magnetic sensor and a current loop to control current within the current loop comprising: receiving a sensor output from the magnetic sensor at the switch; and causing the switch to transition between a non-active state and an active state to temporarily change the current to a first current flow value through the current loop in response to the pulse a change to a first state of the sensor output from the magnetic sensor and causing the current in the current loop to vary between a second current flow value when the switch is not active in the non-active state and the first current flow value when the switch is in the active state based on the first state of the sensor output form the magnetic sensor, wherein a frequency of the transitions between the second current flow value and the first current flow value correspond to a flow rate of the fluid flowing through the flow conduit.

Some embodiments provide an irrigation system, comprising: an irrigation controller comprising a plurality of drive circuits and a control circuit coupled with the drive circuits to control the activation of the drive circuits; a plurality of valves communicatively coupled with one of the plurality of drive circuits and controlled by the activation of the corresponding one of the drive circuits, wherein each of the plurality of valves is cooperated with one of multiple different fluid conduits through which water passes; a plurality of irrigation distribution devices fluidly cooperated with one of the plurality of fluid conduits and configured to distribute water over a corresponding portion of a geographic area to be irrigated; and an irrigation flow sensor system comprising: a housing forming at least a portion of a fluid channel configured to cooperate between two of the plurality of fluid conduits and to transport fluid between a first port and a second port; a paddle wheel device comprising a set of blades configured to rotate about an axis due to the water flowing through the fluid channel, wherein at least a first blade of the set of the blades comprises a magnetic element, and wherein the paddle wheel device is positioned relative to the fluid channel such that at least a portion of each of the blades sequentially extend into the fluid channel as the blades rotate about the axis; a magnetic sensor within a sealed portion of the housing outside of the fluid channel and proximate to a pathway of the magnetic element as the magnetic element and blades rotate about the axis, wherein the magnetic sensor is configured to provide a sensor output at a first state every time the magnetic element passes the magnetic sensor; and a switch coupled to the magnetic sensor, wherein the switch is coupled to a current loop, wherein the switch in an active state is configured to temporarily change the current to a first current flow value in the current loop in response to the sensor output from the magnetic sensor being in the first state such that the current loop varies between a second current flow value when the switch is not active in a non-active state and first current flow value when the switch is in the active state based on the first state of the sensor output from the magnetic sensor, wherein a frequency of the transitions between the first current flow value and the second current flow value correspond to a flow rate of the water flowing through the flow conduit; wherein the control circuit is configured to determine the flow rate of the water through the fluid channel as a function of the frequency of the transitions between the first current flow value and the second current flow value, and adjust an irrigation schedule based on of the flow rate of the water.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
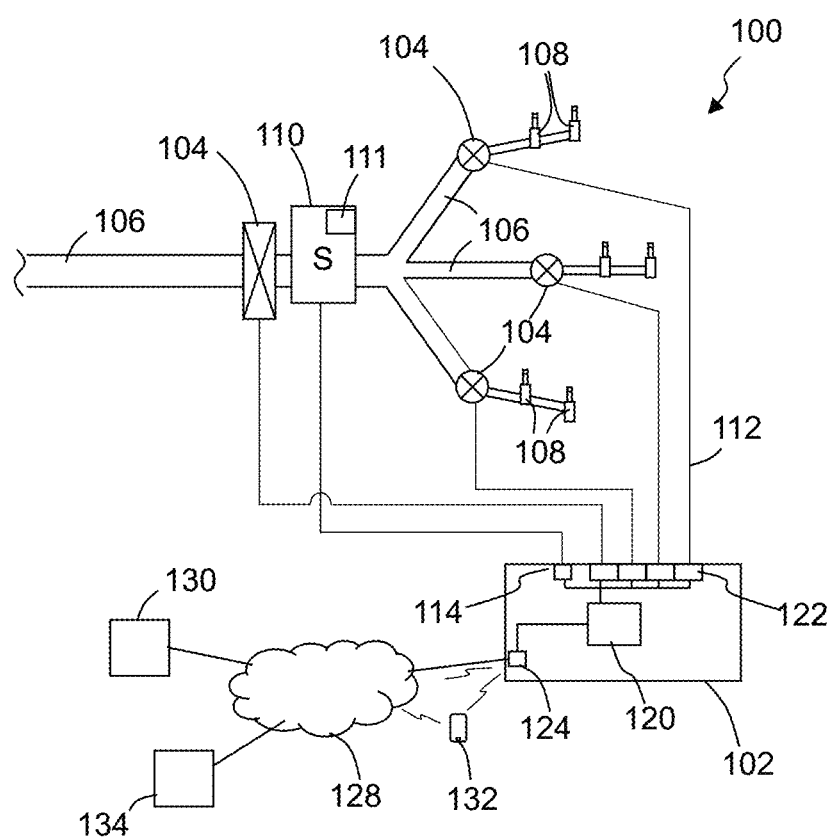
FIG. 1 shows a simplified block diagram of the exemplary irrigation system, in accordance with some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Generally speaking, pursuant to various embodiments, systems, apparatuses and methods are provided herein useful to in controlling irrigation based on water flow within one or more irrigation pipes, conduits, tubes, and the like. Irrigation systems can include one or more flow sensors to provide flow data to one or more irrigation control devices that can utilize the flow data in determining whether to make adjustments and/or what adjustments to make in controlling irrigation, as well as shutdown the irrigation system in the event an unintended irrigation event is occurring, detect damage to the irrigation system and/or other benefits.

Some embodiments provide one or more irrigation flow sensor system, comprising: a housing forming at least a portion of a fluid channel configured to transport fluid between a first port and a second port, wherein the first port is configured to couple with a first conduit of a fluid path, and the second port is configured to couple with a second conduit of the fluid path of an irrigation system to transport water to irrigation distribution devices configured to distribute water over a geographic area; a paddle wheel device comprising a set of blades configured to rotate about an axis due to a fluid flowing through the fluid channel, wherein at least a first blade of the set of the blades comprises a magnetic element, and wherein the paddle wheel device is positioned relative to the fluid channel such that at least a portion the blades extend into the fluid channel as the blades rotate about the axis; a magnetic sensor within a sealed portion of the housing outside of the fluid channel and proximate to a pathway of the magnetic element as the magnetic element rotates about the axis, wherein the magnetic sensor is configured to provide a sensor output at a first state every time the magnetic element passes the magnetic sensor; a switch coupled to the magnetic sensor, wherein the switch is coupled to a current loop, wherein the switch in an active state is configured to temporarily change the current to a first current flow value in the current loop in response to the sensor output from the magnetic sensor being in the first state such that the current loop varies between a second current flow value when the switch is not active in a non-active state and the first current flow value when the switch is in the active state based on the first state of the sensor output from the magnetic sensor, wherein a frequency of the transitions between the second current flow value and the first current flow value correspond to a flow rate of the fluid flowing through the flow conduit.

Further, some embodiments provide methods of obtaining a rate of fluid flow through an irrigation conduit, comprising: detecting, by a magnetic sensor positioned within a sealed portion of a housing of an irrigation flow sensor system and proximate blades of a paddle wheel device of the irrigation flow sensor system while not being exposed to a fluid passing through a fluid channel formed in the housing and into which at least a portion of each of the blades of the paddle wheel device extend as the blades rotate about an axis in response to the irrigation fluid flowing through the fluid channel of the irrigation flow sensor system, a magnetic element cooperated with a first blade of the blades of the paddle wheel device as the magnetic element moves along a rotational or circular pathway as the magnetic element rotates about the axis; controlling a switch coupled with the magnetic sensor and a current loop to control current within the current loop comprising: receiving at the switch a sensor output from the magnetic sensor; causing the switch to transition between a non-active state and an active state to temporarily change the current to a first current flow value through the current loop in response to a change to a first state of the sensor output from the magnetic sensor and causing the current in the current loop to vary between a second current flow value when the switch is not active in the non-active state and the first current flow value when the switch is in the active state based on the first state of the sensor output from the magnetic sensor, wherein a frequency of the transitions between the second current flow value and the first current flow value correspond to a flow rate of the fluid flowing through the flow conduit.

FIG. 1 shows a simplified block diagram of the exemplary irrigation system 100, in accordance with some embodiments. The irrigation system 100 includes one or more irrigation controllers 102, control modules or other such control devices that electrically and/or communicatively couple with one or more valves 104 cooperated with irrigation conduit 106, pipes or the like that are configured to carry water, nutrients and/or other such fluids from one or more water sources (not shown) to one or more water distribution devices 108 (e.g., sprinklers, drip lines, etc.), in accordance with some embodiments. Each of the one or more irrigation controllers 102 couple with one or more irrigation valves 104 over controller output or activation lines 112, each coupled to a valve controller cooperated with at least one corresponding valve, which are often located in the region to be irrigated, an electrical switch to activate or deactivate other irrigation devices (e.g., pumps, drain systems, etc.) and/or non-irrigation devices (e.g., lighting or other devices) controlled by the irrigation controller 102. Each valve 104 can be cooperated with one or more irrigation conduits 106 to control the flow of water to one or more water distribution devices 108 (e.g., sprinkler devices, drip lines and/or other irrigation devices).

The irrigation controller is configured to control the one or more valves 104 in controlling the flow of water through the irrigation system in implementing and controlling irrigation to plant life within one or more irrigation areas. Typically, the irrigation controller controls the valves 104 in accordance with one or more irrigation schedules. In some embodiments, the irrigation controller 102 includes one or more control circuits 120 that couple with one or more drive circuits 122 and control the activation of the drive circuits. The plurality of valves 104 can be communicatively coupled with at least one of the plurality of drive circuits and controlled by the activation of the corresponding one of the drive circuits. Again, each of the plurality of valves is typically cooperated with one of multiple different fluid conduits 106 through which water passes, with the plurality of irrigation distribution devices 108 fluidly cooperated with one of the plurality of fluid conduits. The irrigation distribution devices are configured to distribute water over a corresponding portion of an area to be irrigated.

The irrigation system further includes one or more flow sensor systems 110 communicatively coupled via wired and/or wireless communication with the irrigation controller 102. The flow sensor is configured to detect the flow of the water through the conduit 106 and communicate flow data to the irrigation controller 102 for use in controlling the irrigation over the irrigation area. In some embodiments, the irrigation controller 102 is configured to control of irrigation based on water flow data, which in some instances may include modifying or interrupting execution of one or more watering schedules according to several embodiments. The irrigation system further includes at least one water flow sensor system 110 that communicatively couples with the separate irrigation controller 102. The flow sensor system 110 includes at least one flow indicator output/input configured to communicatively couple with the separate irrigation controller 102. It is noted that the above and below are described with reference to the flow sensor system 110 coupling with an irrigation controller. It will be appreciated, however, that the flow sensor system can, in some embodiments, operate with other system controllers. These other system controllers may house or facility management system controllers that control other systems (e.g., heating, air conditioning, fountain, gate, lighting, etc.) in addition to irrigation. Typically, the irrigation controller operates local at the site where water flow is being monitored and/or irrigation is being controlled. In other implementations, however, the irrigation controller may partially or fully be remote from the flow sensor system. Accordingly, the flow sensor system is not limited to operate with an irrigation controller, but instead can operate with other types of control systems, including other types of non-irrigation controllers that are concerned with flow along a conduit, pipe, duct, or the like. FIG. 1 shows a single flow sensor system 110. It is noted, however, that the irrigation system can include any relevant number of flow sensors. Typically, a single flow sensor system is cooperated with a conduit. In some implementations, however, more than one flow sensor can be cooperated with a single conduit. This may be advantageous for long conduits and/or conduits having numerous irrigation distribution devices 108 and/or sub-branches of additional conduits along a length of the conduit.

In some implementations, the flow sensor system 110 provides a hardwire coupling with the irrigation controller 102. In other embodiments, the flow sensor system includes one or more wireless transmitters and/or wireless transceivers 111 that at least wirelessly transmit data to the irrigation controller. The flow sensor system 110 may include one or more transmitters and/or transceivers configured to wired and/or wirelessly communicate with the irrigation controller 102, a user's separate smartphone, tablet, etc., and/or other devices via wired and/or wireless communication and/or computer networks. In some embodiments, the flow sensor system 110 is connected to one of one or more irrigation controller interfaces 114 (e.g., flow sensor input, a rain sensor input, etc.) of the irrigation controller 102.

Further, the irrigation controller 102, in some embodiments, may include one or more wired and/or wireless transceivers 124. The transceiver 124 can allow the irrigation controller 102 to wired and/or wirelessly communicate over one or more computer and/or communications networks 128 with external components, such as but not limited to one or more central irrigation controllers 130, one or more user computing devices 132 (e.g., smart phone, tablet, computer, laptop, etc.), one or more sensors local at the irrigation site where the irrigation system 100 is implemented, a weather service server 134, other third party servers, other such components, or a combination of two or more of such components.

Figure 2:
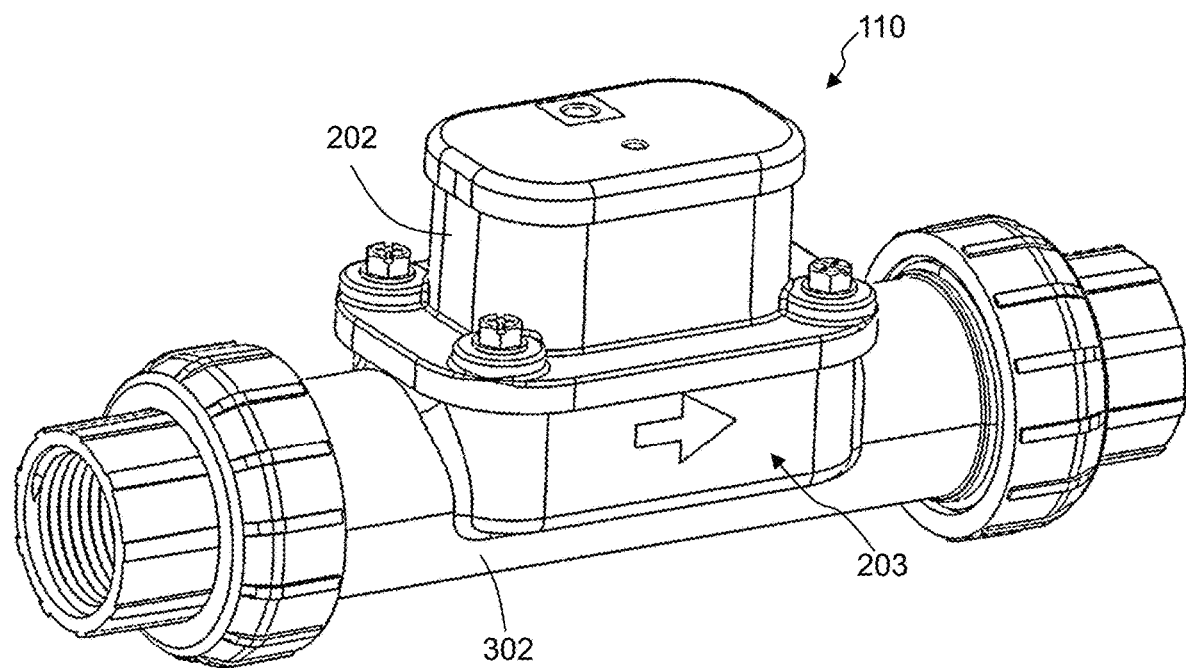
FIG. 2 illustrates a simplified block diagram of an exemplary flow sensor system, in accordance with some embodiments.
Figure 3A:
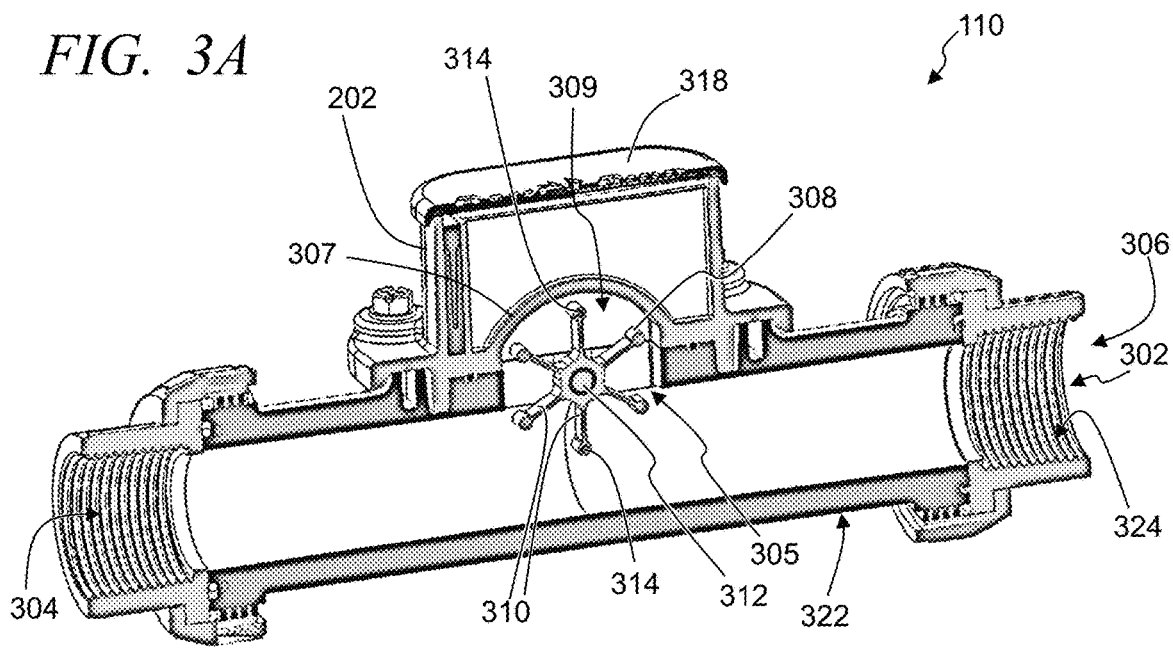
FIGS. 3A-3B illustrate simplified cross-sectional views of exemplary flow sensor systems of FIG. 2, in accordance with some embodiments.
Figure 3B:
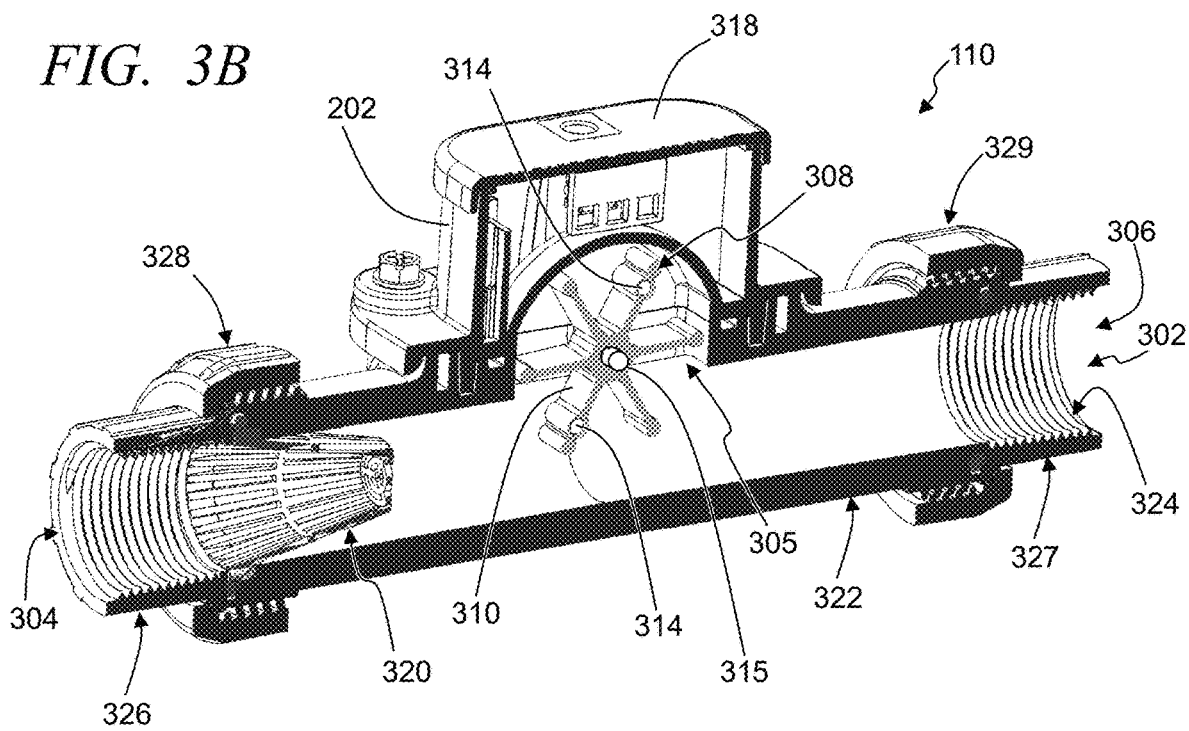

FIG. 2 illustrates a simplified block diagram of an exemplary flow sensor system 110 in accordance with some embodiments. FIG. 3A illustrates a simplified cross-sectional view of an exemplary flow sensor system 110 of FIG. 2, in accordance with some embodiments. FIG. 3B illustrates a simplified cross-sectional view of an alternative exemplary flow sensor system 110 of FIG. 2, in accordance with some other embodiments. Referring to FIGS. 1-3B, the irrigation flow sensor system 110 includes a housing 202 that is secured with a paddle wheel mounting area 203 secured with and/or formed as part of the fluid channel 302 (e.g., screws, bolts, nuts, rivets, epoxy, melt-boding, heat sealing, snap-and-fit, friction, other such methods, or combination of two or more methods), and/or a portion of the housing is formed as part of the fluid channel 302. In some implementations, the housing can define and/or form at least a portion of the fluid channel 302. The fluid channel is configured to transport fluid between a first port 304 and a second port 306. The first port 304 is configured to couple with a first conduit 106 of a fluid path, and the second port 306 is configured to couple with a second conduit 106 of the fluid path of an irrigation system to transport water to irrigation distribution devices 108 that are each configured to distribute water over one or more geographic areas.

Figure 4A:
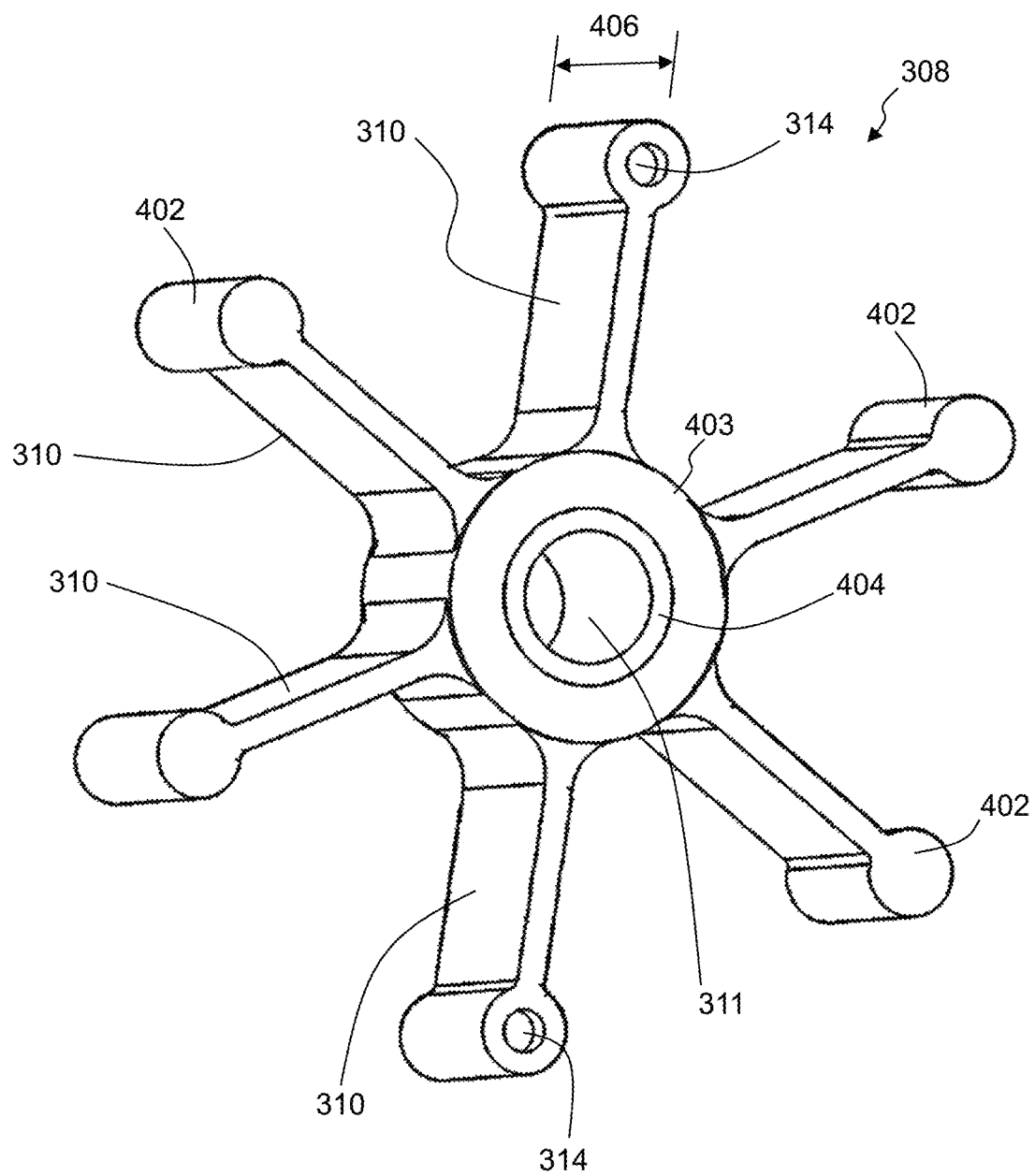
FIG. 4A illustrates a simplified representation of a paddle wheel device, in accordance with some embodiments.

The flow sensor system 110 further includes a paddle wheel device 308 or other rotational device positioned to be rotated in response to a flow of fluid through the fluid channel 302. In some embodiments, the housing includes a paddle wheel wall 307 that forms a paddle wheel cavity 309 within which the paddle wheel device 308 is positioned and exposes at least a portion of one or more of the blades to the fluid flow through the fluid channel 302. Further, the paddle wheel cavity 309, in some embodiments, is fluidly cooperated with and/or defines part of the fluid channel 302 exposing at least a portion of the paddle wheel to the fluid within the fluid channel 302. In some embodiments, the fluid channel 302 includes a paddle wheel aperture 305 formed in the wall of the fluid channel 302 and is aligned with and configured to cooperate with a portion of the paddle wheel wall 307 to form at least part of the paddle wheel cavity 309. The paddle wheel aperture 305 is formed, in some embodiments, with aperture walls extending away from a conduit portion 322 of the fluid channel 302. The aperture walls can be configured to align with and cooperate with paddle wheel wall 307 and/or a bottom portion of the housing 202. One or more fluid seals, O-rings, gaskets and/or other structures can be utilized to fluidly seal the housing with the fluid channel 302. FIG. 4A illustrates a simplified representation of an exemplary paddle wheel device 308 in accordance with some embodiments. Referring to FIGS. 1-4A, in some embodiments, the paddle wheel device 308 includes a set of two or more blades 310, paddles, propellers, other such structures or combination of two or more of such structures. The set of blades are configured to rotate about a rotational axis of the paddle wheel device 308 in response to a fluid flowing through the fluid channel 302. The paddle wheel device 308 can be constructed from one or more ceramics, metals, plastics, polyvinyl chloride (PVC), polypropylene (PP), glass and/or fiberglass filled or infused PP (e.g., 16% glass filled PP), other plastic, fiberglass infused plastic, other materials, or a combination of two or more of such materials.

In the embodiment illustrated in FIG. 4A, the paddle wheel device 308 includes a central bore 311, channel, hole or other such cavity through which an axle 312, shaft, rod, pin or the like can be positioned to extend through the central bore 311 and be exposed on opposite sides of the paddle wheel device enabling the paddle wheel device to be cooperated with the housing 202 and/or conduit portion 322 of the flow sensor system. The axle 312 allows the paddle wheel device 308 to rotate about the axle, which is typically aligned with the rotational axis. Some embodiments further include one or more central bore bushings 404, bearings or the like through which the axle 312 can extend and cooperate. The central bore bushing 404 is configured to reduce friction and enhance or otherwise improve the ease of rotation of the paddle wheel device. The bushings and/or the axle can be implemented through one or more materials, such as but not limited to, ceramics, metals, plastics, coated with Polytetrafluoroethylene (PTFE), PVC, polypropylene (PP), glass and/or fiberglass filled or infused PP (e.g., 16% glass filled PP), other plastic, fiberglass infused plastic, other such materials, or a combination of two or more of such materials. In some embodiments, the use of a bushing formed from a ceramic has been found to resist shavings from etching away from the bushing in a gritty fluid environment, such shavings potentially increasing the likelihood of causing the paddle wheel to get stuck or experience limited movement.

Figure 4B:
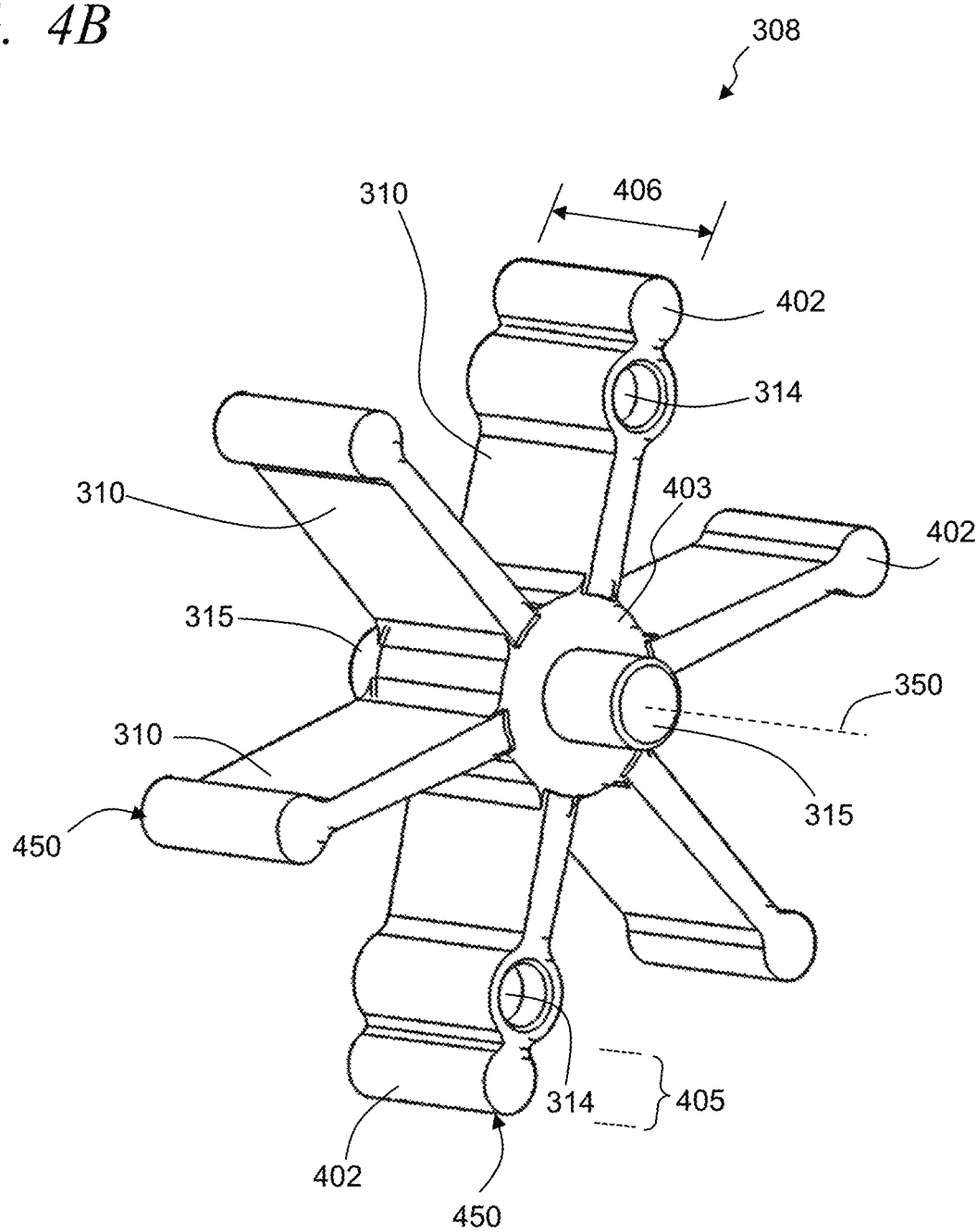
FIG. 4B illustrates a simplified representation of an exemplary paddle wheel device in accordance with some embodiments.

FIG. 4B illustrates a simplified representation of an exemplary paddle wheel device 308 in accordance with some embodiments. Referring to FIGS. 1-3B and 4B, in some embodiments, the paddle wheel device 308 includes a set of two or more blades 310, paddles, propellers, other such structures or combination of two or more of such structures. The paddle wheel device 308 can further include a pair or set of protruding posts 315, stems, pins, rods or the like aligned with the rotational axis and forming a fixed axle. In some applications, the each of the posts 315 protrude from opposite sides of the central hub region 403. Further, in some embodiments, the posts 315 are formed of the same material as the central region of the paddle wheel device (e.g., formed through injection molding). Typically, the fixed posts 315 rotates with the paddle wheel device. The set of blades are configured to rotate about the rotational axis of the paddle wheel device 308 in response to a fluid flowing through the fluid channel 302. In the embodiment illustrated in FIG. 4B, each of the posts 315 can be configured to cooperate with a separate bushing, bearing or the like that enhances rotation of the paddle wheel device and/or reduces friction, providing enhanced life of the paddle wheel device. These separate bushings can bushings be positioned in and/or fit within recesses, conical shaped opening or the like in the housing 202 and/or conduit portion 322 of the flow sensor system. Further, the separate bushings can be implemented through one or more materials, such as but not limited to, ceramics, metals, plastics, other such materials, or a combination of two or more of such materials. In some implementations, the bushings are hollow, cylindrical bushings that slide fit over one of the posts 315. In some embodiments, the use of bushings formed from a ceramic have been found to resist shavings from etching away from the bushing in a gritty fluid environment, such shavings potentially increasing the likelihood of causing the paddle wheel to get stuck or experience limited movement.

Referring to FIGS. 1-4B, in some embodiments, one or more of the set of the blades 310 includes one or more magnetic elements 314. In some applications the paddle wheel device includes one or more pairs of magnetic elements 314 positioned on opposite blades 310 to provide a balance to the paddle wheel device. Further, in some embodiments, the magnetic elements of an opposing pair of magnetic elements are positioned to establish opposite polarities that can be detected by one or more magnetic sensor systems of the flow sensor system 110. The magnetic elements 314, in some implementations, are positioned at the distal ends of the blades (e.g., see FIG. 4A). In other embodiments, the magnetic elements may be positioned in the respective blade an offset distance 405 from the distal end 450 of the blade (e.g., see FIG. 4B). Additionally or alternatively, one or more of the sets of blades not including a magnetic element 314 includes an additional weight element that has a weight substantially the same as the weight of the magnetic elements 314. This balances the total paddle wheel device.

In some embodiments, one or more or all of the blades 310 additionally or alternatively include an enhanced region 402 positioned at or about an exterior or distal end of the blade away from the rotational axis 350. This enhanced region 402 is configured with an increased thickness relative to a thickness of the blade between the enhanced region 402 and a central hub region 403 positioned at the center of the paddle wheel device 308 and through which is formed the central bore 311. The enhanced region 402 in part compensates for added stresses applied to the blades, such as impact by debris, grit and the like flowing through the conduit, fluid flow and/or friction, other such effects and typically a combination of such effects. In the illustrated embodiment, the enhanced region 402 is rounded, cylindrical, pyramid, or other relevant shape, and typically has a larger diameter than a thickness of the blade 310. In some implementations, the magnetic elements 314 are positioned within a bore, channel or other structure formed within the enhanced region 402 of the one or more blades that include magnetic elements. For example, in some embodiments each of the blades 310 of the set of blades comprises an enhanced region 402 positioned at a distal end of the blade away from a rotational axis 350 of the paddle wheel device 308. The enhanced region 402, in some implementations, comprises an increased thickness relative to a thickness of the blade between the enhanced region and a central hub region of the paddle wheel device. Further, in some embodiments as illustrated in FIG. 4A, one or more of the magnetic elements 314 are positioned within a respective enhanced region 402 of the respective blade 310. In other embodiments, as illustrated in FIG. 4B, the one or more magnetic elements 314 are cooperated with a respective blade 310 in a position other than in the enhanced region 402. For example, one or more blades may include a magnet receiving area positioned closer to the rotational axis 350 than the enhanced region 402 (e.g., and the magnetic element is press fit into the magnet receiving region.

Typically, the paddle wheel device 308 is positioned relative to the fluid channel 302 such that at least a portion of each of the blades 310 sequentially extend into the fluid channel to be contacted by the fluid flow forcing the blades and paddle wheel device to rotate about the axis and the magnetic elements rotate along a pathway as the magnetic elements rotate with the blades about the axis. The paddle wheel device and/or some or all of the blades may be constructed with different widths 406 and/or lengths. In some embodiments, for example, at least the distal ends have an increased width to increase the area of the blade exposed to the water traveling through the fluid channel 302. Similarly, the longer blades extend further into the fluid path of the fluid channel enhancing the area of the blades exposed to the fluid flow.

Figure 4C:
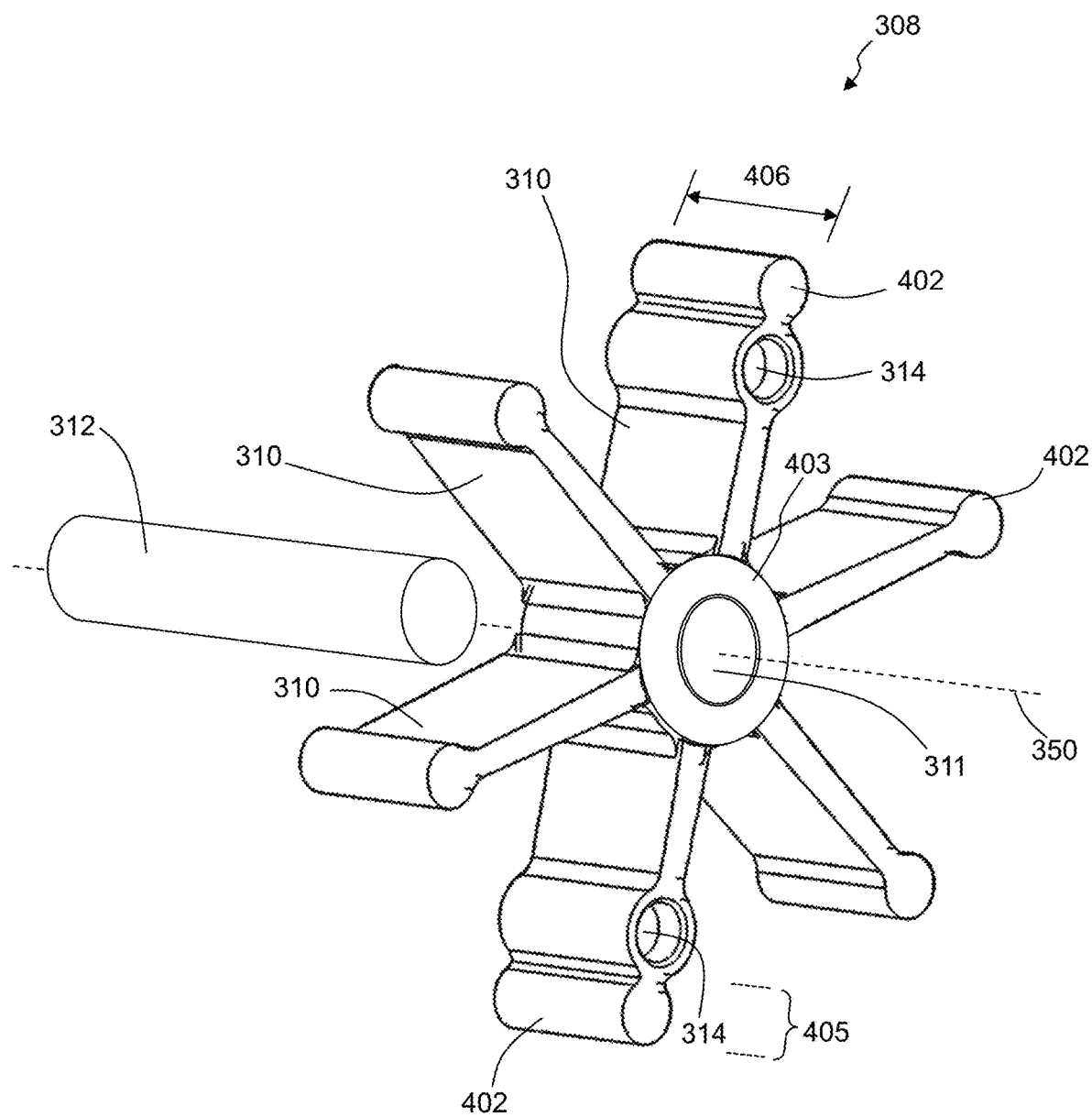
FIG. 4C illustrates a simplified representation of another exemplary paddle wheel device, in accordance with some embodiments.

FIG. 4C illustrates a simplified representation of another exemplary paddle wheel device 308 in accordance with some embodiments. Referring to FIGS. 1-3B and 4C, in some embodiments, the paddle wheel device 308 includes a set of two or more blades 310, paddles, propellers, other such structures or combination of two or more of such structures. Typically, the paddle wheel device is secured within the flow sensor system 110 so that at least a portion of each blade 310 of the set of blades extends into the fluid channel 302 and is configured to be contacted by the fluid passing through the fluid channel 302 of the flow sensor system. The movement of the fluid through the fluid channel and contacting at least the portion of the blades 310 induces rotation of the paddle wheel device 308 about a rotational axis 350 of the paddle wheel device 308. In the embodiment illustrated in FIG. 4C, the paddle wheel device 308 includes a central bore 311, channel or other such cavity through which a separate axle 312, shaft or the like can be positioned to extend through the central bore 311 and be exposed on opposite sides of the paddle wheel device enabling the paddle wheel device to be cooperated with the housing 202 and/or conduit portion 322 of the flow sensor system. In some embodiments, the axle 312 allows the paddle wheel device 308 to rotate about the axle, which is typically aligned with the rotational axis 350. In other embodiments, the axle 312 rotates with the rotation of the paddle wheel device. The axle can be constructed from and/or implemented through one or more materials, such as but not limited to, ceramics, metals, plastics, other such materials, or a combination of two or more of such materials. In some embodiment, the portions of the axle 312 protruding from the sides of the paddle wheel device 308 are configured to cooperate with the housing 202 and/or conduit portion 322 of the flow sensor system to position the paddle wheel device within the flow sensor system 110 such that the paddle wheel device rotates when fluid flows through the flow sensor system. In some embodiments, the use of an axle formed from a ceramic has been found to resist shavings from etching away from the axle in a gritty fluid environment, such shavings potentially increasing the likelihood of causing the paddle wheel to get stuck or experience limited movement.

Figure 4D:
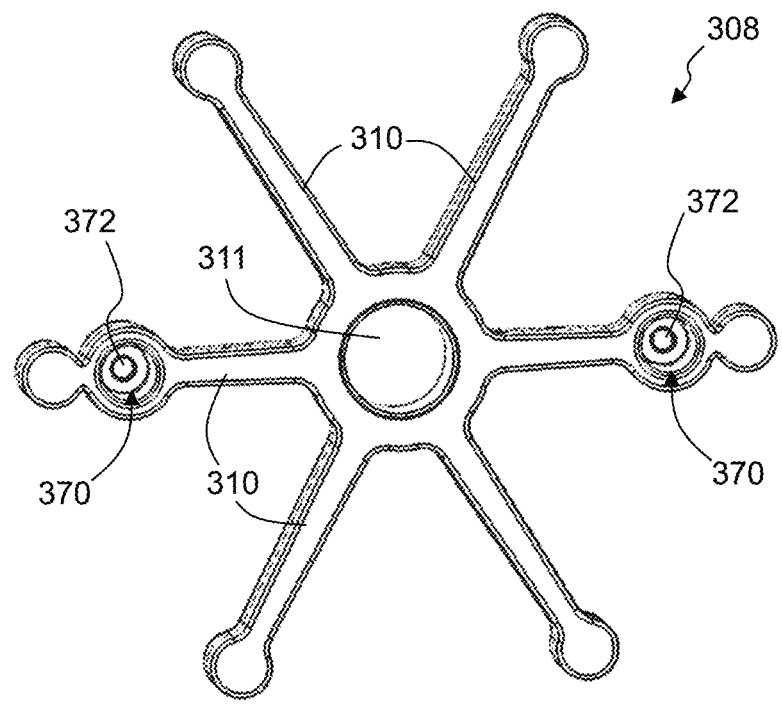
FIGS. 4D-4E illustrate a frontside perspective view and a backside perspective view, respectively, of a simplified representation of an exemplary paddle wheel device, in accordance with some embodiments.
Figure 4E:
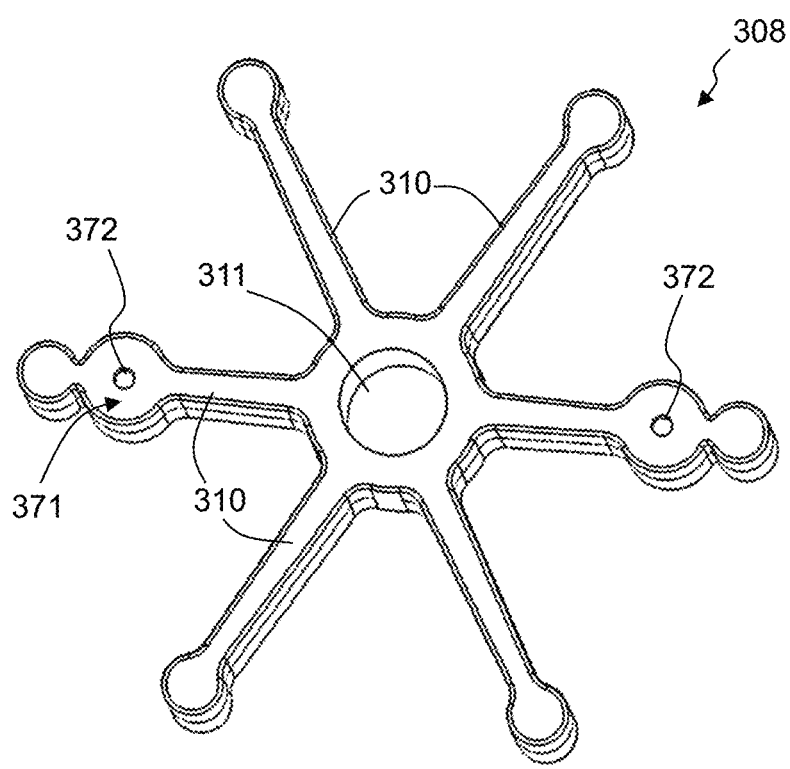

FIGS. 4D-4E illustrate a frontside perspective view and a backside perspective view, respectively, of a simplified representation of an exemplary paddle wheel device 308, in accordance with some embodiments. In some embodiments, one or more of the blades 310 include a magnet bore 370, aperture or the like that is configured to receive one or more magnetic elements 314 (not shown in FIGS. 4D-4E). The depth of the magnet bore can be substantially any depth and/or may extend through the entire width of the blade. In some embodiments, the magnet bore includes a closed end 371 to set a positioning and/or limit of movement of the magnetic element that is inserted into the magnet bore. Further, in some embodiments, the closed end includes one or more apertures 372, which simplify assembly by, in part, providing a passage for air to escape from the magnet bore 370 as the magnetic element 314 is pushed into or otherwise positioned within the magnet bore. In some implementations, the width or diameter of the magnet bore 370 is substantially the same as or slightly less than the width or diameter of the magnetic element positioned into the magnet bore providing a compression fit on the magnetic element to, at least in part, maintain a position of the magnetic element when positioned into the magnet bore 370. Additionally or alternatively other methods can be included to maintain a positioning of the magnetic element within the magnet bore, such as but not limited to, one or more protrusions over which the magnet is forced when inserted into the magnet bore, adhesive, ridges on an interior surface of the magnet bore, a cap of closure, other such structures and/or methods, or a combination of two or more of such structures and/or methods.

Figure 4F:
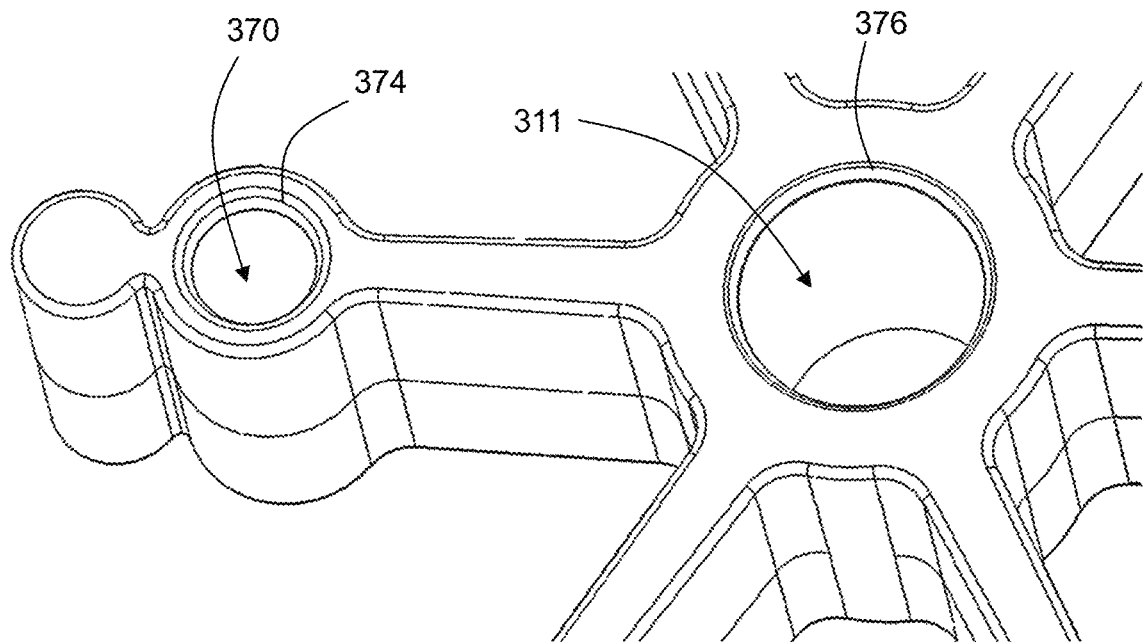
FIG. 4F illustrates a magnified view of a magnet bore and axle bore of an exemplary paddle wheel device, in accordance with some embodiments.

FIG. 4F illustrates a magnified view of a magnet bore 370 and axle bore 311 of an exemplary paddle wheel device 308, in accordance with some embodiments. In some embodiments, the magnet bore 370 includes one or more bevels 374, chamfers, taperings, and/or other such structures along an outer edge of the magnet bore. The one or more bevels 374 aid in aligning and positioning the magnetic element as the magnetic element is inserted into the magnet bore 370. In some embodiments, the central bore 311 includes one or more bevels 376, chamfers, taperings, and/or other such structures along an outer edge of the central bore. The one or more bevels 376 aid in aligning and positioning the separate axle 312 as the axle 312 is inserted into the central bore 370.

It is noted that while the illustrated embodiments of FIGS. 4A-4F illustrate the paddles formed as axially extending blades with one or more enhanced regions at the distal ends and some of which include a magnetic element positioned therein, these blades may take a variety of configurations. For example, in some embodiments, one or more of the blades may have some curvature and/or some rotation along some or all of the length and/or the width. For example, in some embodiments, the blades extend radially in a curved fashion rather than in a straight fashion (e.g., curved along their length). And in some embodiments, the blade may be flat across a width as illustrated, or may be curved across some or all of the width of the blade, scooped across some or all of the width of the blade or otherwise shaped. And in some embodiments, the blades may have some rotation along some or all of the length and/or width, such as propellers commonly implemented on planes, boats, and/or other such propellers.

Figure 4G:
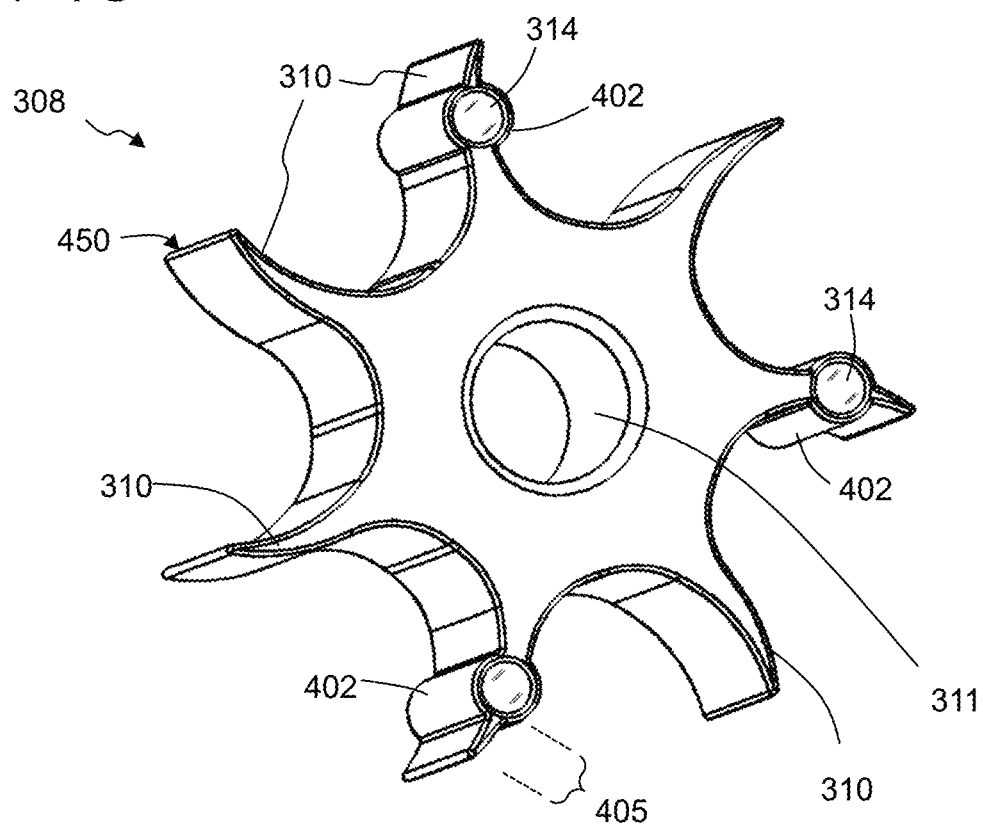
FIG. 4G illustrates a simplified representation of a paddle wheel device, in accordance with some embodiments.

FIG. 4G illustrates a simplified representation of a paddle wheel device 308, in accordance with some embodiments. The paddle wheel device 308, in this example, includes multiple blades 310 having a curvature along some or all of the length. The amount or radius of the curvature can be substantially any amount or radius, and typically is dependent upon an expected flow rate through the irrigation conduit with which the flow sensor system is to be cooperated. Additionally, the curvature or radius may vary along one or more portions of the length of the blades. Typically, each blade 310 includes the same curvature(s). One or more of the curved blades 310 includes a magnet housing or enhanced region 402 that is configured to receive and retain one or more magnetic elements 314. The enhanced region 402 and magnetic elements 314 are positioned along a length of the blade 310 to be sufficiently close to be detected by one or more magnetic sensor systems of the flow sensor system 110. In some instances, for example, the enhanced region 402 and magnetic elements 314 are positioned at a distal end 450 of the blade farthest from a central bore 311, while in other implementations the magnetic elements 314 is positioned an offset distance 405 from the distal end 450 of the blade 310. The central bore 311, channel or other such cavity is configured to receive at least an axle 312, and in some instances a bushing, bearing or the like configured to cooperate with an axle. In other embodiments, the paddle wheel device 308 includes a pair or set of integral protruding posts formed as part of the paddle wheel device and extending from a center of the paddle wheel device.

In some embodiments, the flow sensor system 110 includes one or more filters 320, strainer, grate, screen or the like. The filter 320 is configured to at least partially be positioned within the fluid channel 302. For example, as illustrated in FIG. 3B, a filter 320 is positioned proximate the first port 304 or upstream side of the flow sensor system to capture and/or block solid objects being carried by the fluid flow through a conduit (e.g., irrigation conduit 106) with which the flow sensor system is coupled. In some implementations, a rim of the filter 320 is positioned and secured between the conduit portion 322 of the flow sensor system 110 and an upstream conduit coupling 326. The conduit coupling 326 is configured to grip or secure with the conduit 106 and be cooperated with the conduit portion of the flow sensor system 110 to couple the conduit 106 with the flow sensor system 110. In some embodiments, the conduit coupling 326 is secured by a first or upstream union locking ring 328 that includes an interior shelf that presses against a corresponding exterior ledge of the conduit coupling 326 as the union locking ring 328 is threadedly secured with corresponding threads formed in the fluid flow sensor system 110 (e.g., on an exterior of a portion of the conduit portion 322). A similar downstream conduit coupling 327 can be cooperated with the conduit portion 322 through a second or downstream union locking ring 329. One or more O-rings, seals, gaskets or the like may be positioned at the intersection between the conduit couplings and the respective the union locking rings.

Figure 5:
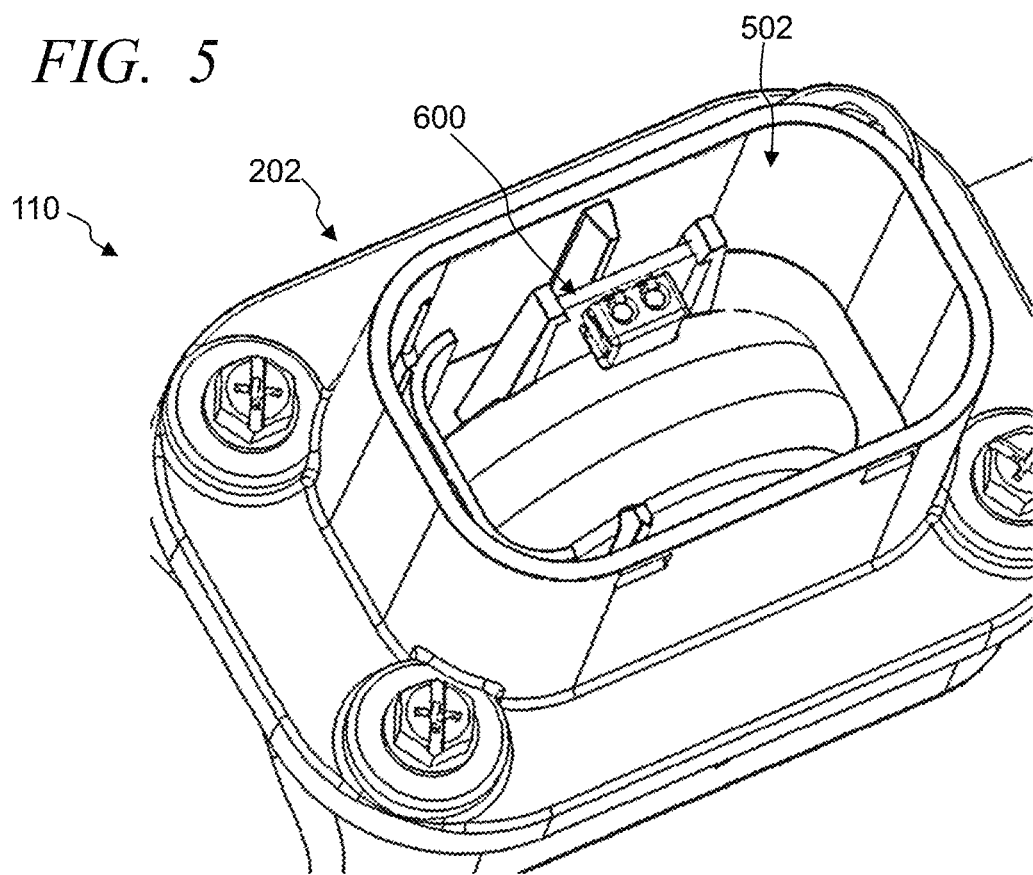
FIG. 5 illustrates a partially exposed view of a flow sensor system with a lid portion removed from the housing, in accordance with some embodiments.
Figure 6A:
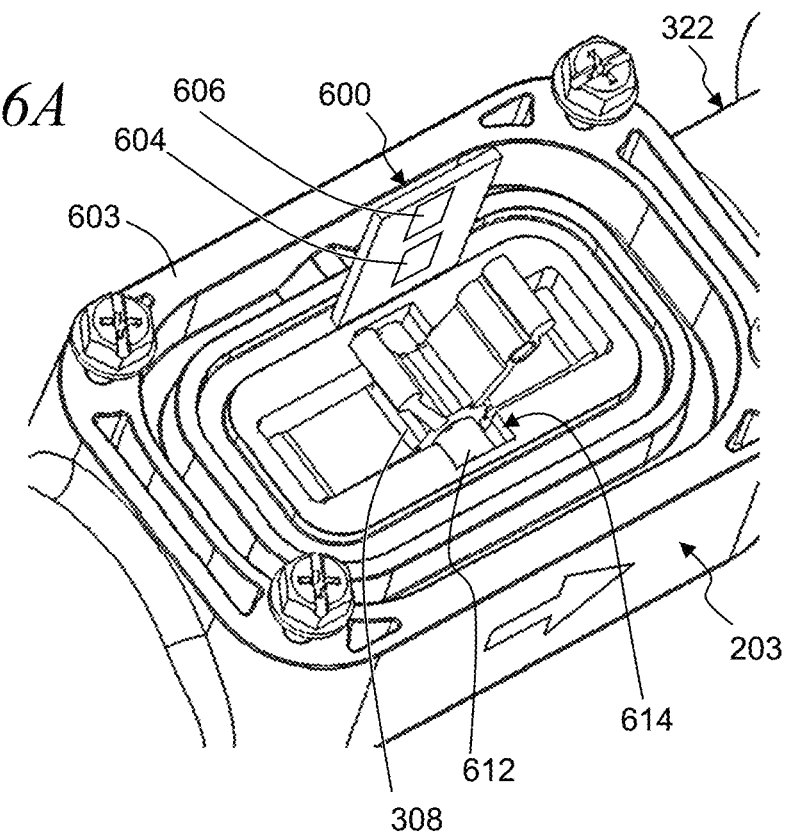
FIG. 6A illustrates an exposed view of the flow sensor system with an circuitry housing portion of the housing removed from a conduit portion defining the fluid channel, in accordance with some embodiments.
Figure 6B:
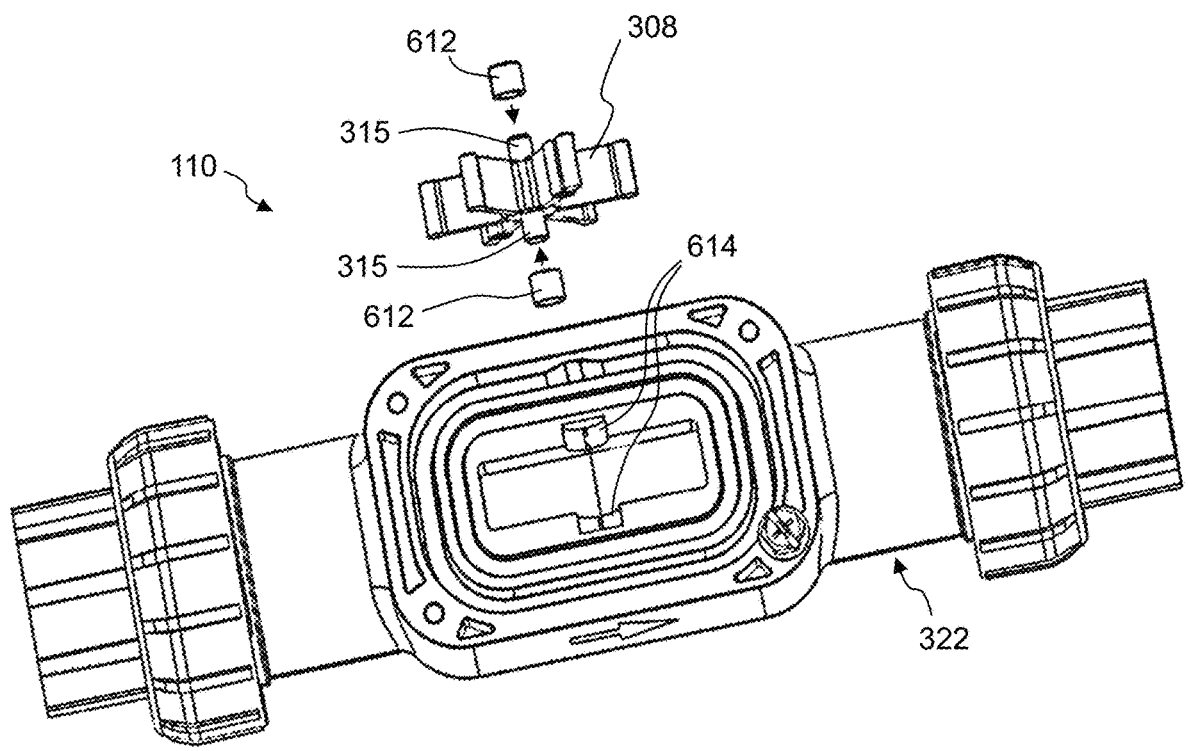
FIG. 6B illustrates a partial, exploded and exposed view of the flow sensor system with the housing removed, in accordance with some embodiments.

FIG. 5 illustrates a partially exposed view of the flow sensor system 110 with a lid portion 318 removed from the housing 202, in accordance with some embodiments. FIG. 6A illustrates a further exposed view of the flow sensor system 110 with a circuitry housing portion 502 or cavity of the housing removed from a paddle wheel mounting area 203 cooperated with or formed as part of the conduit portion 322 defining the fluid channel 302, in accordance with some embodiments. FIG. 6B illustrates a partial, exploded and exposed view of the flow sensor system 110 with the housing 202 removed, in accordance with some embodiments. Referring to FIGS. 2-6B, in some embodiments, the housing 202 secures with a mounting interface 603 of the paddle wheel mounting area 203 closing off and sealing the fluid channel 302 and the flow of fluid away from sensor circuitry and other components of the fluid flow sensor system 110. The housing 202, in some implementations, includes or forms a paddle wheel cavity 309 positioned about at least a portion of the paddle wheel while still exposing at least a portion of one or more blades 310 to the fluid within the fluid channel. In some embodiments, the housing includes the paddle wheel wall 307, which may seal and/or form the paddle wheel cavity 309. This paddle wheel cavity can separate the fluid from one or more cavities within the housing. In some embodiments, for example, the housing 202 include a circuitry housing portion 502 that is separate from and provides a sealed portion of the housing that is outside of the fluid channel 302.

One or more circuitry and/or circuit boards can be positioned within the circuitry housing portion 502 or cavity. Some embodiments include one or more magnetic sensor systems 600 that each include one or more magnetic sensors 604 positioned within the sealed portion of the circuitry housing portion 502 of the housing 202, and is outside of the fluid channel 302. Further, the one or more magnetic sensors 604 are positioned proximate to the pathway of the one or more magnetic elements 314 as the one or more magnetic elements rotate about the axis. FIG. 6A shows (with the circuitry housing portion 502 removed) the positioning, in some embodiments, of a magnetic sensor 604 relative to the paddle wheel device 308. As illustrated in the exposed illustration in FIG. 6A, the one or more magnetic sensors 604 can be positioned to detect the one or more magnetic elements 314 as the magnetic elements rotate about the axis along the pathway of the one or more magnetic elements 314 within the paddle wheel cavity. In some embodiments, the magnetic sensor 604 is configured to provide an indication, a change in state, a pulse output or the like every time at least one of the magnetic elements 314 passes the magnetic sensor. Again, as illustrated in FIGS. 5 and 6A, the magnetic sensor system 600 is separated from the paddle wheel device 308 and fluid channel 302 by being positioned, in some embodiments, in a water tight circuitry housing portion 502 or cavity, which is typically adjacent the paddle wheel cavity. As described above and illustrated in FIGS. 6A-6B, in some embodiments, bushings 612 can be positioned on the posts 315, with the bushing configured to fit within respective recesses 614, conical shaped opening or the like in the housing 202 and/or conduit portion 322 of the flow sensor system. In other embodiments, bushings 612 are not utilized. In some embodiments, the recesses 614 are formed in the conduit portion 322, and a lower surface of the housing closes the recesses to retain the axle 312 or posts 315 within the recesses 614. Additionally or alternatively, the lower surface of the housing 202 may include corresponding recess portions that cooperate with recess portions formed in the conduit portion 322 to cooperatively define the recesses 614 when the housing 202 is secured with the conduit portion 322.

In some embodiments the paddle wheel device 308 does not cooperate with bushings (e.g., central bore bushings 404 and/or bushings 612), and instead the axle 312 or posts 315 instead cooperate directly with the respective one of the pair of recesses 614 of the conduit portion 322. For example, some embodiments utilize a paddle wheel device 308 that cooperates with a separate axle 312 (e.g., see FIGS. 3A and 4C) that mates with and/or extends through the central bore 311 (or a pair of axles that each is positioned in one side of the central bore 311). The protruding and exposed portions of the axle 312 extending from the sides of the paddle wheel device 308 are positioned directly into a respective one of the recesses 614. The pair of recesses are each configured to receive one of the exposed portions of the axle.

Figure 6C:
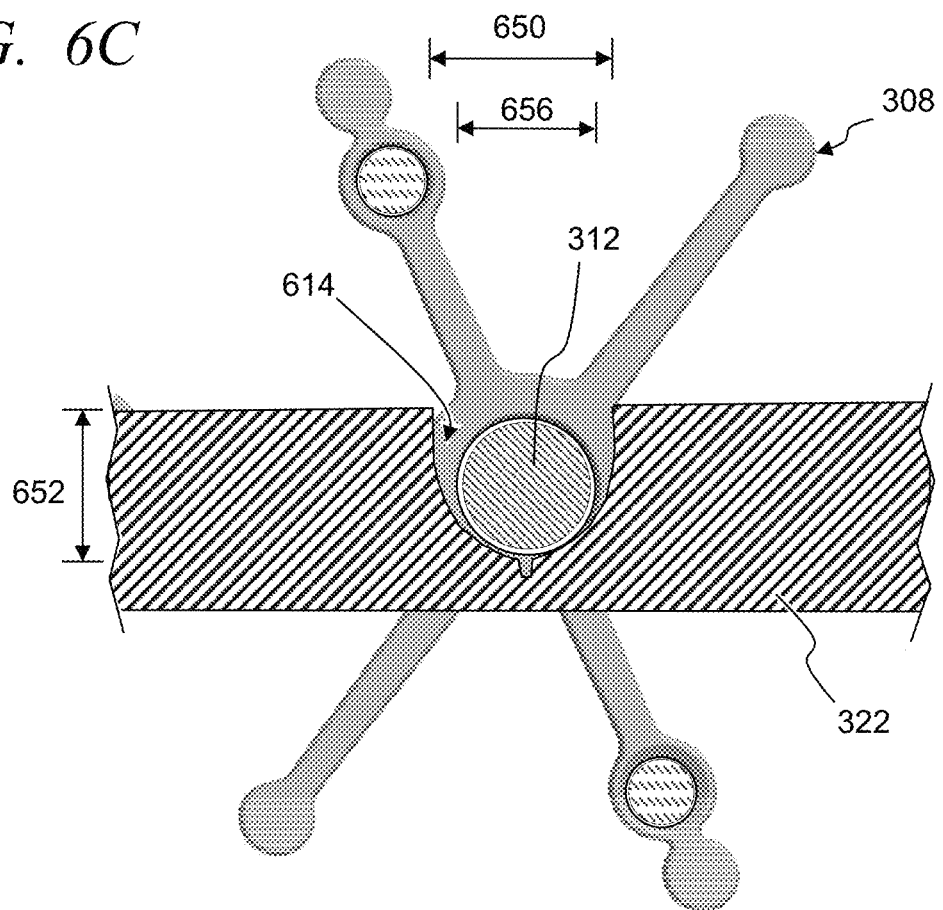
FIG. 6C illustrates a simplified, partial cross-sectional view of an exemplary conduit portion of a flow sensor system and a side view of an exemplary paddle wheel device, in accordance with some embodiments.
Figure 6D:
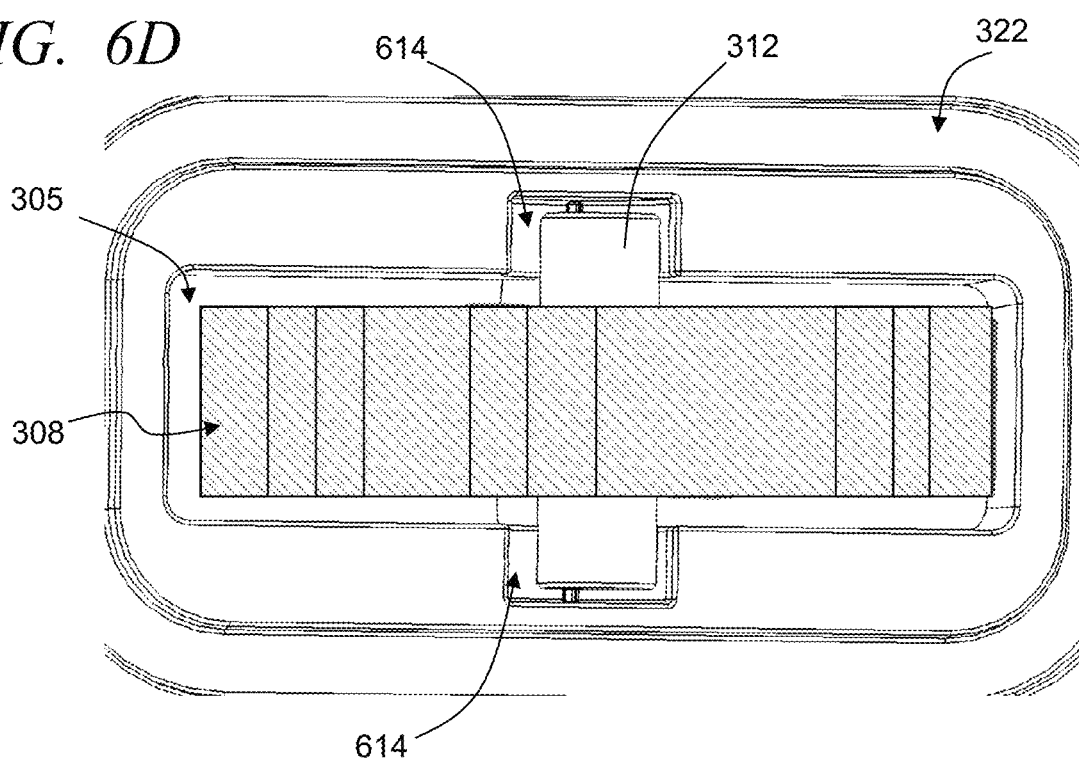
FIG. 6D illustrates a simplified overhead view of an exemplary paddle wheel device cooperated with an exemplary conduit portion of a flow sensor system, in accordance with some embodiments.
Figure 6E:
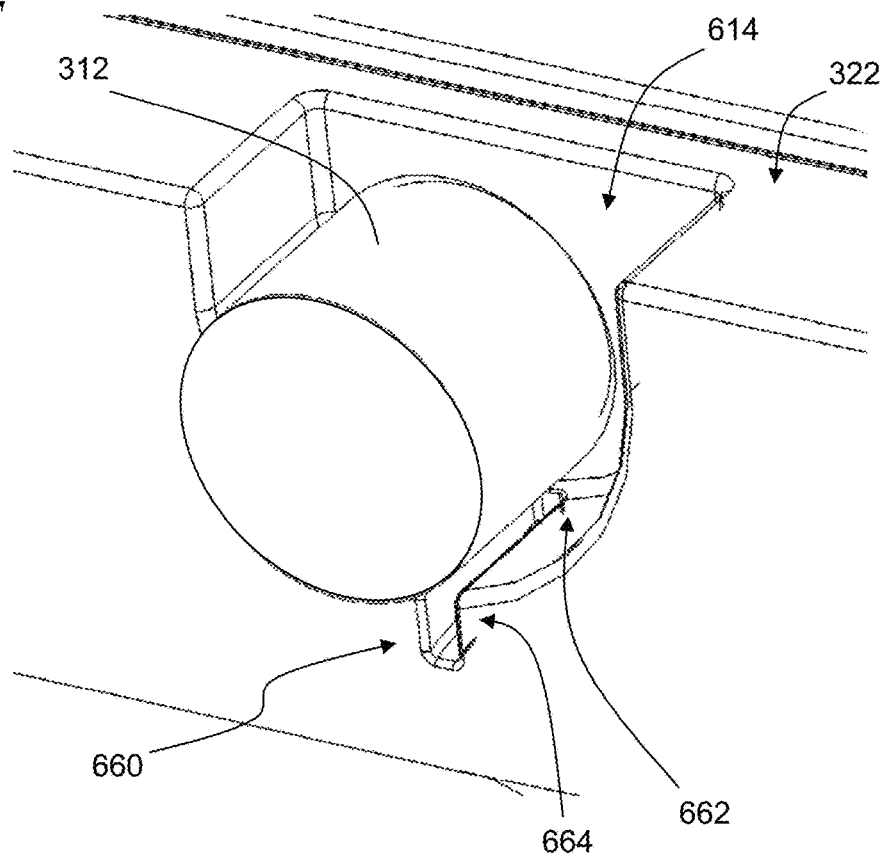
FIG. 6E illustrates a magnified, perspective view of an exemplary axle positioned within an exemplary recess of a conduit portion of a flow sensor system, in accordance with some embodiments.
Figure 6F:
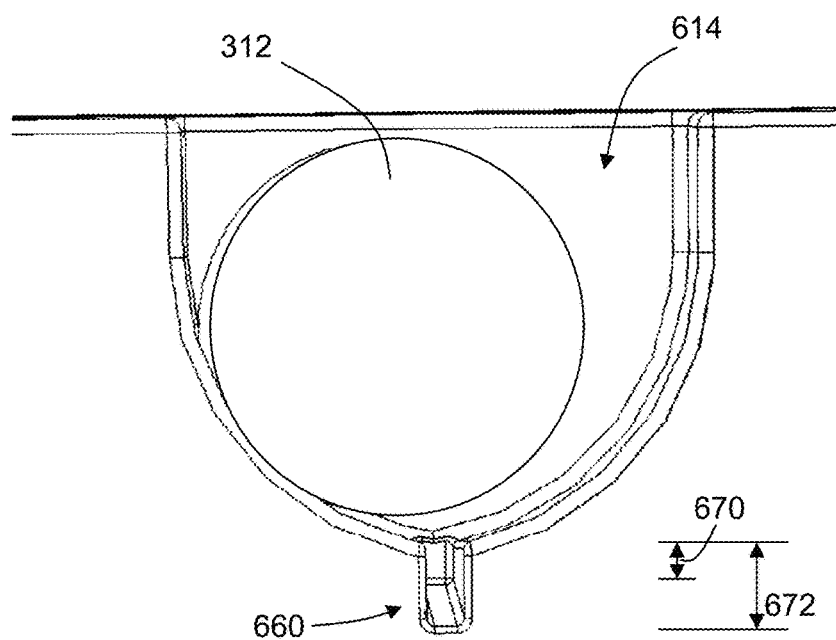
FIG. 6F illustrates a simplified, side view of an exemplary axle positioned within an exemplary recess of a conduit portion of a flow sensor system, in accordance with some embodiments.

FIG. 6C illustrates a simplified, partial cross-sectional view of an exemplary conduit portion 322 of the flow sensor system 110 and a side view of an exemplary paddle wheel device 308, similar to that illustrated in FIG. 4C, cooperated with the conduit portion 322, in accordance with some embodiments. FIG. 6D illustrates a simplified overhead view of an exemplary paddle wheel device 308 cooperated with an exemplary conduit portion 322 of the flow sensor system 110, in accordance with some embodiments. FIG. 6E illustrates a magnified, perspective view of an exemplary axle 312 positioned within an exemplary recess 614 of the conduit portion 322, in accordance with some embodiments. FIG. 6F illustrates a simplified, side view of an exemplary axle 312 positioned within an exemplary recess 614 of the conduit portion 322, in accordance with some embodiments. Referring to at least FIGS. 6C-F, in some embodiments, an axle 312 can cooperate with the central bore 311 of the paddle wheel device 308. The portions of the axle 312 (or posts 315) protruding from the sides of the paddle wheel device 308 can be positioned within a respective one of the recesses 614 of the conduit portion 322. Further, in some embodiments, the axle 312 is cooperated with the recesses 614 of the conduit portion 322 without separate bushings, bearings or the like.

In some embodiments, the recesses 614 are formed with dimensions that are greater than the dimensions of the axle 312 resulting in play or gaps between the outer surface of the axle 312 and the inner surface of the recesses 614. For example, each of the recesses 614 can have at least one of, and typically both, a diameter 650 and/or depth 652 that are greater that a diameter 656 of the axle 312. The resulting gap or gaps between the interior surface of the recesses 614 and the outer surface of the axle 312 enable the axle to continue to rotate even if debris (e.g., dirt, grit, pebbles, etc.) get into the recesses 614, and helps to avoid and/or prevents the paddle wheel device 308 from getting stuck or lodged in the recesses and not able to rotate or having resistance in rotating. Further, the gaps can be configured with sufficient size to enable debris to be pushed out (e.g., by the rotation of the axle 312) and/or flushed out of the recesses 614 over time. In some embodiments, for example, the dimensions (e.g., diameter 650 and/or depth 652) of the recesses 614 are 10% to 50% or more greater than the diameter 656 of the axle 312, while still sized to ensure that the axles are retained within the recesses 614 when the flow sensor system is in use. Additionally, because of the difference in size, the axle 312 can move laterally and/or virtually within the recesses 614 to help dislodge and/or work out any debris that may get into the recesses, and attempts to prevent debris from being lodged within the recesses. In some embodiments, the recess 614 can have a variety of shapes, such as a rectangular channel (or trench), a channel having angled side walls and/or floor, a curved or rounded channel as illustrated, and so on. In some embodiments, the shape of the recess 614 is intended to allow movement of the axle to reduce the likelihood of debris being lodged, but not enough lateral play so that the magnetic elements of the paddle wheel will remain aligned with the sensor in order for the sensor to respond to the proximity of the magnetic element as it passes the sensor during rotation. In some embodiments, angled, sloped or curved side walls and/or a floor allow for limited lateral movement and tend to settle the axle into the recess. Some embodiments further include one or more troughs, notches and/or trenches 660 formed near or at a base or lowest portion of the respective recesses 614. Debris can readily move down from the recesses 614 and into the trenches 660 to speed the removal of the debris from the recesses 614. In some embodiments, the trenches 660 may have a slope or be angled toward an interior of the recess to utilize gravity and flow of fluid to aid in removal of debris that gets into the trench 660. For example, the trenches 660 may have a first or exterior depth 670 proximate an exterior surface 662 of the recess 614, and a second or interior depth 672 proximate an interior edge 664 of the recess 614. The interior depth can be greater than the exterior depth with a base or bottom surface of the trench 660 being sloped between the differences in depth.

Figure 6G:
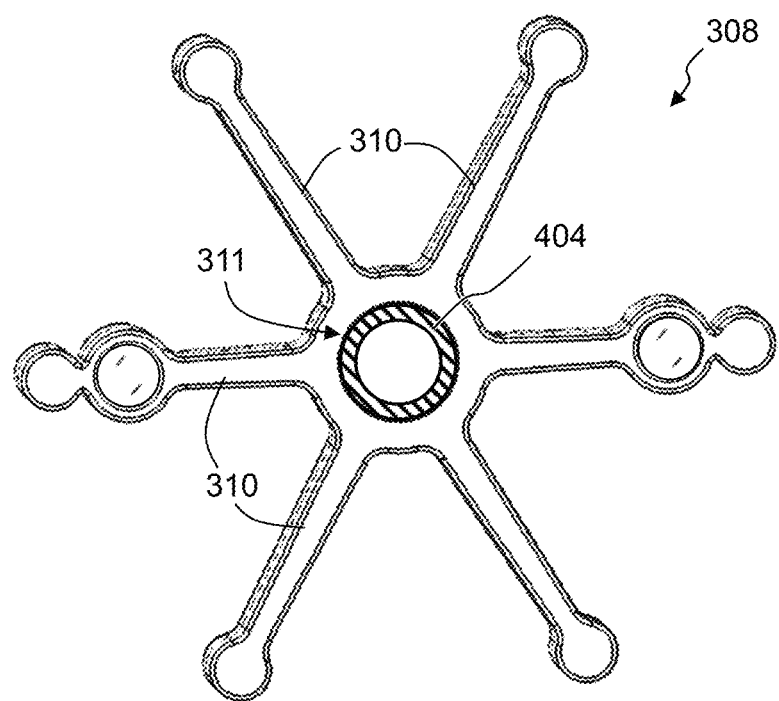
FIGS. 6G-6K illustrate simplified representations of exemplary paddle wheel devices and an exemplary axles, in accordance with some embodiments.

FIG. 6G illustrates a simplified representation of an exemplary paddle wheel device 308, in accordance with some embodiments. As described above, in some embodiments the paddle wheel device 308 includes a central bore 311, channel or other such cavity through which an axle 312 (not shown in FIG. 6G), shaft or the like can be positioned to extend through the central bore 311 and be exposed on opposite sides of the paddle wheel device enabling the paddle wheel device to be cooperated with the housing 202 and/or conduit portion 322 of the flow sensor system. Some embodiments further include one or more bushings 404, bearings, coatings, protective devices, other such structures, or a combination of two or more of such structures with which the axle 312 can cooperate. The bushing 404 is configured to reduce friction and enhance or otherwise improve the ease of rotation of the paddle wheel device.

Figure 6H:
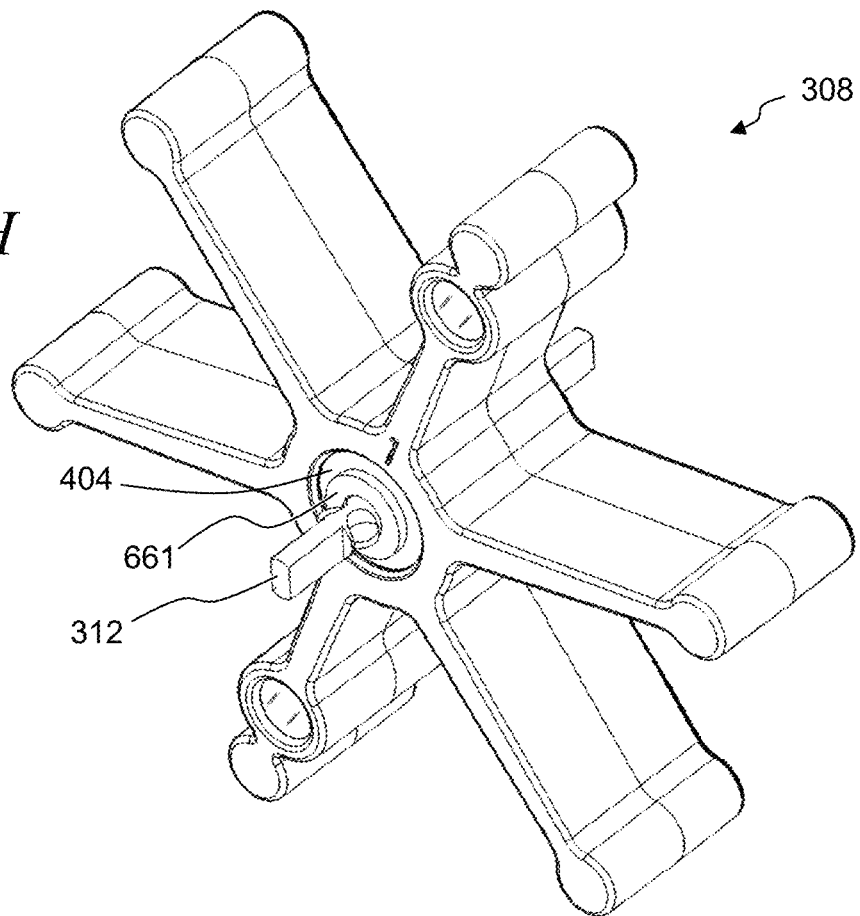
Figure 6I:
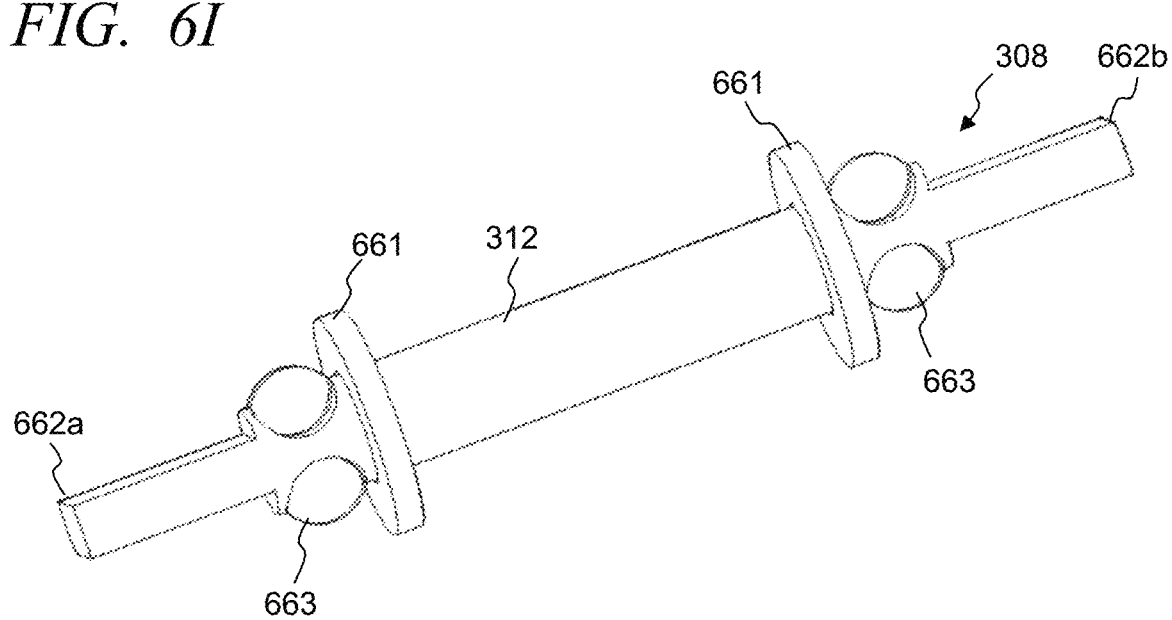
Figure 6J:
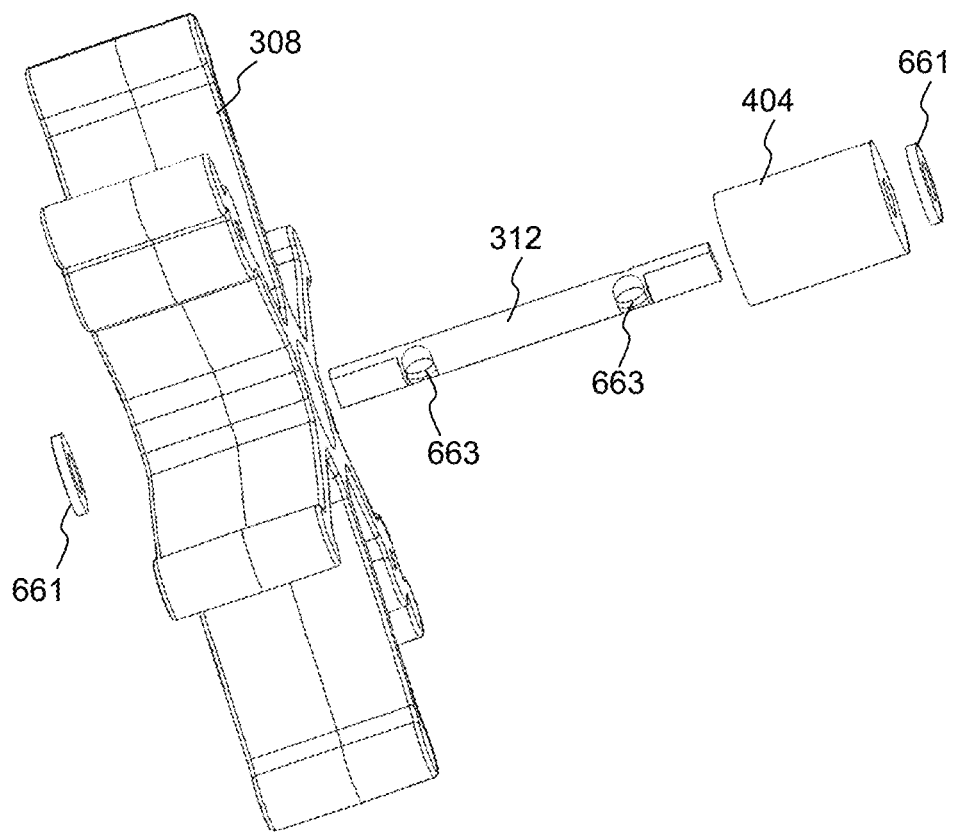
Figure 6K:
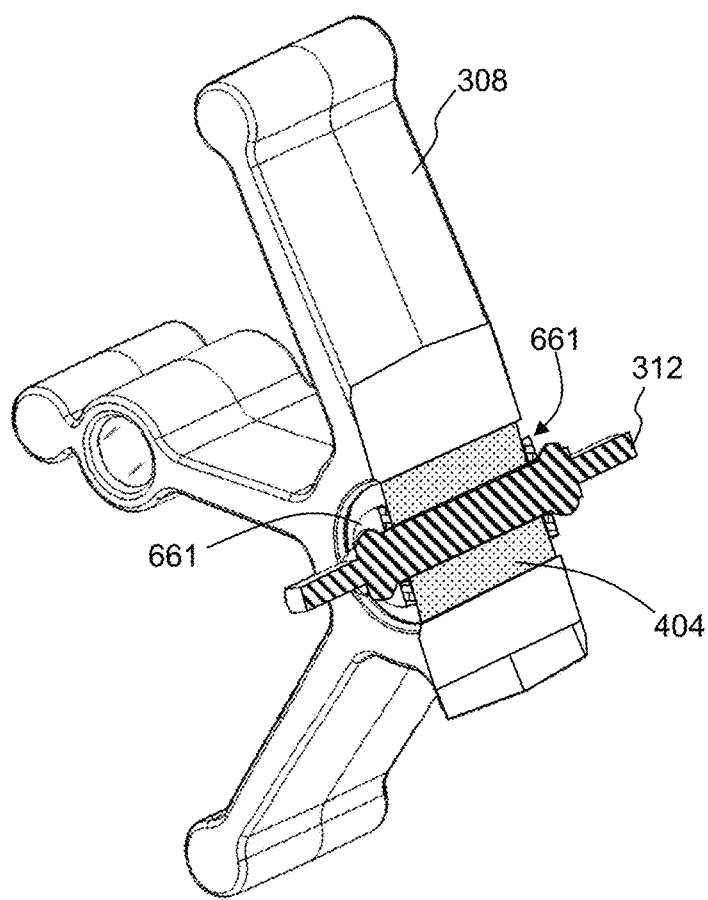
Figure 6L:
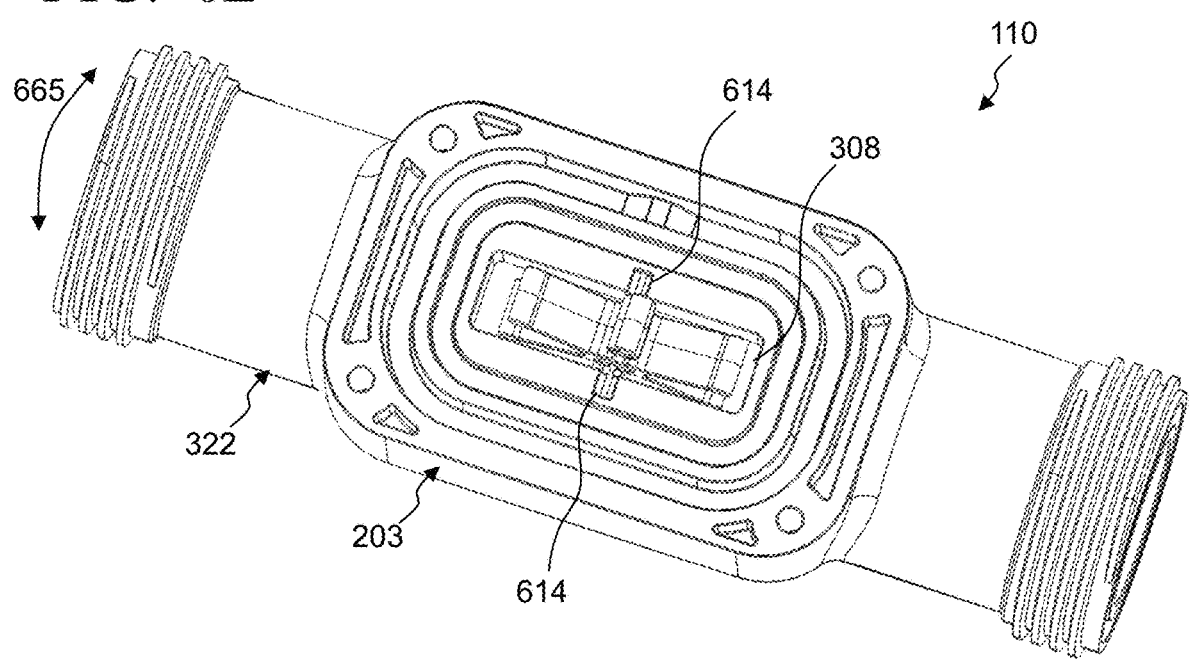
FIGS. 6L-6M illustrate exemplary flow sensor systems exposing the paddle wheel device, in accordance with some embodiments.
Figure 6M:
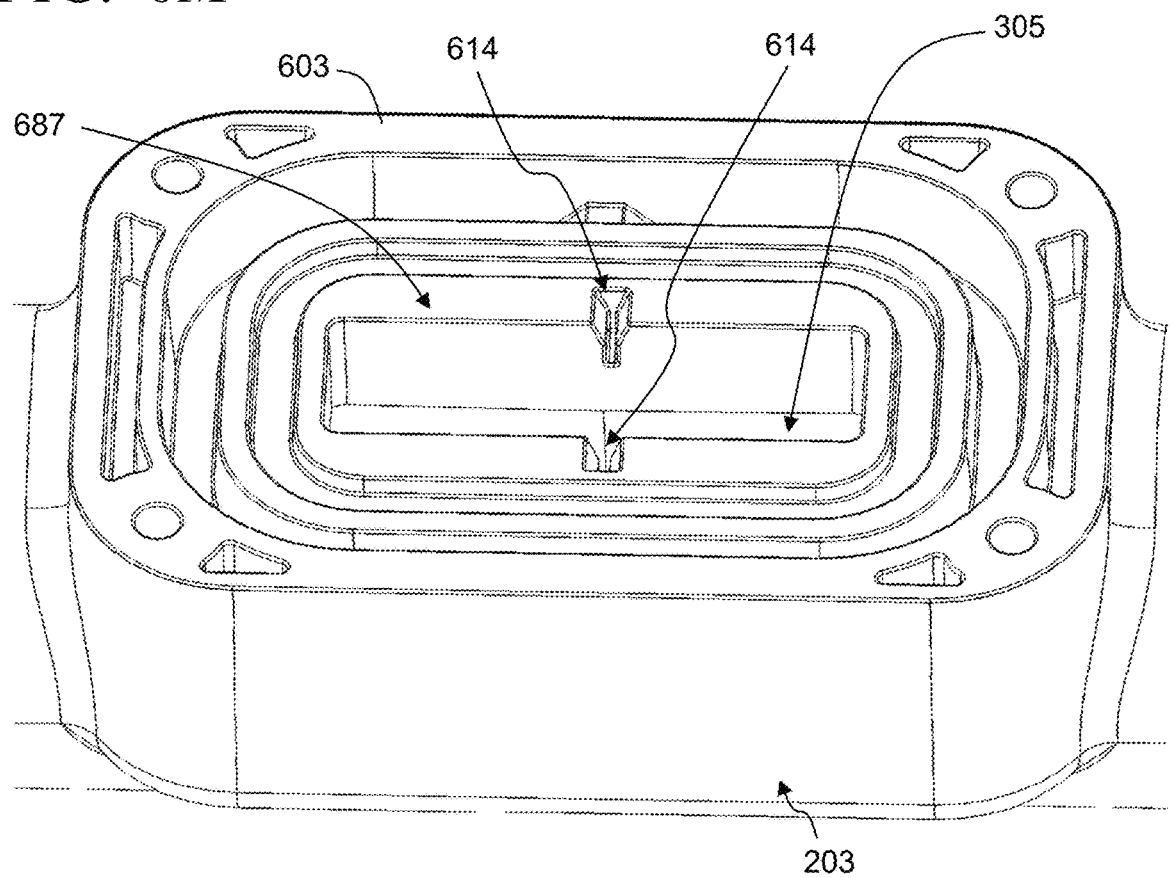
Figure 6N:
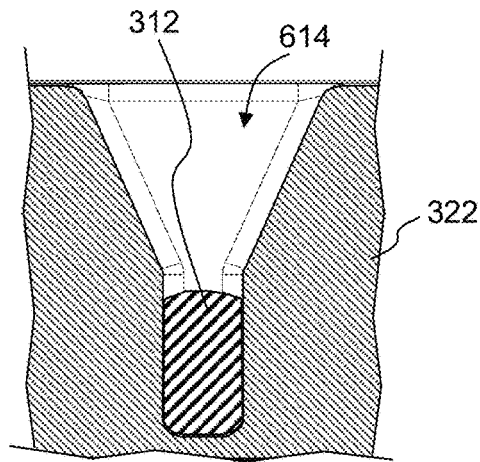
FIGS. 6N-6O illustrate simplified side views of exemplary tapered axle recesses and exemplary lateral ends an axle, in accordance with some embodiments.
Figure 6O:
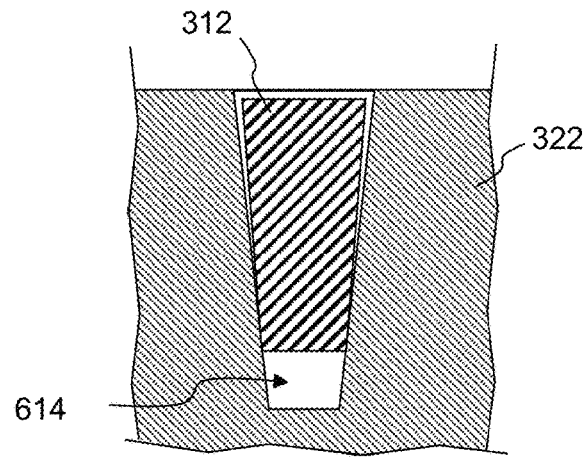

FIG. 6H illustrates a simplified representation of an exemplary paddle wheel device 308 cooperated with a bushing 404 and an exemplary alternate axle 312 in accordance with some embodiments. FIG. 6I illustrates a simplified block diagram of an exemplary alternate axle 312, in accordance with some embodiments. FIG. 6J illustrates a simplified, exploded view of the exemplary paddle wheel device 308, bushing 404, alternate axle 312 and one or more washers 661, in accordance with some embodiments. FIG. 6K illustrates a simplified cross-sectional view of the exemplary paddle wheel device 308 cooperated with the bushing 404 and the alternate axle 312 of FIG. 6H-J, in accordance with some embodiments. FIG. 6L illustrates an exposed view of an exemplary flow sensor system 110 exposing the paddle wheel device 308 and secured within the paddle wheel mounting area 203 by the alternate axle 312 of FIGS. 6J-K, in accordance with some embodiments. FIG. 6M illustrates a partial, exposed view of the flow sensor system 110 with the housing 202 removed exposing the paddle wheel aperture 305 and exemplary axle recesses 614, in accordance with some embodiments. FIG. 6N illustrates a simplified side view of an exemplary tapered axle recess 614 and a lateral end of the alternate axle 312, with an exemplary generally rectangular cross-sectional shape, secured within the axle recess 614, in accordance with some embodiments. FIG. 6O illustrates a simplified side view of an exemplary tapered axle recess 614 and a lateral end of the alternate axle 312, with an exemplary tapered cross-sectional shape, secured within the axle recess 614, in accordance with some embodiments.

Referring to at least FIGS. 6G-6O, in some embodiments, the flow sensor system 110 includes a fixed axle 312 with each lateral end 662a-662b of the axle 312 secured within an axle recess 614 in a stationary, non-rotating position within the paddle wheel mounting area 203. The paddle wheel device 308 is configured to be positioned on the fixed axle and rotate about the axle. In some implementations, the axle recesses 614 include a tapered slot, groove, recess or the like that is configured to secure the axle 312 through press-fit, friction, indentations, protrusions and/or other such methods. As introduced above, in some implementations, a bushing 404 is cooperated with the axle 312 that is configured to rotate about the axle as the paddle wheel device 308 rotates. The bushing can be formed from ceramics, metals, plastics, coated with Polytetrafluoroethylene (PTFE), PVC, polypropylene (PP), glass and/or fiberglass filled or infused PP (e.g., 16% glass filled PP), other plastic, fiberglass infused plastic, other such materials, or a combination of two or more of such materials. Similarly, the axle 312 can be constructed from and/or implemented through one or more materials, such as but not limited to, metals, plastics, ceramics, other such materials, or a combination of two or more of such materials. In some implementations, for example, the axle is formed from stainless steel.

In some embodiments, a washer 661, spacer or the like is positioned on the axle 312 and on the lateral sides of the bushing 404. Typically, one or more retaining structures 663 are cooperated with the axle 312 and/or formed in the axle 312. The one or more retaining structures 663 are configured to maintain a position of the bushing 404 and paddle wheel device 308 on the axle 312 to ensure accurate positioning of the paddle wheel device when positioned with the paddle wheel aperture 305. In some embodiments, the retaining structures 663 can include one or more protrusions, ridges, bumps, tapering, chamfers, deformations (e.g., from swaging, compressing, etc.), welding, nuts, bolts, pins, rings, clamps, adhesive, other such structures and/or methods, or a combination of two or more of such structures and/or methods that cooperate with and maintain positioning of the washer 661 and/or bushing 404 on the axle. In some embodiments, the washers 661, in part, protects the bushing 404 from the retaining structure 663 and/or interior side walls of the paddle wheel aperture 305. Additionally or alternatively, the washers 661, in some implementations provide added stability to the rotation of the paddle wheel device 308 and reduce lateral movement 665 and/or pivoting of the paddle wheel device 308 as the paddle wheel device rotates. The washers 661 can be formed from ceramics, metals, plastics, coated with Polytetrafluoroethylene (PTFE), PVC, polypropylene (PP), glass and/or fiberglass filled or infused PP (e.g., 16% glass filled PP), other plastic, fiberglass infused plastic, other such materials, or a combination of two or more of such materials. In some embodiment, for example, the washers 661 are formed from stainless steel.

The axle recesses 614 of the paddle wheel mounting area 203, in some embodiments, are configured to receive the lateral ends of the axle 312 and secure the axle so that the axle does not move or rotate. One or more methods can be used to secure the axle, such as but not limited to press-fitting, tongue and groove, biasing, friction, adhesive, melting, deforming, latching, fastener, screw, bolt, other such methods or a combination of methods. As described above, in some implementations, the flow sensor system 110 is configured to enable access to the paddle wheel device 308 for maintenance and/or replacement. Accordingly, the method of securing the axle 312, in some embodiments, is configured to enable the axle and paddle wheel device to be removed and/or replaced.

In some embodiments, the axle recesses 614 have a generally tapered shape formed in the sides of the paddle wheel mounting area 203. The ends of the axle 614 can be pressed into the tapered axle recesses 614. Further, in some embodiments, the axle or a portion of the axle can be shaped to enhance the retention of the axle in the axle recesses 614. For example, in some embodiment, at least a portion of the axle proximate the lateral ends can include a tapered cross-sectional shape (e.g., see FIG. 6O) that engages the tapered sides of the axle recess 614. In some implementations, the axle may include one or more protrusions, barbs, ridges and/or other such structures that further maintain a position of the axle within the axle recess. Further, the housing 202 of the flow sensor system 110, in some embodiments, includes a mounting interface that engages or contacts one or more surfaces, such as a surface 687 in which the axle recesses 614 are formed and further presses and/or aids in retaining the position of the axle 312 within the axle recesses.

Referring to FIGS. 2-6O, in some implementations, the lid 318 of the housing 202 is removable to enable access to one or more of the sealed cavities and/or the circuitry within the circuitry cavity. The lid may be secured with the housing through snap fit, friction fit, tabs and recesses, physical interlace and adhesive bond, bolts, screws, clamps, other such methods or a combination of two or more of such methods. Further, the lid may establish a water tight seal (e.g., though one or more gaskets, grooves, lips, ledges, other such structures or combination of two or more of such structures). In other instances, the lid may be fixed to the housing, such as through a glue, epoxy, melting, other such methods or combination of such methods. Still further, in some embodiments, a portion of or all of the circuitry cavity and/or one or more other cavities of the housing may be partially or fully filled with a resin, epoxy or other material to seal the circuitry and/or other components within the cavity in attempts to prevent circuitry from being exposed to electrical factors, moisture and/or other environmental conditions.

Further, in some embodiments, the circuitry housing portion 502 may be removably secured with the remainder of the housing through snap fit, friction fit, tabs and recesses, bolts, screws, clamps, other such methods or a combination of two or more of such methods. As such, some or all of the sealed portion of the housing 202 may be removable from the fluid channel 302 portion. Further, the circuitry housing may establish a weather and/or water tight seal (e.g., though one or more gaskets, grooves, lips, ledges, other such structures or combination of two or more of such structures). In some embodiments, the removal of the circuitry housing portion 502 can enable a user to access the paddle wheel device 308. The exposed illustration in FIGS. 6A-6B of the flow sensor system shows the sealed portion, in accordance with some embodiments, of the housing removed from the flow channel portion. In some embodiments, the removal of the sealed portion of the housing (e.g., circuitry housing portion and/or other sealed portions) from the fluid channel exposes the paddle wheel device 308. When exposed the paddle wheel device may be removed, replaced, portions replaced (e.g., one or more blades) and/or other maintenance preformed relative to the paddle wheel device. For example, the housing may include a pair of recesses 614 to each receive a portion of the axle, one of the posts 315 and/or a one or more bushings 612 that cooperate with the posts 315.

The axle, posts and/or bushings may be placed within the recesses and maintained in position when the sealed portion of the housing is secured with the flow chamber portion. In some embodiments, one or more bushings, bearings and/or other such systems may be cooperated with the paddle wheel device to provide an improved rotation of the paddle wheel device and/or provide added protection and improved longevity of operation.

Figure 7:
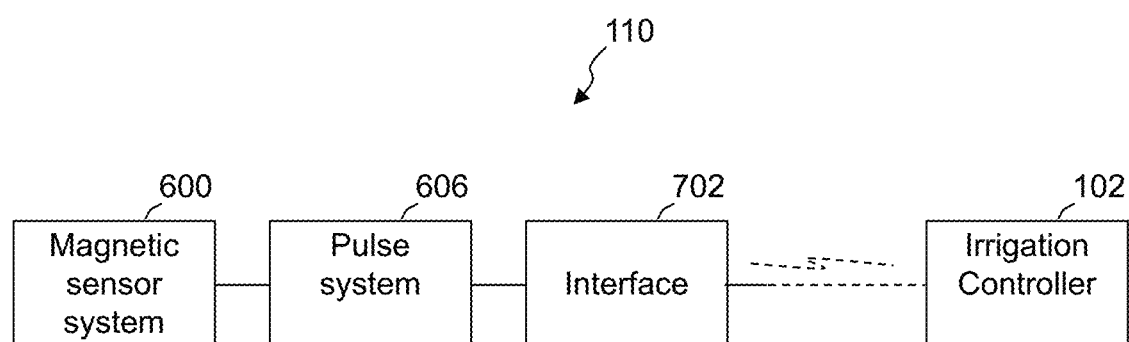
FIG. 7 illustrates a simplified circuit diagram of an exemplary flow sensor system, in accordance with some embodiments.

FIG. 7 illustrates a simplified circuit diagram of an exemplary flow sensor system 110, in accordance with some embodiments. Referring to FIGS. 2-7, in this embodiment, the flow sensor system 110 includes at least one magnetic sensor system 600 coupled with a pulse system 606. Some embodiments include more than one magnetic sensor system at least providing some redundancy. The magnetic sensor system includes one or more magnetic sensors. At least a portion of the magnetic sensor system 600 is positioned adjacent the path of the one or more magnetic elements 314 as the paddle wheel device 308 rotates. The magnetic sensor system is configured to induce an output or modify an output (e.g., modify a voltage or current) in response to at least one of the magnetic elements 314 passing within a threshold distance. In some instances, the magnetic sensor system outputs a change in state, a pulse or other sensor output signal that is detected by the pulse system 606 that controls an output pulse. This output pulse can be communicated through a communications interface 702 or other relevant interface that communicatively couples the flow sensor system 110 with the separate irrigation controller 102 or other external system. In some embodiments, the communications interface includes conductive pads that can be electrically connected with wires extending from between the flow sensor system and the irrigation controller. Additionally or alternatively, the communications interface 702 can include one or more wired and/or wireless transceivers 111 that wirelessly communicates with the irrigation controller 102 (e.g., through a wireless transceiver 124 of the irrigation controller), and/or other external system. The sensor output pulses can be wireless communicated through the wireless transceiver 111. The wireless protocol can be relatively low power wireless communication (e.g., Wi-Fi, Bluetooth, etc.), cellular, radio frequency, optical, other such wireless communication protocols, or a combination of two or more of such communication protocols. The magnetic sensor system 600 can be substantially any relevant sensor system configured to detect and/or respond to the presence and/or absence of a magnetic element within a threshold distance of the magnetic sensor system. For example, the magnetic sensor system may include one or more Hall effect magnetic sensor systems or other relevant sensor systems.

Figure 8A:
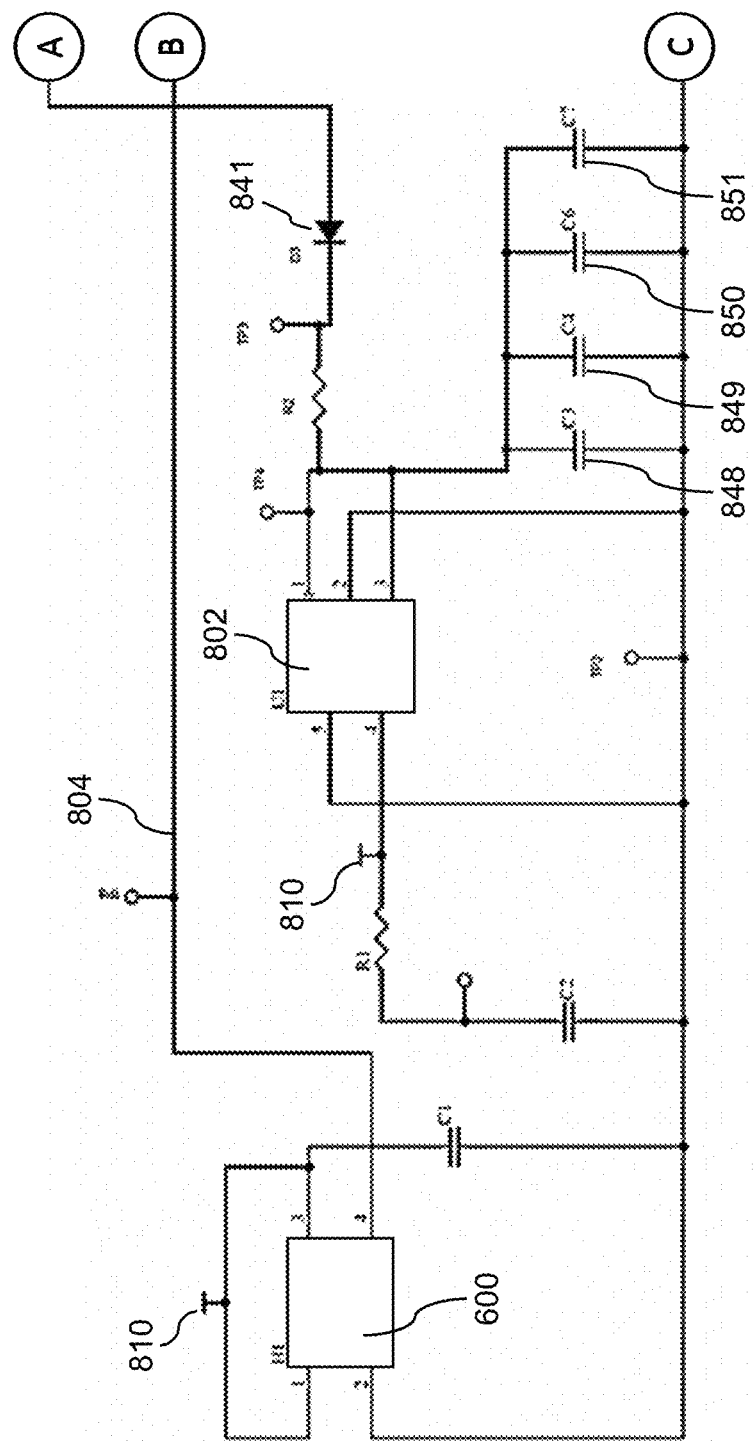
FIGS. 8A-8B illustrate a simplified circuit diagram of an exemplary sensing circuit of an exemplary flow sensor system, in accordance with some embodiments.
Figure 8B:
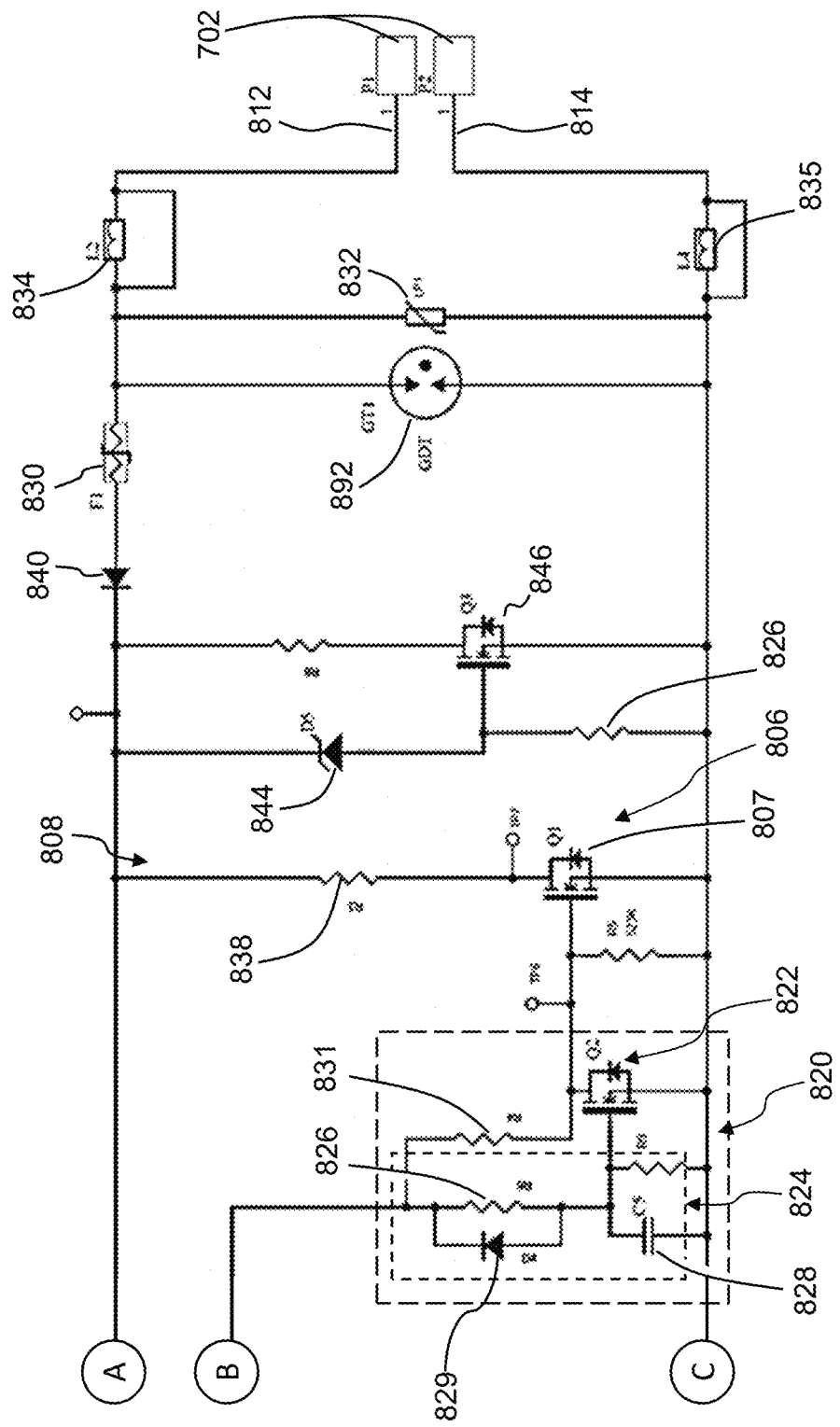

FIGS. 8A-8B illustrate a simplified circuit diagram of an exemplary sensing circuit of an exemplary flow sensor system 110, in accordance with some embodiments. The flow sensor system 110 includes the magnetic sensor system 600 coupled with the pulse system 606. The communications interface 702 enables coupling of the flow sensor system 110 with one or more separate systems, such as one or more irrigation controllers 102, other control system, and/or other such system that can utilize flow data. In some embodiments, the magnetic sensor system 600 includes a Hall effect sensor, such as a Hall effect sensor from Ablic, Inc. of Chiba Japan. The Hall effect sensor can be used in cooperation with at least one pair of magnetic elements 314, which in some instances are positioned on opposite blades 310 of the paddle wheel device 308 (e.g., approximate 180 degrees separation). Other embodiments may include two or more pairs of magnetic elements. A first magnetic element can, in some implementations, induce the Hall effect sensor to generate a first or an activate state output, change to an output, a sensor pulse output signal, or other such sensor output until a second magnetic element of the pair is sensed to cause the Hall effector sensor to transition to a deactivated state changing the sensor output to a second state, stopping the output signal or other such change. As such, the Hall effect sensor changes the sensor output to a second state in response to the second magnetic element being sensed by and/or passing the Hall effect sensor following the activation of the sensor output in the first state in response to the first magnetic element being sensed by the Hall effect sensor (e.g., within a threshold distance range of the Hall effect sensor). Further, in some embodiments, the magnetic elements of the pair of magnetic elements are configured to have different magnetic polarities (or positioned with opposite magnetic polarities closed to the magnetic sensor when passing the magnetic sensor) to be sensed by the Hall effector sensor. Some embodiments include a power or voltage supply circuit or source 802 that is electrically coupled with the magnetic sensor system 600 to provide a substantially constant supply voltage 810 (e.g., does not fluctuate more than a threshold variation from an intended voltage) to the magnetic sensor system. A magnetic sensor output 804 of the magnetic sensor system 600 couples with a pulse system 606. The one or more Hall effect sensors, in some embodiments, are implemented through one or more dual channel Hall effect sensor (e.g., from Asahi-Kasei or other dual channel Hall effect sensor from another manufacturer) enabling the detection of flow in both directions through the flow sensor systems 110 (e.g., forward and reverse flow). Logic within the controller of the irrigation controller or other device coupled with the flow sensor system 110, in some embodiments, utilizes the reverse flow information to detect one or more conditions, such as detecting when municipalities have a disruption in service, a backflow is occurring, and/or other such conditions. In some embodiments, the dual channel Hall effect sensor includes an additional lead that couples with the irrigation controller or other device to indicate a direction of rotation (e.g., a 0 indicates a first direction of rotation, and a 1 indicates the opposite direction of rotation).

In some embodiments, the pulse system includes a pulse switch 806 is electrically coupled with the magnetic sensor output 804 to receive sensor output corresponding to the magnetic sensor system sensing and responding to a magnetic element 314 cooperated with the paddle wheel device 308. In some embodiments the sensor output transitions between two states in response to two different magnetic elements on different blades being detected. Further, in some implementations, the transition between different states products a signal that is a pulse between the two states. The pulse switch 806 couples with a current loop 808 that is electrically coupled with the communications interface 702. In response to the magnetic sensor output 804 being in the first state, the pulse switch 806 can cause a change in current through the current loop 808 that is detected through the communications interface 702. The communications interface couples with the current loop and enables an external irrigation controller or other external system to communicatively couple with the flow sensor system 110 and receive flow rate data corresponding to the frequency of the transitions between the different states of current flow (e.g., first current flow value and the second current flow value) within the current loop that corresponds to the flow rate of the fluid flowing through the flow conduit. For example, an irrigation controller 102 can couple with the communications interface 702 and supply an activation signal (e.g., an activation current) to the communications interface to activate the fluid flow sensor system 110. The current is received at an input 812 of the communications interface 702 that drives the current loop 808. In response to the sensing of the magnetic element 314, the magnetic sensor system 600 provides the sensor output at a first state and/or outputs a pulse. The sensor output at the first state triggers the pulse switch 806 that in turn causes a modification of current flow through the current loop 808. In some embodiments, the sensor output from the magnetic sensor system triggers the pulse switch 806 to temporarily alter the current within the current loop. Some embodiments induce an increase in current in the current loop, such as increased at least a predefined amount, while in other implementations the current may be interrupted or otherwise modified. This change in current can be detected by the external irrigation controller 102. In other embodiments, the flow sensor system wirelessly communicates the flow rate data consistent with the frequency of the transitions between the second current flow and the first current flow value, and corresponding to the flow rate of the fluid through the flow sensor system.

In some embodiments, the voltage supply circuit 802 is further electrically coupled to receive an input current and/or voltage and generates a substantially constant voltage. In some applications, this input current and/or input voltage is based on the current and/or voltage supplied by the irrigation controller through the communications interface 702. When activated, the voltage supply circuit generates a substantially constant supply voltage 810 that is applied to the magnetic sensor system 600 (e.g., one or more Hall effect sensors, reed switch sensor, other such proximity sensors) to power the magnetic sensor system. In some embodiments, the current and/or voltage supplied by the irrigation controller 102 is used, in part, to provide the input current and/or voltage to the voltage supply circuit.

The magnetic sensor system is activated to respond to or otherwise detect the one or more magnetic elements 314 as the magnetic elements rotate to move within a threshold distance of the magnetic sensor system in response to the flow of fluid within the fluid channel 302. The magnetic sensor system, in some embodiments, generates a pulse sensor output in response to the sensing of each magnetic element passing within and/or through a threshold range or arc of the magnetic sensor system. In other embodiments, the magnetic sensor system is activated to provide a change to a first state of the sensor output in response to a first magnetic element, of a pair of magnetic elements each positioned on opposing blades of the paddle wheel device passing within and/or through the threshold range or arc of the magnetic sensor system, and causes the sensor output to transition to a second state and/or deactivates the sensor output in response to the second magnetic element of the pair of magnetic elements passing within and/or through the threshold range or arc of the magnetic sensor system. Further, in some implementations, the first and second magnetic elements of the pair of magnetic elements are positioned to have opposite magnetic polarities closest to the magnetic sensor as the first and second magnetic elements sequentially and repeatedly pass the magnetic sensor in response to the rotation of the blades caused by the flow of fluid through the flow sensor system. Accordingly, the magnetic sensor system generates a series of changes in state of the sensor output while the magnetic sensor system is active and the paddle wheel device rotates in response to the flow of water through the flow sensor system 110.

The series of changes in state from the magnetic sensor system 600 repeatedly activate the pulse switch 806 to repeatedly alter the current in the current loop, such as driving the current to a high state and/or increasing the current, resulting in a detectable change in current at an output 814 of the communications interface 702. For example, the pulse switch 806 can be activated in response to each change in state of the sensor output, causing the pulse switch 806 to transition to an activate state to temporarily change (e.g., increase) the current in the current loop 808 in response to the pulse output from the magnetic sensor. This causes the current in the current loop to vary typically by a threshold amount, such as between approximately a first or non-active current flow value (e.g., a "low" current flow value) when the pulse switch is in a non-active state (e.g., corresponding to when a magnetic element is not sensed by the magnetic sensor system or when a second magnetic element having a second magnetic polarity is within a threshold distance of the magnetic sensor), and approximately a second or active current flow value (e.g., "high" current flow value) when the pulse switch is in the active state based on the sensor output generated by the magnetic sensor of the magnetic sensor system 600 (e.g., in response to sensing the magnetic element passing and/or being within a threshold distance of the magnetic sensor 604, or when a first magnetic element having an opposite first magnetic polarity is within a threshold distance of the magnetic sensor).

This change in current at the output 814 is detectable by the irrigation controller 102. The irrigation controller can track the number of detected pulses or threshold changes in current that occur over one or more threshold periods of time to determine a rate of flow of the water or other fluid through the fluid channel 302, and thus the corresponding irrigation conduit 106. Again, in some embodiments, a first magnetic element 314, of a pair of opposite magnetic elements positioned on opposing blades 310, positioned to provide a first magnetic polarity (e.g., a "north" or positive magnetic polarity), activates the magnetic sensor system to output the sensor output at a first state, while the second magnetic element of the pair of opposite magnetic elements is positioned to provide a second opposite magnetic polarity (e.g., a "south" or negative magnetic polarity) that deactivates the magnetic system of the magnetic sensor system causing a change to a second state of the sensor output. Accordingly, in this implementation, the sensor output is, in some implementations, active for approximately a half rotation of the paddle wheel device 308, and deactivated for approximately the other half of the rotation of the paddle wheel device.

In some embodiments, the pulse switch 806 includes one or more pulse switch transistors 807 coupled with the magnetic sensor output 804 of the magnetic sensor system 600. Further, in some implementations, the magnetic sensor output 804 is coupled with the gate of the one or more pulse switch transistors of the pulse switch 806, which are coupled with the current loop 808. The changes in state can provide pulses on the gate of the one or more pulse switch transistors 807 induces the change in current within the current loop. In some embodiments, the one or more pulse switch transistors 807 are activated to cause the transition to the active state and to cause the transition to the active current flow value (e.g., an increase in current draw or consumption from none or a quiescent current) within the current loop 808 in response to each transition to a first state of the sensor output from a magnetic sensor 604 triggered in response to each detection by the magnetic sensor of at least a first magnetic element having a first magnetic polarity passing the magnetic sensor. As described above, some embodiments include a second magnetic element having an opposite magnetic polarity that causes the magnetic sensor system to transition to a second state (e.g., deactivates the magnetic sensor) and change the sensor output to the second state in response to the magnetic sensor detecting the second magnetic element. Typically, this second magnetic element has the opposite magnetic polarity and is cooperated with a blade 310 that is directly opposite to the blade with which the first magnetic element is cooperated. Other embodiments include multiple magnetic elements in the paddle wheel device, and the sensor output is generated or changed in response to the magnetic sensor detecting each of the multiple magnetic elements.

Again, the transition or change in current in the current loop 808 is detected by an irrigation controller 102 (or other controller) coupled with the input 812 and output 814 of the communications interface 702. In some embodiments, the irrigation controller or other controller tracks the pulses or change in current over time to identify a frequency of the pulses corresponding to the frequency the magnetic elements 314 are detected by the magnetic sensor system 600. As such, a frequency of the transitions between the first or non-active current flow value and the second or active current flow value correspond to a flow rate of the fluid flowing through the fluid channel 302. In some embodiments, the sensor output signal from the magnetic sensor system 600 is conditioned by the magnetic sensor system and/or other circuitry of the flow sensor system 110 to produce a pulse signal of fixed width and/or duration up to a frequency of $F=1/(2*t)$ where t is the pulse width in seconds. The sensor output signal is received by the pulse switch 806 that drives the current loop to enable and control the current in the current loop.

It was further identified that in some instances the paddle wheel device 308 may stop moving while a magnetic element 314 is within a threshold distance of the magnetic sensor system 600, which can activate the magnetic sensor system to be maintained in a fixed state (e.g., continue to generate a single continuous sensor output signal) that is not consistent with a pulse (e.g., a pulse has less than a threshold duration, which corresponds to a rate of rotation of the paddle wheel device, while in a predefined state or voltage level). Because the paddle wheel device has stopped, the magnetic element continues to be within the threshold distance and accordingly the magnetic sensor system continues to provide a sensor output in the fixed state (e.g., continues to generate the single sensor output signal) as a continuous signal instead of varying over time or a pulse. The continuous state output signal could continue to maintain the pulse switch 806 in an activate state resulting in an inaccurate indication to the irrigation controller.

Some embodiments, however, include a timeout circuit 820 that is electrically coupled with the pulse switch 806 and provides a timeout override that can override the sensor output and thus the pulse switch in response to the magnetic sensor system 600 continuing to be in an activate state (e.g., in response to continuing to detect a magnetic element) for at least a timeout or override threshold period of time and generating the continuous active state output signal for at least the timeout threshold period of time. The timeout circuit 820 is configured to force the pulse switch 806 from the active state to the non-active state overriding the sensor output signal and causing a change from the active current flow value and allowing or causing the non-active current flow value within the current loop 808, in response to the magnetic sensor output 804 being in a first or active state for more than a timeout threshold period of time (e.g., in response to a first magnetic element being within a threshold distance of the magnetic sensor). As such, the timeout circuit 820 provides a timeout override that can override the continuous sensor output 804, and in some embodiments force the pulse switch 806 to the non-active state.

In some embodiments, the timeout circuit 820 includes one or more timeout transistors 822 coupled with the gate of one or more of the pulse switch transistors 807 of the pulse switch 806. The timeout transistor 822 is configured to override the extended or continued activation of the pulse switch transistor 807 caused by the magnetic sensor when one of the sensor output signal from the magnetic sensor is active at a first or detection state (e.g., corresponding to a first magnetic element being within the threshold distance of the magnetic sensor and detected by the magnetic sensor) for more than the timeout threshold period of time. As such, in some applications, the timeout transistor draws the current induced by the sensor output signal in an activate state and thus drops the voltage at the gate of the pulse switch transistor below a gate voltage threshold, shifting the state of the pulse switch transistor 807 to a non-active state and enabling the current in the current loop to return to the non-active current flow value, which in some embodiments can be zero or a lower quiescent current (e.g., 0.6 V).

In some embodiments, the timeout circuit 820 dictates the timeout threshold based on a resistance-capacitance (RC) time constant defined by one or more resistance-capacitance circuits 824 of the timeout circuit 820. As such, the timeout circuit 820 can include one or more RC circuits 824 each comprising one or more timeout resistors 826 coupled with one or more timeout capacitors 828. The RC circuit 824 couples with the timeout transistor 822. Again, the RC time constant of the RC circuit 824 at least in part defines the timeout threshold period of time. In some embodiments, the gate of the timeout transitory is coupled between the timeout resistor and the timeout capacitor. The timeout threshold can be set depending on one or more expected flow rates of fluid through the fluid channel 302 and/or an expected rate of spin of the paddle wheel device based on an expected flow rate. In some applications, for example, the RC circuit 824 may establish a timeout threshold of less than 1 second, while in other implementations the timeout threshold may be less than 1 milliseconds. As one specific example, the timeout threshold can be established as less than approximate 6 milliseconds. Some embodiments set a timeout threshold of approximate 5.5 milliseconds providing a pulse output square wave with a maximum duty cycle of 5.5 milliseconds before the timeout circuit is triggered to cause the transition of the pulse switch 806 to the non-active state (e.g., frequency $(F)=1/(2*t)$, where t is the pulse width time).

Some embodiments further incorporate one or more RC circuit diodes 829 to provide protection, for example, against a user hooking the flow sensor system 110 backwards to the irrigation controller (e.g., inadvertently hooking the output 814 to receive the input current and/or voltage signal from the irrigation controller). In some implementations, the RC circuit diode 829 can be coupled in parallel with the timeout resistor 826. Further, in some applications, the RC circuit diode 829 can provide protection to ensure proper directional current flow through the timeout circuit 820. In some embodiments, a current limiting resistance 831 can be included to couple between the sensor output 804 and the pulse switch transistor 807 and/or the timeout transistor 822, and limit current to the one or both the transistors.

The flow sensor system 110, in some application, further includes one or more protection components and/or circuits to provide protection to one or more of the pulse switch 806, the timeout circuit 820, the voltage supply circuit 802, and/or the magnetic sensor system 600. For example, the current loop 808 can be configured to include one or more voltage protection circuits and/or components configured to protect at least the pulse switch 806 from an input voltage received at the communications interface 702 that is greater than an input voltage threshold. As one, non-limiting example, a voltage protection circuit can include one or more input fuses 830 coupled to the input 812 of the communications interface 702 to provide protection against voltage and/or current surges (e.g., caused by lightning strikes, and other causes). The fuse 830 may be a resettable fuse or automatic reset fuse. In some embodiments, the voltage protection circuit may additionally or alternatively include one or more varistors (MOVs) 832 coupled across the current loop to provide voltage protection, which can be tuned and/or selected for an expected input voltage (e.g., approximately 33 V). The varistor 832 can in part dump out excess voltage (e.g., as a result of a lightning strike). Some embodiments additionally or alternatively include one or more current protection circuits and/or components configured to protect at least the pulse switch 806 from an input current received at the communications interface that is greater than an input current threshold. For example, the current loop 808 may include current protection. In some implementations, the current protection circuit can include one or more inductors 834-835 that at least in part provide current surge protection as a result of rapidly changing current through the current loop (e.g., a change that exceed a threshold rate of change). Protection circuitry may, in some embodiments, include a crowbar circuit to provide at least some protection for the flow sensor systems 110 being coupled to an incorrect input and/or over voltage condition, such as incorrectly being coupled with a 24 VAC overvoltage condition and/or other such in over voltage conditions.

Some embodiments further include one or more gas discharge tubes 892 coupled across the communications interface 702 providing additional voltage surge protection. In some instances, the one or more gas discharge tubes may be incorporated into the circuit in place of one or more surface mount MOVs and/or in cooperation with one or more MOVs (e.g., varistor 832). The communication interface 702 can be implemented though simple soldering of lead lines to a circuit board, a physical connector that receives lead lines, other such interfaces, or a combination of two or more communication coupling interfaces. Some embodiments include one or more input inductors 834 that at least in part provide current surge protection as a result of rapidly changing current through the current loop (e.g., a change that exceed a threshold rate of change), followed by one or more input fuses 830 coupled to provide at least some protection against voltage and/or current surges (e.g., caused by lightning strikes, and other causes). The fuse 830 may be a resettable fuse or automatic reset fuse. The varistor 832 and/or one or more gas discharge tubes 892 may couple across the input and output following the input inductor 834 and prior to the output inductor 835.

One or more pulse switch protection resistors 838 may be included to limit current to the pulse switch 806. Further protection for the voltage supply circuit 802, pulse switch 806 and/or the current loop 808 may be provided through one or more diodes. Some embodiments incorporate one or more back-feed diodes 840-841 that limit or avoid back-feed of voltage. Some embodiments incorporate protection circuitry for the voltage supply circuit. For example, a source diode 844 in cooperation with a supply protection switch 846 can be included to limit operating voltage applied to the voltage supply circuit. In some instances, the supply protection switch 846 includes one or more transistors (e.g., FET transistors) coupled between the voltage input to the voltage supply circuit 802 and ground or output line of the flow sensor system 110. Further, the supply diode 844 can include, for example, a Zener diode that is coupled with a gate of the supply protection transistor incorporated to provide overvoltage protection. In some embodiments, for example, the supply protection switch 846 and the supply diode 844 provide a protection of a 33 V input voltage to voltage supply circuit and limit current resulting from a voltage above 33 V from being applied to the voltage supply circuit. For example, some irrigation controllers apply a 48 VAC peak to peak voltage to the input 812 of the interface and the supply diode 844 can limit the voltage and dump current down to the limit voltage (e.g., to 33 V). Additional protection for frequency oscillation may be provided for the voltage supply circuit 802. In some embodiments, for example, one or more capacitors 848-851 may be coupled between an input of the voltage supply circuit 802 and the output 814 and/or a ground to provide protection for frequency oscillation on the input line of the voltage supply circuit 802, which may adversely interrupt the power from the voltage supply circuit, by back feeding power to the input of the voltage supply circuit. The capacitance of the multiple capacitors 848-851 can be substantially any capacitance to achieve the desired protection. For example, in some embodiments, the capacitors can include a 1 nF capacitor coupled in parallel with two or more 4.7 nF capacitors.

In some embodiments, the detection of one of the one or more magnetic elements 314 by the magnetic sensor system 600 triggers the change in state of the sensor output that activates the pulse switch 806 to cause the threshold change of the current within the current loop 808 to transition to the active current flow value (e.g., increase, and typically increase by a threshold amount). This change in current in the current loop is detected by the separate irrigation controller 102 through the output 814 of the communications interface 702. The sensor output 804 can further be coupled, in some embodiments, with the drain of the timeout transistor 822. Should the sensor output from the magnetic sensor system 600 stay in an activate state longer than the timeout threshold period of time, which is defined by the timeout RC circuit 824, the timeout transistor 822 is triggered to disable the pulse switch transistor 807 so that the pulse switch 806 transitions back to the non-active state and current returns to the non-active current flow value (e.g., a lower quiescent current) through the current loop.

Further, in some embodiments, the size of the one or more magnetic elements 314 and/or the magnetic field of the one or more magnetic elements 314 may be increased due to the differences in size between the recesses 614 of the conduit portion 322 and the diameter of the axle 312. Again, the different in size allows the axle 312 to move vertically and/or horizontally within the recess 614, which can result in movement of the rotational path of the magnetic elements 314. The size of the one or more magnetic elements 314 and/or the magnetic strength of the one or more magnetic elements 314 may be increased in attempts to ensure the magnetic elements 314 are accurately detected by a magnetic sensor system of the flow sensor system 110.

Figure 8C:
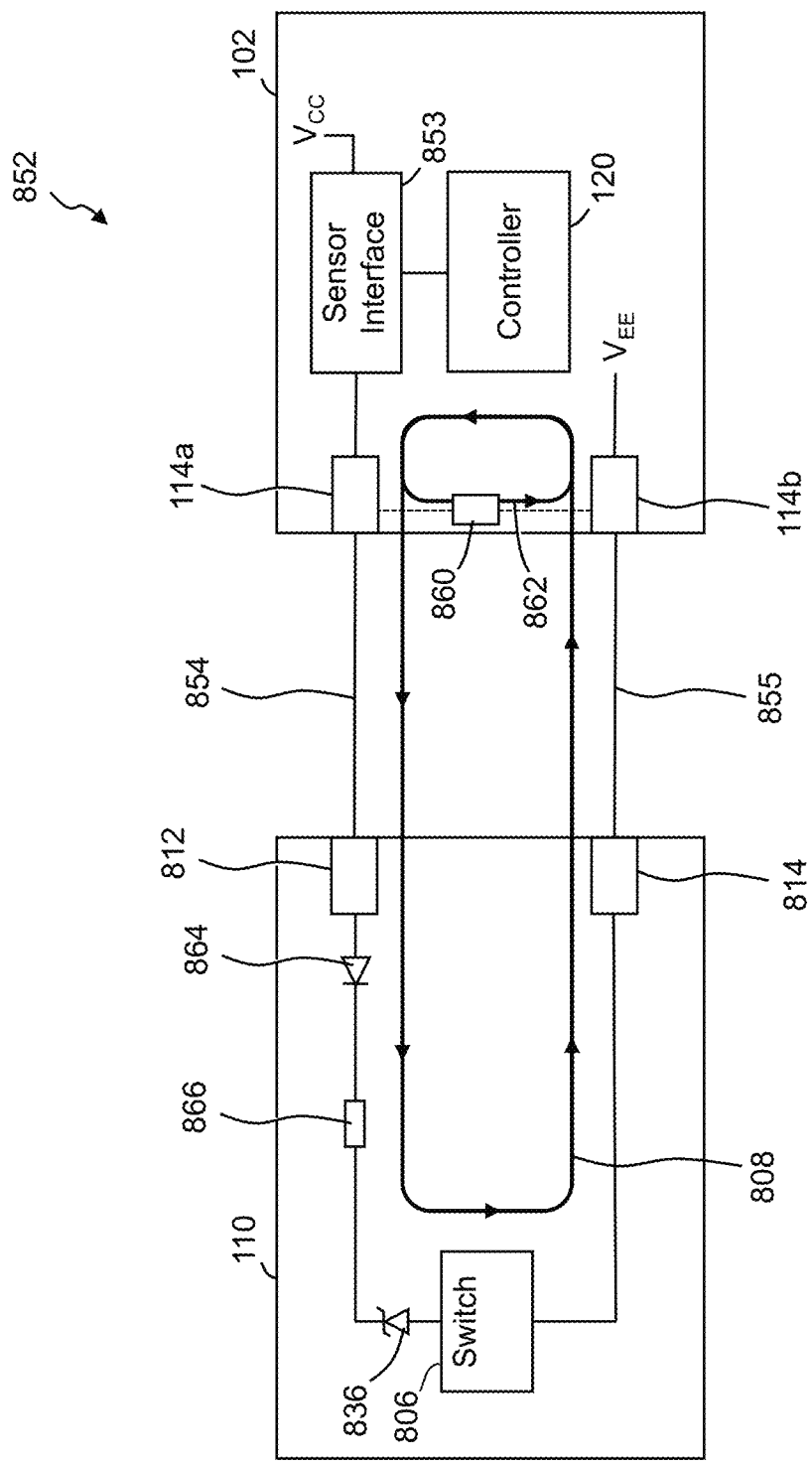
FIG. 8C illustrates a simplified block diagram of an exemplary irrigation system utilizing a flow sensor system, in accordance with some embodiments.

FIG. 8C illustrates a simplified block diagram of an exemplary irrigation system 852 utilizing a flow sensor system 110, in accordance with some embodiments. The irrigation system includes the irrigation controller 102 that can couple with one or more flow sensor systems 110 through an interface with first and second sensor couplers 114a, 114b. The sensor couplers 114a, 114b can couple with the control circuit 120 of the irrigation controller and/or a sensor interface 853. The sensor interface 853 and control circuit 120 couple with a power source VCC and VEE (or ground). In some embodiments, the sensor interface 853 supplies electrical current and/or voltage through the sensor couplers 114a-114b to the flow sensor system 110. The sensor interface 853, in some implementations, is further configured to detect one or more threshold changes in current and/or voltage at the sensor couplers 114a, 114b and communicates the detected threshold changes as sensor data to the control circuit 120. In other instances, the control circuit 120 can be configured to detect one or more threshold changes in current and/or voltage across the sensor couplers 114a, 114b.

In some embodiments, the irrigation controller couples with the flow sensor system 110 to supply a current and/or voltage over physical lines 854-855 to couple with and drive current through the current loop 808 of the flow sensor system 110. As described above, the flow sensor system 110 can, in some embodiments, include the current loop 808 through which current flows while the irrigation controller supplies the power. In response to the magnetic sensor 604 (not illustrated in FIG. 8C) detecting a magnetic element 314 of the paddle wheel device 308, one or more pulse switches 806 are activated to cause the threshold change in current from the irrigation controller 102 and through the current loop 808. In some applications, the pulse switch 806 is activated inducing an increase of the current in the current loop to provide a threshold change in current through the current loop 808.

In some embodiments, the irrigation controller includes a current sink 860 between the output sensor coupler 114a and the input sensor coupler 114b. The current sink 860 can draw a minimal current, even when the switch 806 is active to cause the threshold change in current, and typically establishes a quiescent current about at least a secondary current loop 862 when the pulse switch 806 is in the non-active state (e.g., less than 5 milliamps, and typically less than 1 milliamp, such as 600 microamps for some applications). This maintains a minimal current flow through at least the secondary current loop 862. The activation of the pulse switch 806 to transition to the active state, in response to the detection of a first magnetic element, induces an active current flow value through the current loop 808, resulting in the detection within the irrigation controller 102 of the transition from the non-active current flow value (e.g., the quiescent current (e.g., 0.6 mA)) through the secondary current loop 862 to the active current flow value that is a threshold difference from the non-active current flow value. The current sink 860 can be implemented, in some embodiments, through one or more resistors coupled between the output sensor coupler 114a and the input sensor coupler 114b.

The change in current between the active current flow value and non-active current flow value is detected as the threshold changes in current by the sensor interface 853, which in turn notifies the control circuit 120, or is directly detected by the control circuit 120. Accordingly, in some embodiments, the control circuit 120 of the irrigation controller 102 activates the flow sensor system by causing the current to be delivered over the lines 854-855 providing power to the flow sensor system 110 and the magnetic sensor system 600. The magnetic sensor system 600 in turn controls the pulse switch 806 in response to the repeated detection of the one or more magnetic elements 314 as the paddle wheel device 308 rotates in response to the flow of fluid through the fluid channel 302. Some embodiments maintain a minimal current through the secondary current loop 862 even when the pulse switch 806 is temporarily active in response to sensor output generated by the magnetic sensor system 600 in response to the sequential detection of the one or more magnetic elements 314 as the magnetic elements and blades rotate in response to the flow of fluid. Some embodiments provide protection circuitry in the flow sensor system 110. For example, some embodiments include one or more resistors 866 and/or diodes 864. The one or more resistors 866, in some embodiments, coupled in series with one or more diodes 864 to at least in part limit current, and provide protection for a flow of current so that the current cannot be reversed. Additionally or alternatively, the protection circuitry can be included as described with reference to FIG. 8A, such as a supply diode 836 to maintain the threshold voltage supplied to the voltage supply circuit 802 at a threshold level (e.g., a breakdown voltage of 3.6 V).

Figure 9:
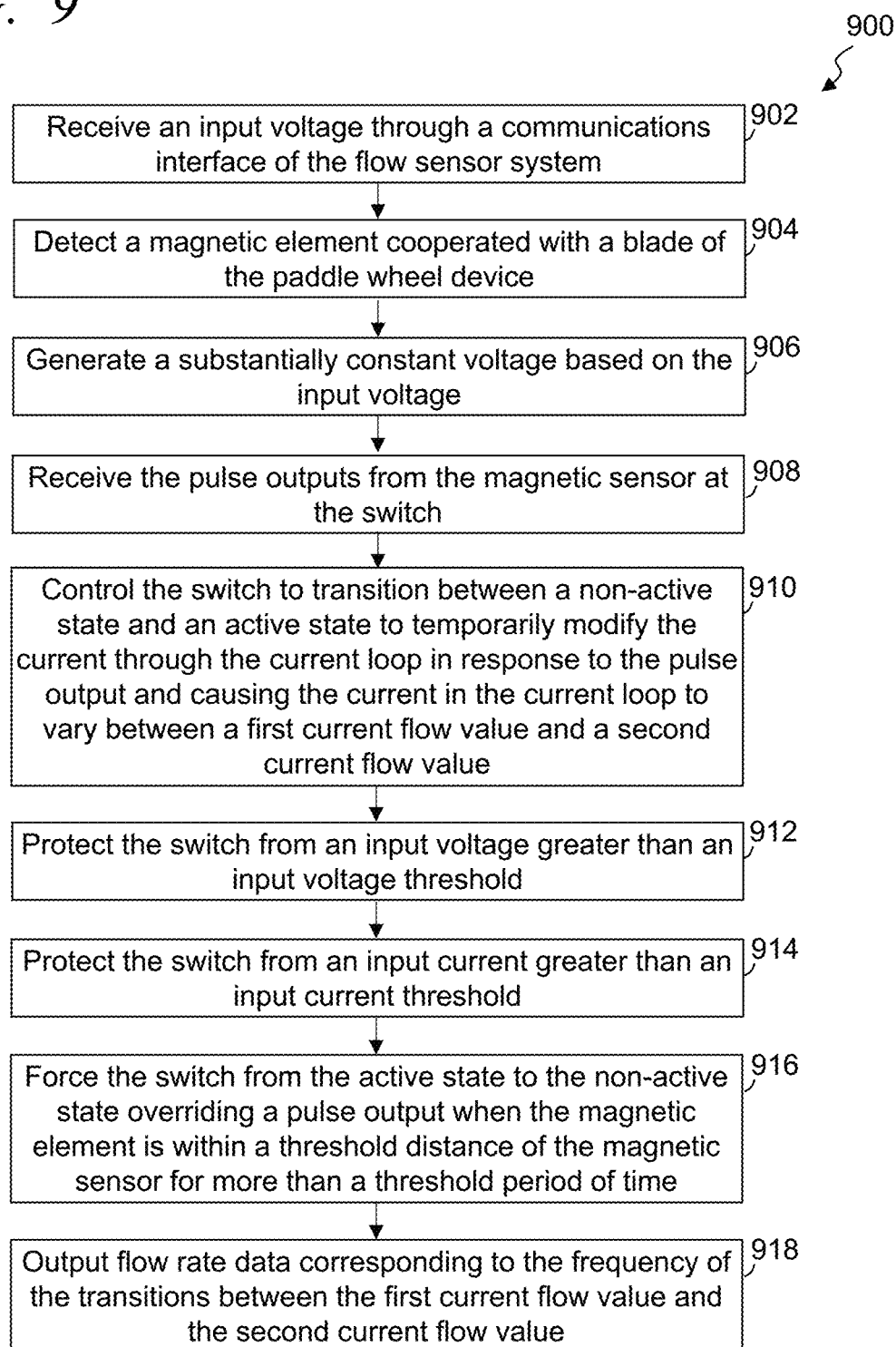
FIG. 9 illustrates a simplified flow diagram of an exemplary process of detecting and/or obtaining a rate of fluid flow through an irrigation conduit, in accordance with some embodiments.

FIG. 9 illustrates a simplified flow diagram of an exemplary process 900 of detecting and/or obtaining a rate of fluid flow through an irrigation conduit 106, in accordance with some embodiments. In step 902, an input current and/or voltage is supplied by the irrigation controller 102 and is received at the communications interface 702 of an irrigation fluid flow sensor system 110. In step 904, one or more magnetic elements 314, each cooperated with one of one or more blades 310 of a paddle wheel device 308 of the irrigation fluid flow sensor system 110, are detected. Some embodiments detect the one or more magnetic elements through one or more magnetic sensors 604 positioned proximate a rotational or circular pathway of the magnetic elements as the one or more magnetic elements move along a rotational pathway as the blades, and thus the magnetic elements, rotate about a rotational axis of the paddle wheel device in response to at least a portion of each of the blades being sequentially exposed to a flow of fluid traveling through a fluid channel 302, conduit, tube or other structure that directs the flow of fluid.

In some embodiments, the one or more magnetic sensors 604 are positioned within a sealed portion of a housing 202 of an irrigation flow sensor system 110, separated from the paddle wheel device, while still being positioned proximate to and within a threshold distance of the rotational path of the one or more magnetic elements and/or the one or more blades of the paddle wheel device 308 of the irrigation flow sensor system, and while not being exposed to the fluid passing through a fluid channel 302. The fluid channel, in some implementations, is formed in and/or as part of the housing 202. Further, the paddle wheel device 308 is positioned so that at least a portion of each of the blades 310 of the paddle wheel device consecutively extend into the fluid flow path of irrigation fluid as the blades are pushed by the fluid to rotate about the axis, in response to the irrigation fluid flowing through the fluid channel 302 of the irrigation flow sensor system. Further, in some implementations, the paddle wheel device can be exposed to a user when at least the sealed portion of the housing is removed from the fluid channel portion of the flow sensor system 110. Exposing the paddle wheel device, when the sealed portion of the housing is removed from the fluid channel portion, enables a user to check the paddle wheel device, remove the paddle wheel device, repair the paddle wheel device, remove debris interfering or adversely affecting the paddle wheel device, and/or other such maintenance.

Some embodiments include optional step 906 to generate, through a voltage supply circuit 802 electrically coupled with the magnetic sensor 604 and the communications interface 702, a substantially constant voltage, and the substantially constant voltage is supplied to the magnetic sensor and/or a magnetic sensor system 600 to power the magnetic sensor and/or magnetic sensor system.

In step 908, sensor outputs from the one or more magnetic sensor systems 600 are repeatedly received at one or more switches 806, or one or more switch circuits, each coupled with at least one of the one or more magnetic sensor systems. In some embodiments, the one or more switches are coupled with a current loop and upon activation control or cause a change in the current within the current loop. In step 910, the one or more switches are controlled by causing at least one of the one or more switches to transition between a non-active state and an active state to temporarily transition the current through the current loop between a non-active current flow value and an active current flow value in response to each change to a predefined state of the sensor output emitted based on the detection by the magnetic sensor of at least a first magnetic element, of the one or more magnetic elements 314, being within a threshold distance of the magnetic sensor. The activation of the one or more switches causes the current in the current loop to vary between a first current flow value when the switch is not active in the non-active state and a second current flow value when the switch is in the active state based on the changes in state of the sensor output. For example, in some implementations, the current within the current loop may transition from zero current in the non-active state to non-zero current in the active state, while in other instances, the current transitions from a minimal or quiescent current in the non-active state to an increased current that is at least a threshold greater than the quiescent current. Additionally, in some embodiments, the transition from the non-active current flow value to the active current flow value further causes a transition at the sensor couplers 114a, 114b of the irrigation controller (and/or the secondary current loop 862) from the non-active current flow value and/or a separate quiescent current established within the irrigation controller 102, and the active current flow value that is a threshold difference from the non-active current flow value. This threshold change in current values is detectable at the irrigation controller 102. The frequency of the transitions between the non-active current flow value and the active current flow value correspond to a flow rate of the fluid flowing through the flow conduit.

In some embodiments, the controlling of the one or more switches to transition between the non-active state and active state includes activating one or more pulse switch transistors 807 coupled with an output of the magnetic sensor in response to the triggering by each change in state of the sensor output from the magnetic sensor based on the detections by the magnetic sensor that at least a first magnetic element passes the magnetic sensor and causing the transition to the active state and the transition to the second or active current flow value within the current loop 808 established between the irrigation controller 102 and through the irrigation flow sensor system 110.

In optional step 912, the switch is protected from an input voltage, at a communications interface 702 of the flow sensor system 110, that is greater than an input voltage threshold. Some embodiments include an additional or alternative optional step 914 to protect the switch from an input current received at the communications interface that is greater than an input current threshold.

In some instances, the process includes optional step 916 where the switch is forced, through a timeout circuit 820 electrically coupled with the switch, from the active state to the non-active state overriding the state of the sensor output and the second current flow value and causing the current to flow at the first current flow value within the current loop and/or the secondary current loop 862 when a magnetic element 314 is within a threshold distance of a magnetic sensor 604 for more than a threshold period of time. The overriding of the sensor output 804, and the second current flow value, can in some embodiments include activating one or more timeout transistors 822 coupled with a gate of one or more pulse switch transistors 807, and overriding the activation of the respective pulse switch transistor by the magnetic sensor when one of the sensor outputs from one or more magnetic sensors is active at a first state, corresponding to a first magnetic element being within the threshold distance of the magnetic sensor, for more than the threshold period of time. Further, in some implementations, the activation of the timeout transistor 822 is based on a resistance-capacitance (RC) time constant of a resistance-capacitance circuit coupled with the timeout transistor. For example, in some embodiments, the RC time constant of the RC circuit can be used to define the threshold period of time.

In step 918, flow rate data is outputted and/or detected through a communications interface 702 coupled with the current loop 808. The communications interface is configured to enable an external irrigation controller or other external system to communicatively couple with the flow sensor system. The flow rate data typically corresponds to the frequency of the transitions between the first current flow value and the second current flow value within the current loop that corresponds to the flow rate of the fluid flowing through the flow conduit.

As described above, the fluid flow sensor system 110 can be incorporated into fluid flow systems where flow data can be used in part to control the fluid flow system. For example, the fluid flow sensor system 110 can be implemented in an irrigation system 100 to supply fluid flow data to one or more irrigation controllers 102 providing control over the distribution of water through the irrigation system. In some embodiments, an irrigation controller can include one or more control circuits, and a plurality of drive circuits coupled with at least one of the one or more control circuits. The control circuit can control the activation of the drive circuits. Typically, the control circuit controls irrigation by implementing one or more irrigation schedules that define start times and length of time respective one or more valves that are to be activated or opened (i.e., runtimes). The control circuit may modify one or more runtimes based on a flow rate of fluid within one or more of the fluid conduits 106. Other factors may additionally be taken into account such as but not limited to types of irrigation distribution devices (e.g., sprinklers, driplines, etc.), number of distribution devices being feed by the fluid flow at the time of determining the flow rate, other such factors, and in some instances a combination of two or more of such factors in cooperation with the flow rate.

The plurality of valves 104 communicatively coupled with the irrigation controller. In some implementations, each valve is coupled with at least one of the plurality of drive circuits and controlled by the activation of the corresponding one of the drive circuits. Further, each of the plurality of valves is cooperated with one of multiple different fluid conduits 106 through which fluid passes. One or more irrigation distribution devices 108 can be fluidly cooperated with one of the plurality of fluid conduits 106 and configured to distribute water over a corresponding portion of an area to be irrigated.

The irrigation system can further include an irrigation flow sensor system 110 that communicatively couples wired and/or wirelessly (e.g., Bluetooth, Wi-Fi, RF, cellular, Internet, LAN, WAN, etc.) with at least one irrigation controller 102. The flow sensor system 110 includes a housing that houses one or more a magnetic sensors. In some embodiments, the housing forms at least a portion of a fluid channel 302 configured to cooperate between two of the plurality of fluid conduits 106. For example, the fluid conduits may fit within a respective port 304, 306 of the flow sensor system. The conduit may be secured through compression fit, friction, epoxy, resin compression fit or the like. In other implementations, a threaded coupler 324 may fit around the conduit and threadedly secure with the flow sensor system 110 (e.g., establishing a compression fit). The fluid channel 302 of the flow sensor system transports fluid between a first port 304 and a second port 306.

The paddle wheel device 308, in some embodiments, comprises a set of two or more blades 310 configured to rotate about a rotational axis due to the water flowing through the fluid channel 302. One or more of the blades includes one or more magnetic elements 314, and in some implementations are positioned proximate a distal end of the blade away from the rotational axis. Further, the paddle wheel device is positioned within the housing 202 relative to the fluid channel such that at least a portion of each of the blades consecutively extend into the fluid channel as the blades rotate about the axis.

The flow sensor system 110 includes one or more magnetic sensor systems 600 that each include one or more magnetic sensors 604 positioned relative to the rotational path of the one or more magnetic elements as the one or more magnetic elements rotate to detect the passing of each of the one or more magnetic elements as the magnetic elements pass the one or more magnetic sensors 604. In some embodiments, the one or more magnetic sensors and/or one or more magnetic sensor systems are positioned within a sealed portion of the housing 202 that is outside of the fluid channel and yet still proximate to the pathway of the one or more magnetic elements 314 as the one or more magnetic elements rotate as a result of the flow of fluid contacting the respective blades to rotate the blades and thus the one or more magnetic elements about the axis.

In some implementations, the magnetic sensor is configured to provide a pulse output every time the magnetic element passes the magnetic sensor. In other implementations, the detection of a first magnetic element having a first polarity arrangement relative to the magnetic sensor system triggers or activates the magnetic sensor to generate the pulse output, and detection of a second magnetic element on a separate blade and having a second polarity arrangement relative to the magnetic sensor triggers the magnetic sensor to deactivate the pulse output. The repeated detection of the first then second magnetic elements results in a series of pulse sensor outputs having a frequency corresponding to the rate of flow of fluid through the fluid channel 302.

One or more pulse switches 806 can couple to the sensor output of the magnetic sensor to receive the change in states detected from the sensor output. The pulse switch can additionally be part of or couple with a current loop 808. In some embodiments, each of the one or more pulse switches can operate in an activate state and a non-active state. In the active state, the pulse switch is configured to temporarily change a current flow rate through the current loop 808 (e.g., temporarily increase the current in the current loop) in response to the change in state of the sensor output resulting in a threshold variation of the current in the current loop. In some instances, the activation of the pulse switch causes a variation of the current in the current loop between a first current flow value when the pulse switch is not active in a non-active state and a second current flow value when the pulse switch is in the active state based on the sensor output. In some implementations, for example, the first current flow value may be zero or substantially zero, while in other implementations, the first current flow value may be a relatively low quiescent current. The second current flow value, in some embodiments, results in at least a threshold increase in current through the current loop. In still other embodiments, the second current flow value in response to the activation of the pulse switch may interrupt a quiescent current in the current loop or otherwise reduce the current by a threshold amount. The frequency of the changes in state of the sensor output or pulse outputs from the magnetic sensor and the resulting transitions between the first current flow value and the second current flow value correspond to a flow rate of the water flowing through the flow conduit.

In some embodiments, the control circuit of the irrigation controller can be configured to calculate and/or determine the flow rate of the water through the fluid channel as a function of the frequency of the transitions between the first current flow value and the second current flow value. Based on the determined flow rate, the control circuit can make adjusts to one or more irrigation schedules being implemented by the irrigation controller. For example, the control circuit may be scheduled to supply a certain amount of water to a given area, and a runtime for a given valve to be maintained as open can be determined as a function of the amount of water flowing through a conduit (e.g., interior area of the conduit times the flow rate defines a quantity of water passing through the conduit). Based on a known release rate of water from the one or more water distribution devices cooperated with the one or more conduits supplied by the valve, the irrigation controller can determine how long to leave the valve open to deliver the intended quantity of water. In some embodiments, the irrigation controller stores one or more K-factor values each corresponding to tested rates of flow. The flow sensor system 110 can be tested through multiple known flow rates and measure the pulse frequency at each of the known flow rates, which can be graphically plotted. A linear best-fit curve of the plotted pulse frequencies. A slope can be determined to define the K-factor. The plot can further identify an offset of the curve (e.g., Y=mx+b, where m=K-factor, and b is an offset). This K-factor and any offset can be used by the irrigation controller to determine a flow rate based on the pulse frequency (i.e., threshold change in current in the current loop) detected by the irrigation controller. In some instances, the K-factor is determined through testing of multiple flow sensor systems, and the resulting K-factor can be defined with a relative probability that other similar flow sensor systems are expected to measure similar K-factors within the given probability of tolerance.

In some embodiments, the flow sensor system 110 includes one or more flow sensor control circuits that couple with the current loop. Based on the transition between current states in the current loop, the sensor control circuit can be configured to determine a rate of flow of the fluid through the fluid channel based on known dimensions of the fluid channel. This determined flow rate may be communicated to the irrigation controller 102 to be used by the irrigation controller in adjusting irrigation schedules. The determined flow rate may be communicated following a threshold period of time the flow rate has changed a threshold amount and for a threshold period of time (e.g., activation of a valve results in a rapid change in flow rate, typically from substantially zero to a relatively high rate). In some instances, the flow rate is tracked over a predefined period of time, multiple flow rates can be determined during that period of time and an average flow rate is determined over that period of time, and the average flow rate can be communicated to the irrigation controller. Additionally or alternatively, the flow rate may be repeatedly communicated based on a schedule. In other instances, the flow rate may be communicated to the irrigation controller in response to a threshold change in the flow rate over a predefined period of time.

Figure 10:
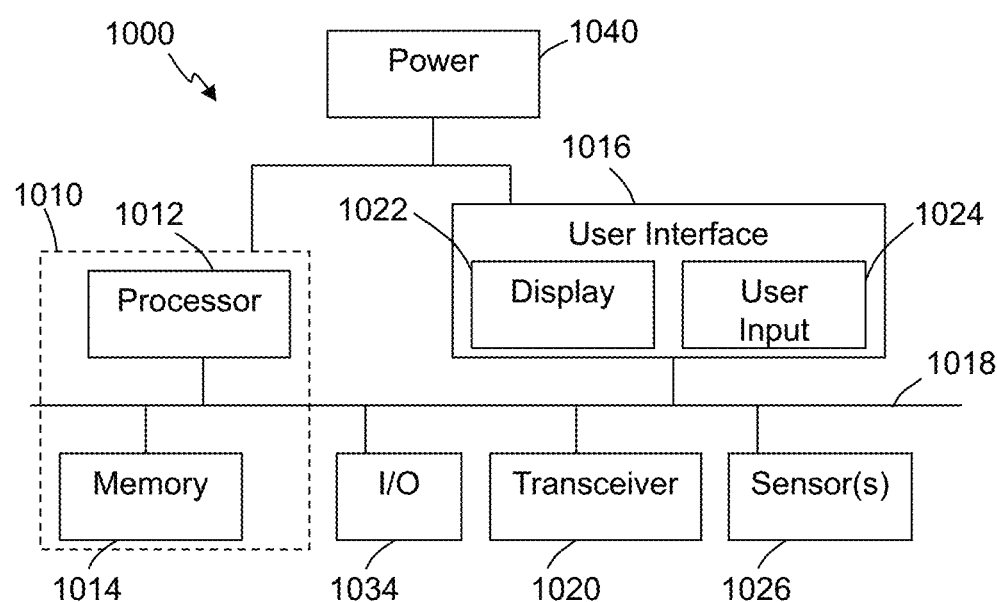
FIG. 10 illustrates an exemplary system for use in implementing methods, techniques, systems, devices, apparatuses, servers, sources and the like in providing flow sensor data and/or controlling irrigation based on flow sensor data, in accordance with some embodiments.

Further, the circuits, circuitry, systems, devices, processes, methods, techniques, functionality, services, sources and the like described herein may be utilized, implemented and/or run on many different types of devices and/or systems. FIG. 10 illustrates an exemplary system 1000 that may be used for implementing any of the components, circuits, circuitry, systems, functionality, apparatuses, processes, or devices of the irrigation system 100, irrigation controller 102, flow sensor system 110, portable user computing device 132, central irrigation controller 130, and/or other above or below mentioned systems or devices, or parts of such circuits, circuitry, functionality, systems, apparatuses, processes, or devices. For example, the system 1000 may be used to implement some or all of the irrigation controller 102, the flow sensor system 110, irrigation controller control circuit 120, a flow sensor control circuit, and/or other such components, circuitry, functionality and/or devices. However, the use of the system 1000 or any portion thereof is certainly not required.

By way of example, the system 1000 may comprise a control circuit or processor module 1012, memory 1014, and one or more communication links, paths, buses or the like 1018. Some embodiments may include one or more user interfaces 1016, and/or one or more internal and/or external power sources or supplies 1040. The control circuit 1012 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 1012 can be part of control circuitry and/or a control system 1010, which may be implemented through one or more processors with access to one or more memory 1014 that can store instructions, code and the like that is implemented by the control circuit and/or processors to implement intended functionality. In some applications, the control circuit and/or memory may be access over and/or distributed over a communications network (e.g., LAN, WAN, Internet) providing distributed and/or redundant processing and functionality.

The user interface 1016 can allow a user to interact with the system 1000 and receive information through the system. In some instances, the user interface 1016 includes a display 1022 and/or one or more user inputs 1024, such as buttons, touch screen, track ball, keyboard, mouse, etc., which can be part of or wired or wirelessly coupled with the system 1000. For example, the user interface 1016 may be a user interface of the irrigation controller 102 to enable a user to enter and/or modify one or more irrigation schedules, irrigation parameters, irrigation thresholds, water budget information, and/or other such input, and/or to acquire information displayed and/or communicated by the irrigation controller (e.g., irrigation schedules, runtimes, water usage, water budget information, etc.). Typically, the system 1000 further includes one or more communication interfaces, ports, transceivers 1020 and the like allowing the system 1000 to communicate over a communication bus, a distributed computer and/or communication network (e.g., a local area network (LAN), the Internet, wide area network (WAN), etc.), communication link 1018, other networks or communication channels with other devices and/or other such communications or combination of two or more of such communication methods. Further the transceiver 1020 can be configured for wired, wireless, optical, fiber optical cable, satellite, or other such communication configurations or combinations of two or more of such communications. Some embodiments include one or more input/output (I/O) ports 1034 that allow one or more devices to couple with the system 1000. The I/O ports can be substantially any relevant port or combinations of ports, such as but not limited to USB, Ethernet, or other such ports. The I/O interface 1034 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices. For example, the irrigation controller may include one or more I/O interfaces to receive a control stick that can provide added control and/or information to the irrigation controller. Additionally or alternatively, one or more I/O interfaces may communicatively couple with one or more sensors, such as rain sensors, the flow sensor system 110, wind sensors, light sensors, and/or other such sensors.

In some embodiments, the system may include and/or couple with one or more sensors 1026. The sensors can include substantially any relevant sensor, such as but not limited to light sensors, temperature sensors, rain sensors, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 1000 comprises an example of a control and/or processor-based system with the control circuit 1012. Again, the control circuit 1012 can be implemented through one or more processors, controllers, central processing units, logic, software and the like. Further, in some implementations the control circuit 1012 may provide multiprocessor functionality.

The memory 1014, which can be accessed by the control circuit 1012, typically includes one or more processor readable and/or computer readable media accessed by at least the control circuit 1012, and can include volatile and/or non-volatile media, such as RAM, ROM, EEPROM, flash memory and/or other memory technology. Further, the memory 1014 is shown as internal to the control system 1010; however, the memory 1014 can be internal, external or a combination of internal and external memory. Similarly, some or all of the memory 1014 can be internal, external or a combination of internal and external memory of the control circuit 1012. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory. The memory 1014 can store code, software, executables, scripts, data, patterns, thresholds, lists, programs, log or history data, and the like. While FIG. 10 illustrates the various components being coupled together via a bus, it is understood that the various components may actually be coupled to the control circuit and/or one or more other components directly.

Figure 11:
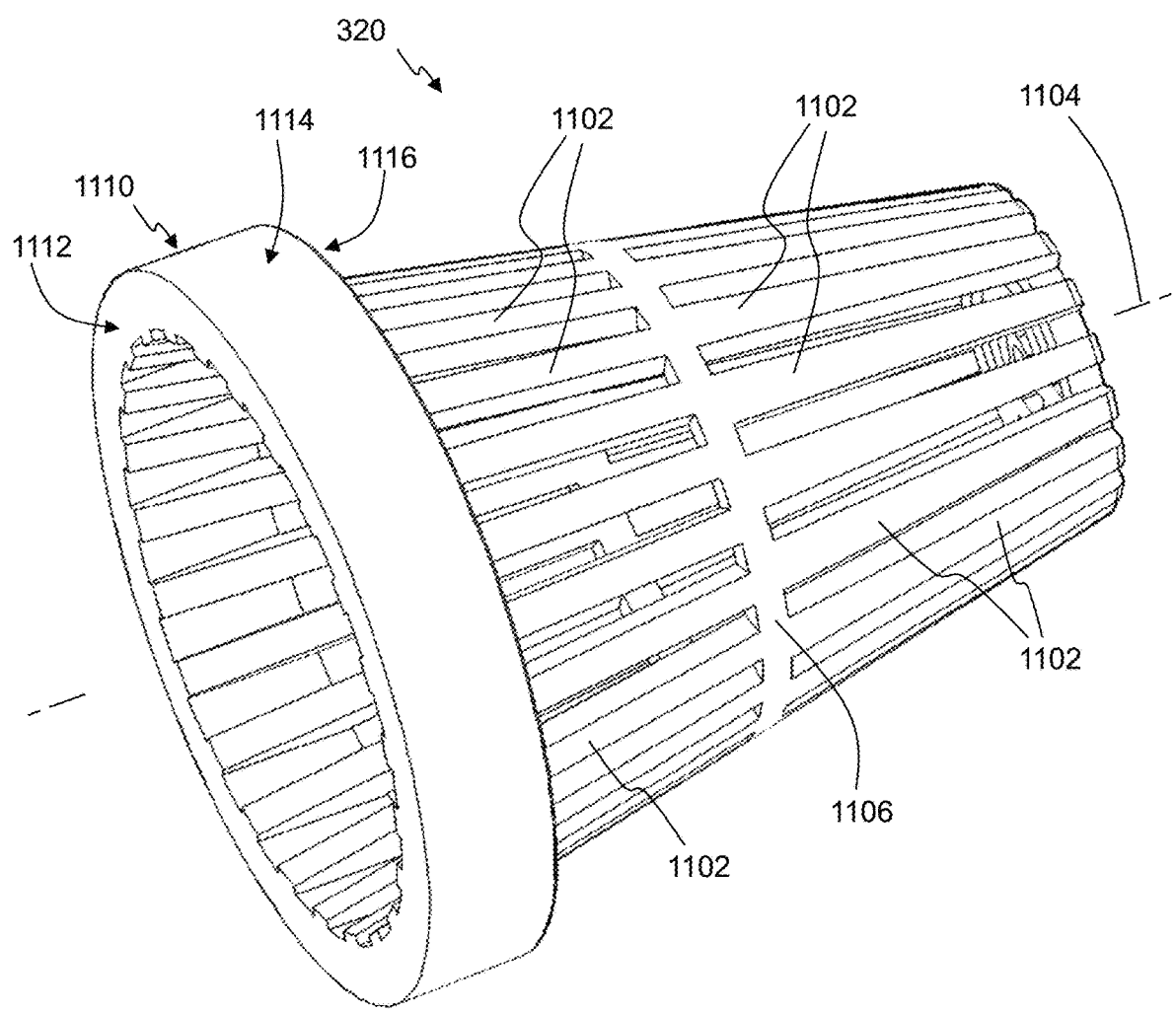
FIG. 11 illustrates a simplified perspective view of an exemplary filter, in accordance with some embodiments.

In some embodiments, as introduced above, the fluid flow sensor system can include or be cooperated with one or more filters 320, screens, meshes, and/or other such structures that can limit or prevent at least some solid objects being moved along a conduit by the fluid flow (e.g., sand, soil, pebbles, pieces of conduit, etc.). FIG. 11 illustrates a simplified perspective view of an exemplary filter 320, in accordance with some embodiments. The filter can have a cylindrical shape, a generally funnel shape, a cone shape, a disc shape, or other relevant shape. Further, the filter 320 includes an array of openings and/or apertures, through which the fluid flows, defined by an array of beams 1102. The array of beams are positioned to achieve intended sized openings to achieve a desired level of filtering (i.e., limiting solid objects that a greater than the openings from passing through the filter). In some embodiments, the filter includes two or more arrays of openings (e.g., positioned one following the other along a longitudinal axis 1104 of the filter) with a ring beam 1106 defining boundaries between the two or more arrays of openings). The multiple arrays and ring beam add addition strength and rigidity to the filter. In some applications, the filter is configured with the openings being substantial the same size at least along a length of the filter. Further, in some embodiments, the filter includes a head 1110 with an upstream face or surface 1112, a lateral surface 1114 extending around a perimeter of the head 1110, and a downstream face or surface 1116. The head 1110 can, in some applications, be used to position and secure the filter with the fluid flow sensor system 110.

Figure 12:
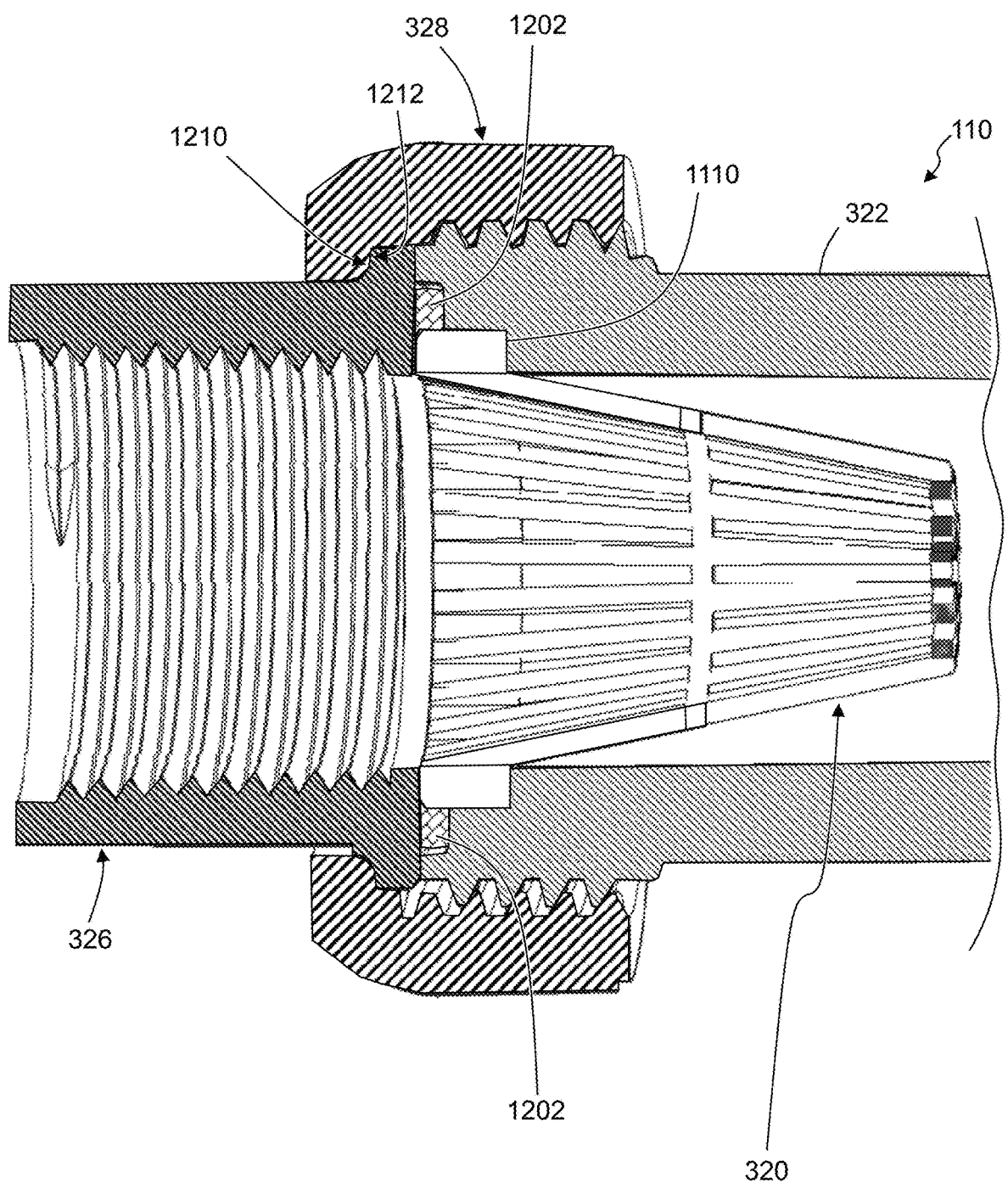
FIG. 12 illustrates a simplified, cross-sectional view of portion of a flow sensor system with a filter, in accordance with some embodiments.
Figure 13:
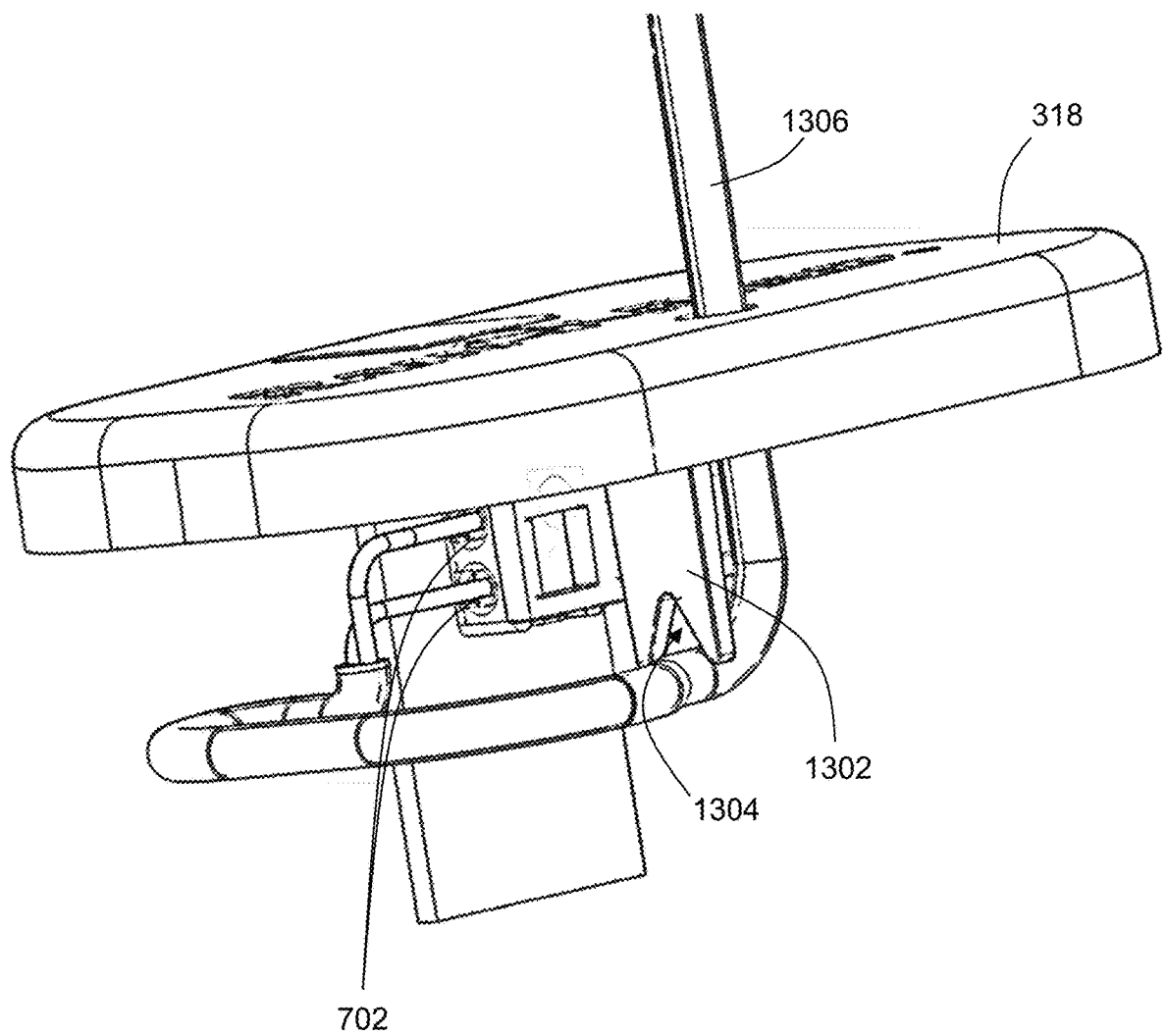
FIGS. 13-16 illustrate simplified perspective views at various different angles of an exemplary lid portion of a flow sensor system, in accordance with some embodiments.
Figure 14:
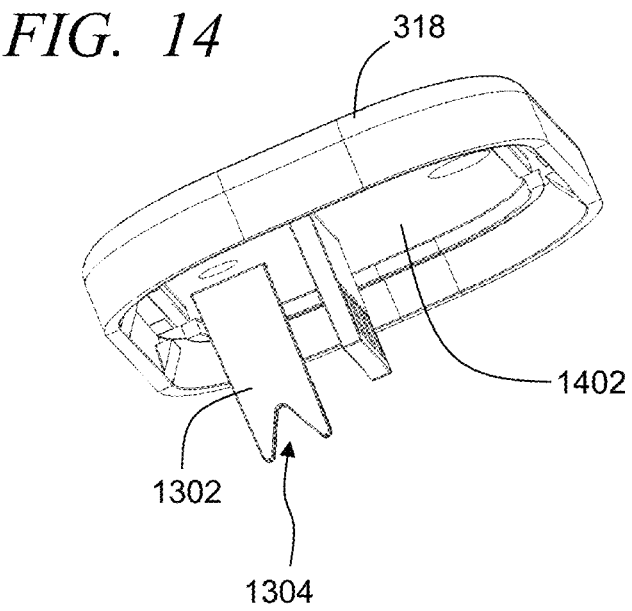
Figure 15:
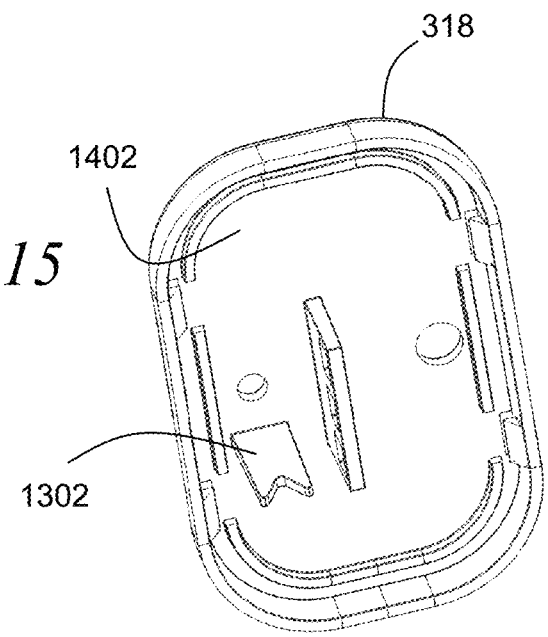
Figure 16:
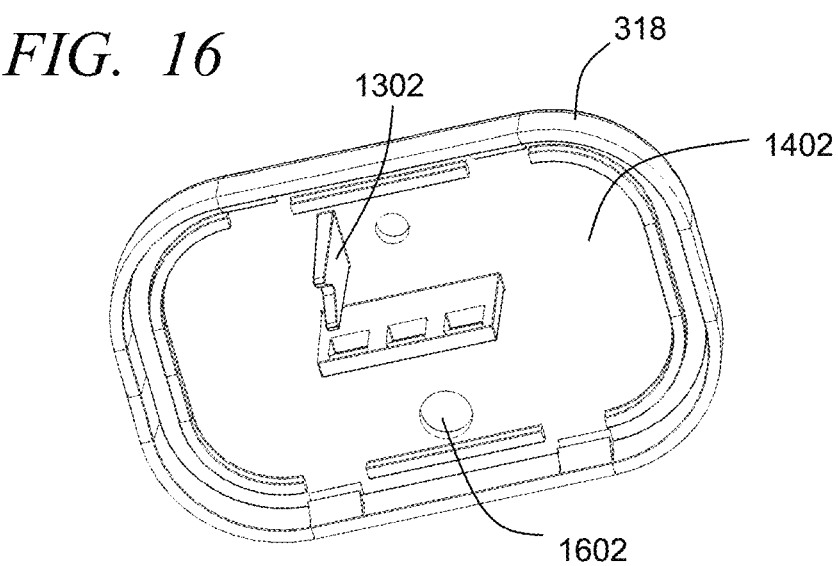

FIG. 12 illustrates a simplified, cross-sectional view of portion of a flow sensor system 110 with a filter 320, in accordance with some embodiments.

Referring at least to FIGS. 1, 3B and 12, in some embodiments, the flow sensor system 110 is cooperated along an irrigation conduit 106 through the pair of upstream conduit coupling 326 and downstream conduit coupling 327. The conduit couplings 326, 327 can each be secured with the body of the flow sensor system 110 through respective union locking ring 328, 329, for example through threading, adhesive, resin, other such methods, or combination of two or more of such methods. In some implementations, the head 1110 and/or a rim of the filter 320 is positioned and secured between the conduit portion 322 of the flow sensor system 110 and an upstream conduit coupling 326, and held in place by the conduit portion 322 and the conduit coupling 326. The upstream surface 1112 may abut against a shoulder 1210 or ledge of locking rings 328, 329, irrigation conduit, etc. Similarly, a downstream surface 1116 may abut against a surface of the conduit portion 322. Further, a portion of the filter, e.g., the head 1110, can be squeezed, pinched, clamped and/or otherwise secured to position the filter 320 within and extending across the fluid path. In some embodiments, a fluid tight seal is established through an O-ring 1202, gasket, etc. compressed between the conduit portion 322 of the flow sensor system 110, the conduit coupling 326 and the head 1110 of the filter 320. In some applications, the filter head is positioned with a portion of the lateral surface 1114 positioning, biasing and/or pressing the O-ring 1202 into an O-ring cavity formed in the conduit portion 322 of the flow sensor system 110 and/or formed between the conduit portion 322 and the conduit coupling 326.

Again, the conduit couplings 326, 327 are configured to couple, grip and/or otherwise secure with a fluid conduit (e.g., irrigation conduit 106) to cooperate and align the fluid conduit with the conduit portion 322 of the flow sensor system 110. The conduit couplings 326, 327 can be secured with the irrigation conduit 106 through friction fit, glue, resin, primer, head sealed, threaded fitting and/or other such methods. In some applications, the conduit couplings 326, 327 can be formed from polyvinyl chloride (PVC), which can allow the conduit couplings to be secured with a PVC irrigation conduit through adhesive, solvent cement, resin, other methods or a combination of two or more of such methods.

In some embodiments, the body and/or conduit portion 322, housing 202, and/or wheel mounting area 203 of the flow sensor system 110 is constructed or molded through PVC, polypropylene (PP), glass and/or fiberglass filled or infused PP (e.g., 16% glass filled PP), other plastic, fiberglass infused plastic, other materials or a combination of two or more of such materials. When formed from PP, it is noted that typical irrigation solvent cement often cannot be used to secure the conduit portion with a typical PVC conduit 106. As such, some embodiments utilize the locking rings 328, 329 that threadedly cooperate with threading on the conduit portion 322 of the flow sensor system 110 (e.g., exterior threading on the conduit portion), while the locking rings 328, 329 include a shoulder 1210 or ledge that is configured to press against and mate with a corresponding ledge 1212 of the conduit couplings 326, 327.

Figure 17:
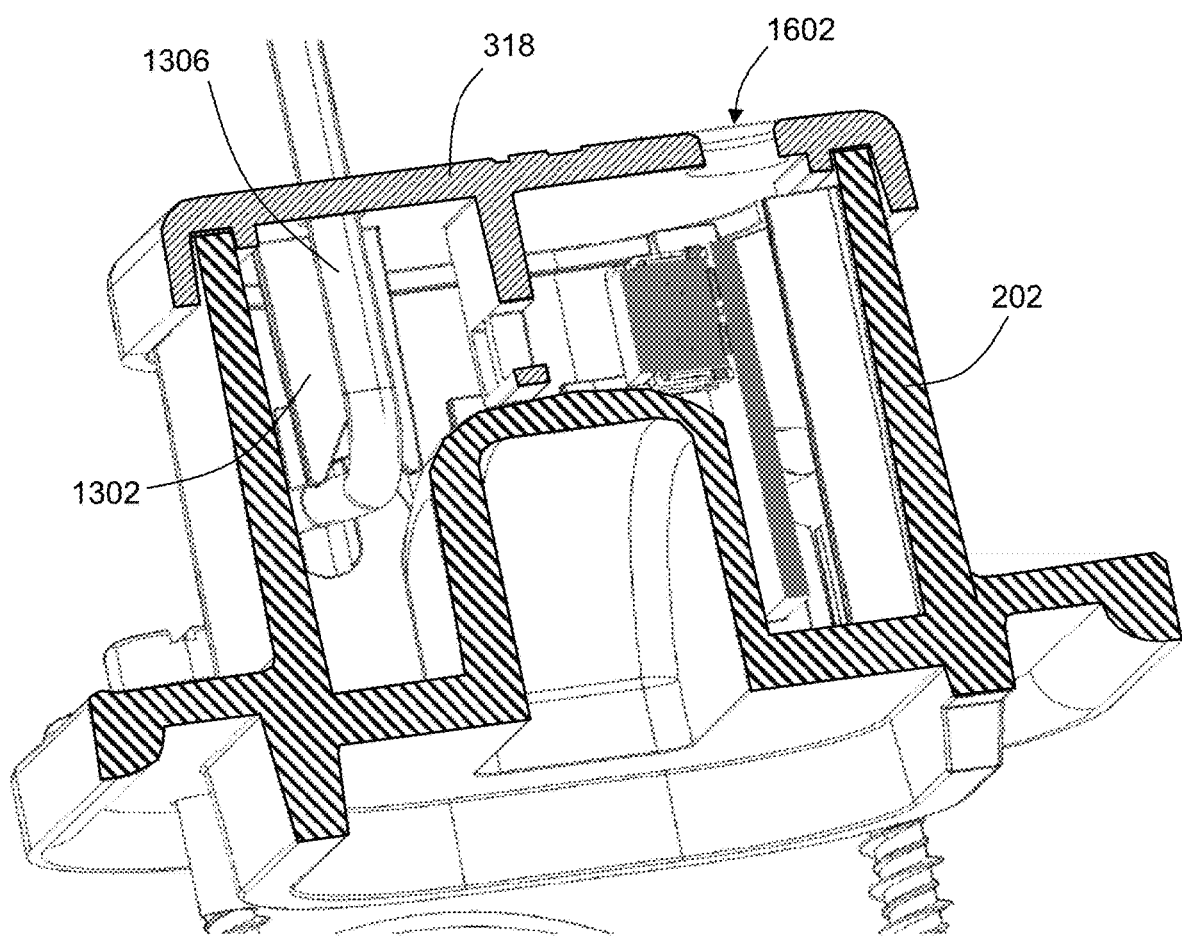
FIG. 17 illustrates a cross-sectional view of an exemplary lid portion cooperated with an exemplary housing of an exemplary flow sensor system, in accordance with some embodiments.

FIGS. 13-16 illustrate simplified perspective views at various different angles of an exemplary lid portion 318 of a flow sensor system 110, in accordance with some embodiments. FIG. 17 illustrates a cross-sectional view of an exemplary lid portion 318 cooperated with an exemplary housing 202 of an exemplary flow sensor system 110, in accordance with some embodiments. The lid portion 318 when secured with the housing 202 encloses an interior cavity, hollow, void or the like within the housing 202. Referring to FIGS. 13-17, in some embodiments the lid portion 318 includes one or more cable or wire retention feature or wire positioning protrusions 1302 that extends a distance from an inner lid surface 1402. The wire positioning protrusion 1302 includes, in some embodiments, a wire retaining recess 1304, notch, groove, clamp, or other structure. In some embodiments, the wire retaining recess 1304 is separated by a length of the wire positioning protrusion 1302 from the inner lid surface 1402 of the lid portion 318. Further, the wire retaining recess 1304 is configured to cooperate with an electrical wire 1306, cable, or the like extending though the lid portion 318 and into the housing to be coupled with the communications interface 702 and enable electrical coupling of the flow sensor system 110 with one or more external devices, such as one or more irrigation controllers 102 and/or one or more other relevant systems. The dimensions and/or length of the wire positioning protrusion 1302 is configured to position the wire 1306 at an intended depth within the housing 202, in part, to position the wire 1306 so that potting material, if added to the housing 202 (e.g., injected into the housing through an injection port 1602, aperture or the like of the lid portion 318), surrounds the wire. Further, in some implementations, the wire retaining recess 1304 further resists movement of the wire, such as when being pulled from an exterior of the flow sensor system. Additionally, in some embodiments, the wire positioning protrusion 1302 is configured to help in maintain a position of the wire cooperated with a wire routing channel 1802 and securing feature.

Figure 18:
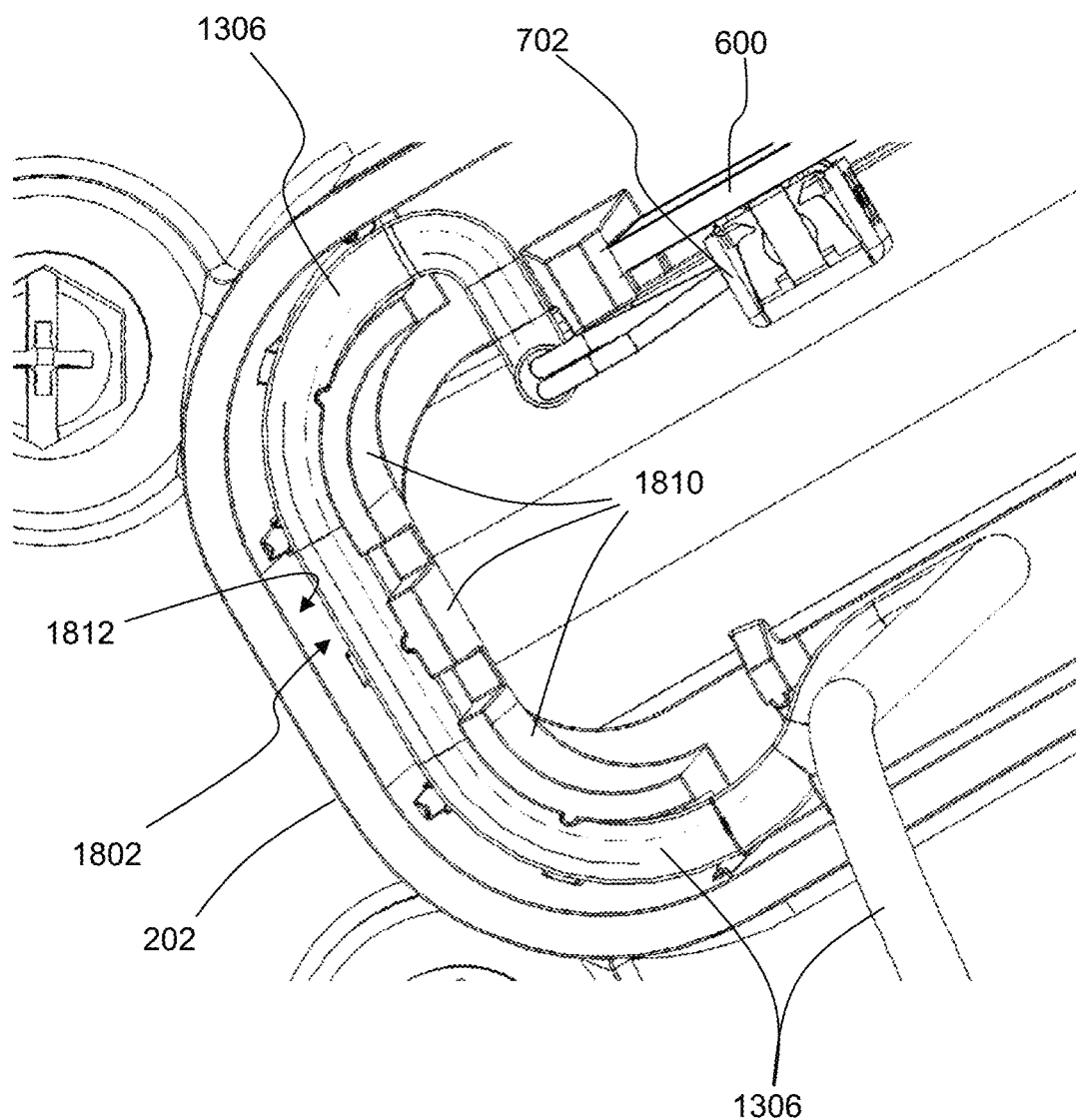
FIG. 18 illustrates a simplified overhead view of an interior of an exemplary housing of a flow sensor system, in accordance with some embodiments.
Figure 19:
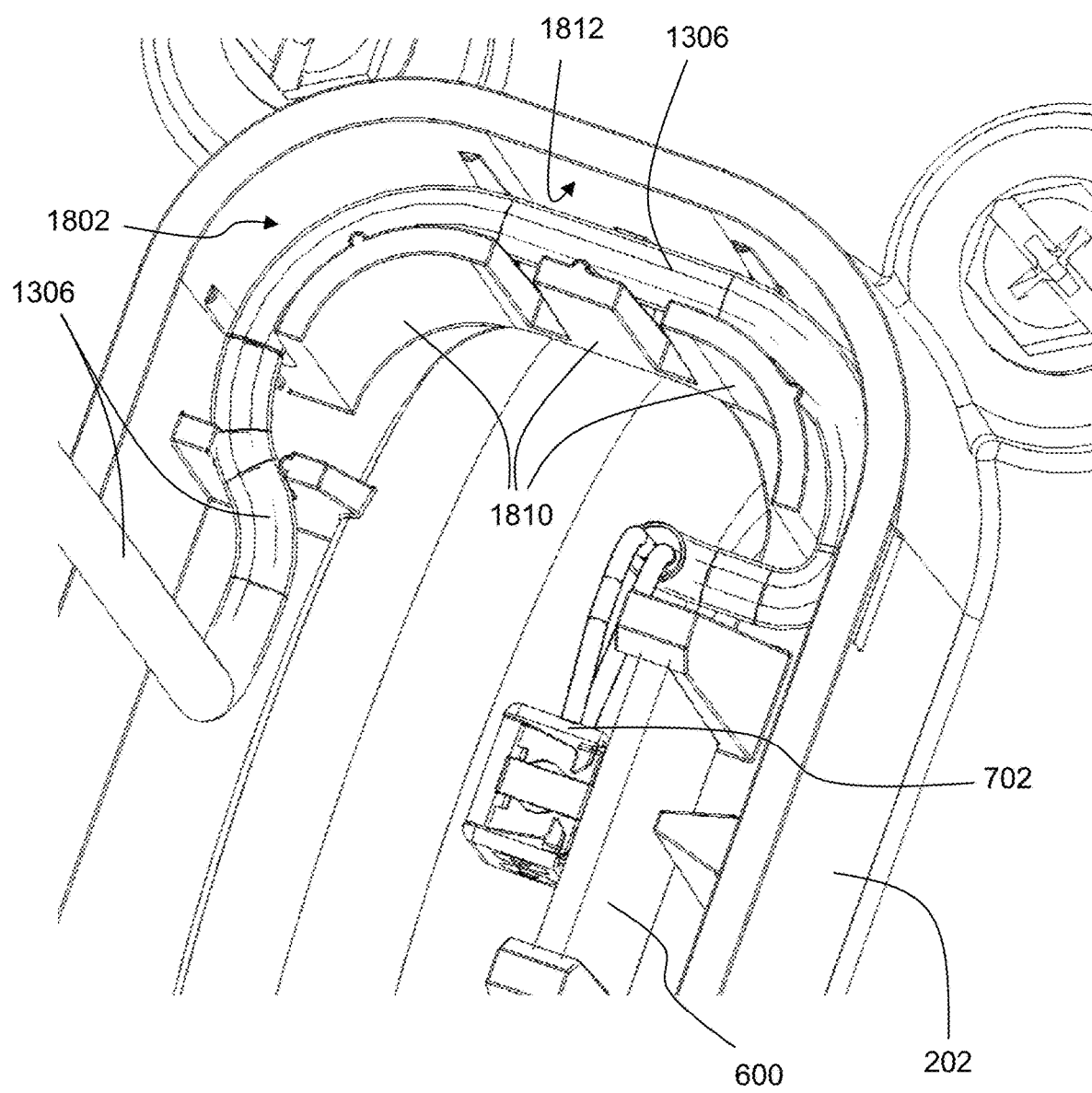
FIG. 19 illustrates a perspective view of the interior of the exemplary housing illustrated in FIG. 18, in accordance with some embodiments.

FIG. 18 illustrates a simplified overhead view of an interior of an exemplary housing 202 of a flow sensor system 110, in accordance with some embodiments. FIG. 19 illustrates a perspective view of the interior of the exemplary housing 202 illustrated in FIG. 18, in accordance with some embodiments. Referring to FIGS. 18-19, in some embodiments the housing includes wire routing channel 1802 into which the wire 1306 is positioned to position the wire within the housing and route the wire to the one or more magnetic sensor systems 600, circuit boards or the like. The wire routing channel 1802, in some implementations, maintains a positioning of the wire within the cavity of the housing and/or limits or prevents the wire from being inadvertently dislodged or uncoupled with the magnetic sensor system 600. In some embodiments, the positioning protrusion 1302 of the lid positions the electrical wire at a depth within the housing to be positioned into the wire routing channel 1802. The wire routing channel 1802 provides a path to route the electrical wire to electrically couple with the communications interface 702 and the magnetic sensor system 600 that includes the one or more magnetic sensors 604. As described above, the communications interface 702 can be a physical connector that receives and retains an end of one or more wires, soldering directly to a circuit board or component, other connector or combination of two or more connectors.

The wire routing channel 1802, in some embodiments, comprises one or more routing walls 1810, posts, beams, protrusions and/or other structures formed in the housing 202 and along which the wire 1306 is routed. In some applications the routing walls 1810 are positioned along and separated from one or more lateral walls 1812 of the housing 202 forming a channel, pathway or the like along with the wire is routed. The wire routing channel is configured to receive and route a wire coupled with the sensor circuit, comprising the magnetic sensor, switch and current loop, through the housing to cooperate with the wire positioning protrusion and extend out through the lid portion 318 to enable electrical coupling of the flow sensor system with an external system. Accordingly, the wire routing channel and/ or the wire positioning protrusion provide strain relief for the wire and inhibit decoupling of the wire from the sensor circuit. The separation between the routing walls 1810 and the housing can be approximately equal to or less than a width of the wire 1306. Further, in some embodiments, the routing walls 1810 may apply a biasing pressure against the wire when positioned within the wire routing channel 1802 to aid in retaining the positioning of the wire. Additionally or alternatively, the routing walls 1810 may include protrusions, extensions and/or overhangs to help maintain a position of the wire 1306 within the routing channel 1802. The routing of the wire along the wire routing channel further protects the connection of the wire to the magnetic sensor systems 600. Further, the routing walls 1810 may be separated and/or include gaps to allow the routing walls to elastically flex and/or induce a biasing on and/or pinch the electrical wire to help retain the electrical wire within the wire routing channel 1802.

As described above, the flow sensor system 110, in some embodiments, is configured to detect a direct of flow of the fluid through the fluid channel 302 of the flow sensor system 110. The direction of flow can be detected by a separate directional detection system, while in other implementations, the one or more magnetic sensor systems can be implemented through a sensor system configured to detect a direction of flow of fluid through the fluid channel 302 in addition to a rate of flow of the fluid.

Figure 20A:
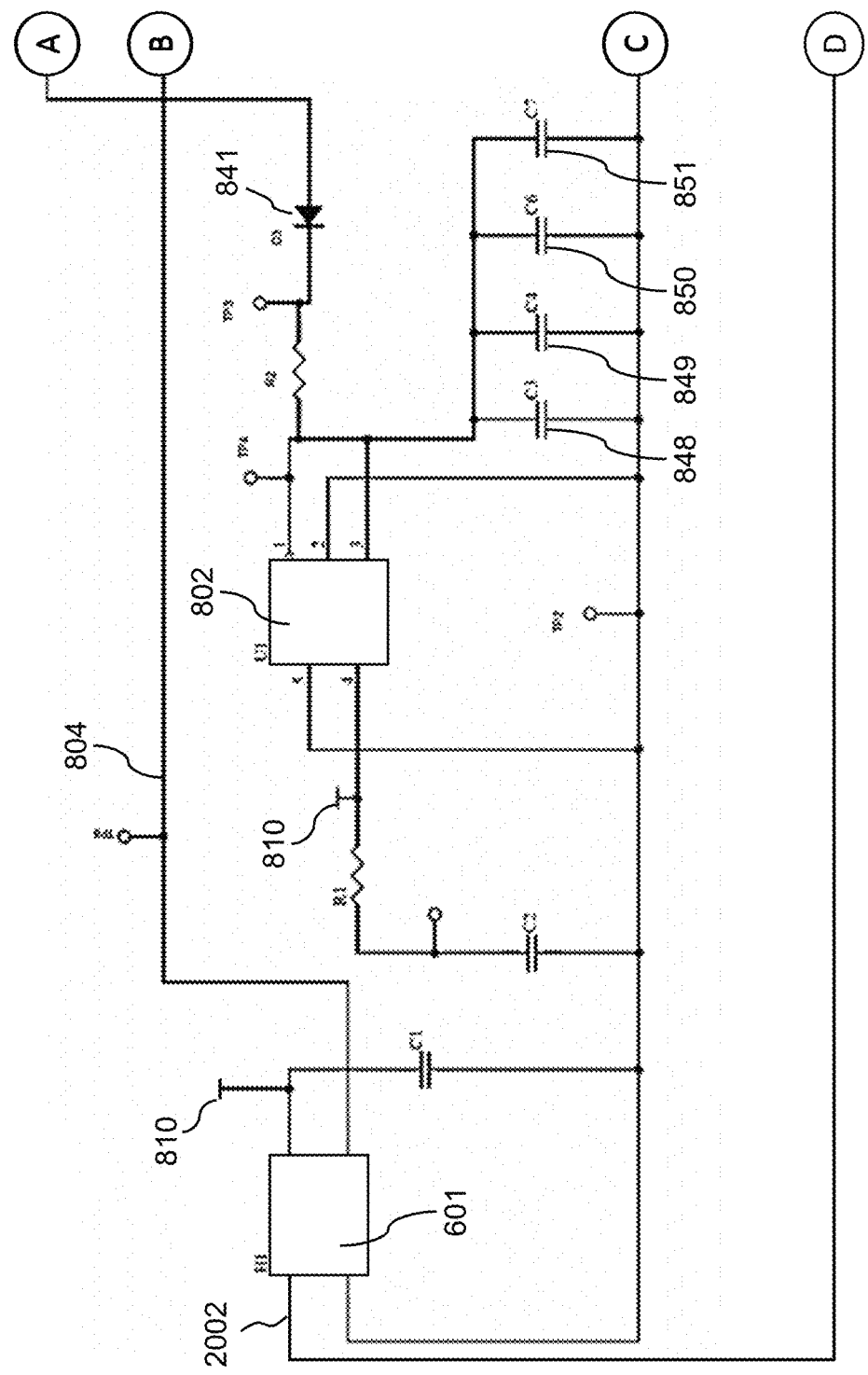
FIGS. 20A-20B illustrate a simplified circuit diagram of an exemplary sensing circuit of an exemplary flow sensor system, in accordance with some embodiments.
Figure 20B:
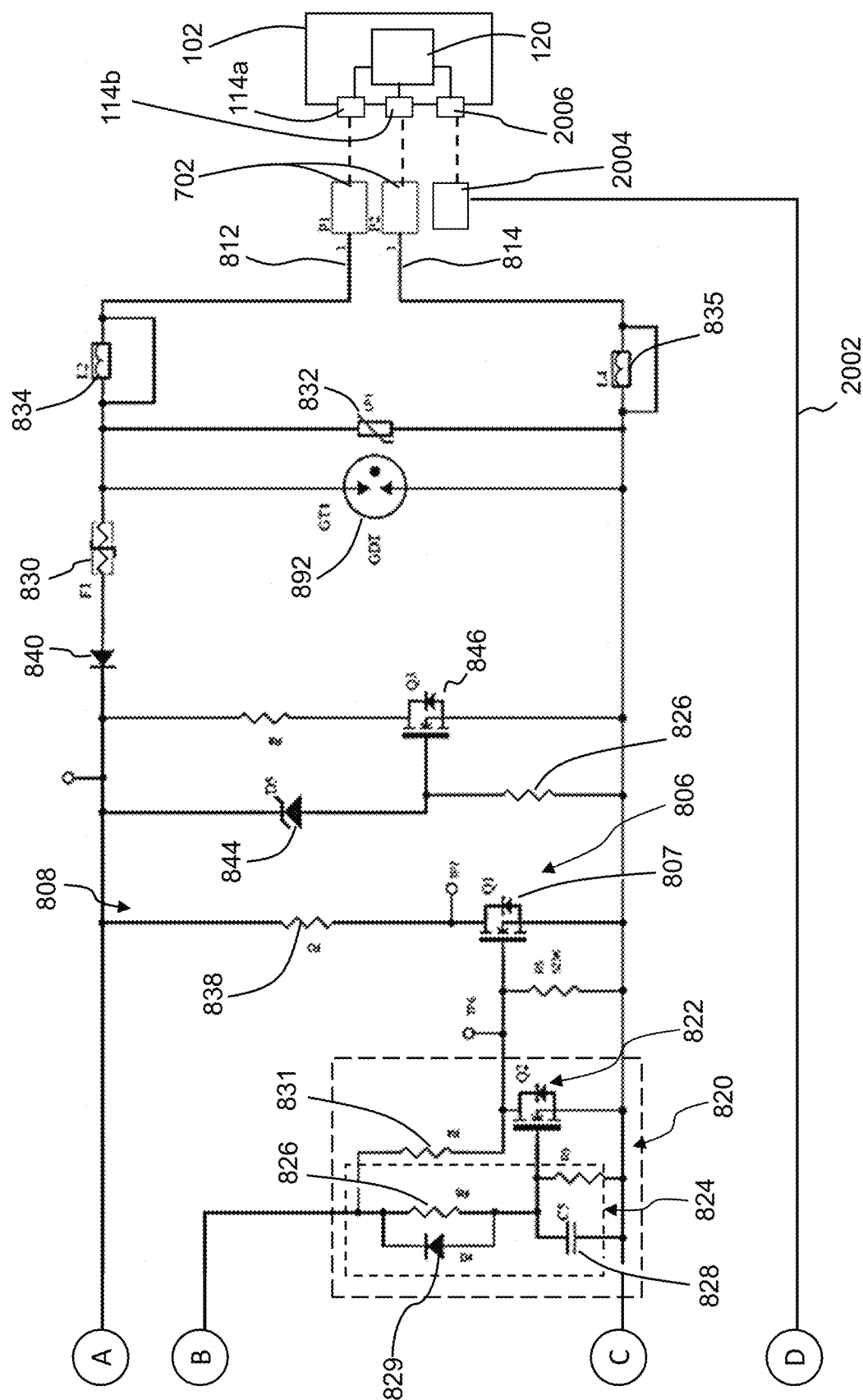

FIGS. 20A-20B illustrate a simplified circuit diagram of an exemplary sensing circuit of an exemplary flow sensor system 110, in accordance with some embodiments. The flow sensor system 110 of FIGS. 20A-20B is similar to the flow sensor system of FIGS. 8A-8B, with the magnetic sensor system 601 providing an additional flow direction output and/or signal on a flow direction output connection 2002 or line that indicates a direction of flow of fluid through the fluid channel 302 of the flow sensor system. The flow direction output, in some embodiments, indicates a direction through a binary output (e.g., a "0" output indicates a first direction, while a "1" output indicates a second direction opposite to the first direction). The flow direction output connection is configured to couple through an additional communications interface 2004 with a corresponding input 2006 of the irrigation controller 102, or other relevant system. The control circuit 120 of the irrigation controller 102 is configured to detect the difference in the flow direction output and/or detect the change in the flow direction output to distinguish between the different directions of flow of fluid through the flow sensor system 110. In some embodiments, the programming and/or logic within the control circuit 120 of the irrigation controller 102 (or other system) coupled with the flow sensor system 110 utilizes the reverse flow information or change of direction of flow information to identify or detect one or more conditions, such as but not limited to detecting when municipalities have a disruption in service, a backflow is occurring, and/or other such conditions.

In some embodiments, the magnetic sensor system 601 includes at least one dual channel Hall effect sensor (e.g., from Asahi-Kasei, such as an AK8776 Hall IC for Pulse Encoder, or other dual channel Hall effect sensor from another manufacturer) enabling the detection of a change in rotational direction of the paddle wheel device 308 indicating a change in direction of flow through the flow sensor system 110, in addition to providing relevant rate of flow information as described herein. In some embodiments, the dual channel Hall effect sensor includes vertical and horizontal field Hall sensors that establish internal A and B pulse signals that are utilized to determine a flow direction. In some implementations, the dual channel Hall effect sensor takes one pulse count to determine the main direction and when that changes the flow direction output signal changes state (e.g., between a high state and a low state) to indicate a direction change in flow has been detected. The flow direction output, in some embodiments, is an output connection 2002 of the Hall effect chip, which can be communicatively coupled with the irrigation controller 102 and/or other controller, in addition to the coupling through the current loop.

The irrigation controller 102 is configured to automatically monitor this flow direction output signal. One or more actions can be initiated at the irrigation controller 102 in response to a detection of a change in flow direction and/or a change in flow direction in cooperation with a threshold rate of flow in that changed direction. For example, in some instances, the irrigation controller 102 can control a master valve shut-off in response to a change in flow direction to prevent the evacuation of downstream irrigation pipe back into a water utility main lines, communicate, via wired and/or wireless communication, a notification to one or more sources (e.g., property owner, water utility authority, a landscape professional overseeing the property where irrigation is being controlled, other such entities, or a combination of two or more of such entities), activate one or more local and/or remote alters or alarms, control one or more valves 104, other such actions, or a combination of two or more of such actions.

Figure 21:
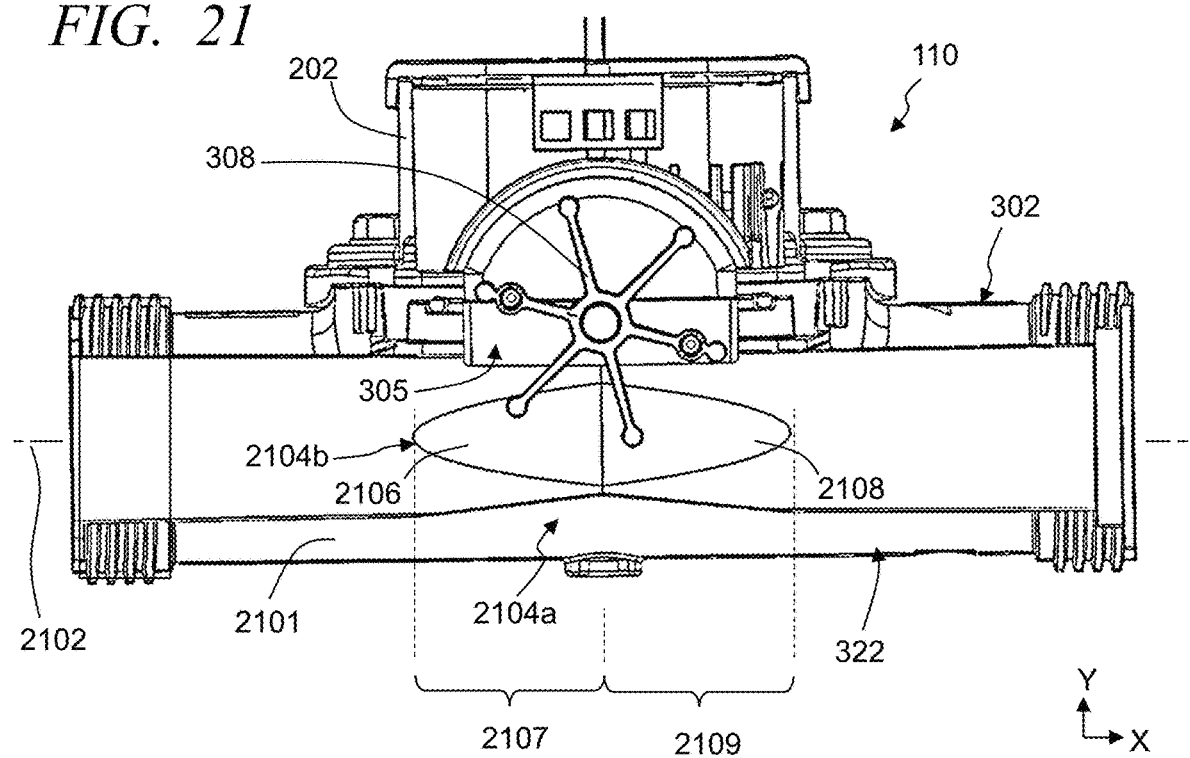
FIG. 21 shows a cross-sectional view of an exemplary flow sensor system that has a reduced interior cross-sectional area proximate the paddle wheel device, in accordance with some embodiments.

FIG. 21 shows a cross-sectional view, parallel with a lengthwise axis 2102 (e.g., a X-axis), of an exemplary flow sensor system 110 that has a reduced interior cross-sectional area or region of the conduit portion 322 of the fluid channel 302 proximate the paddle wheel device 308, in accordance with some embodiments. The reduced cross-sectional area induces an increase in the velocity of the fluid traveling through this region of the fluid channel 302 compared with the velocity of the fluid prior to and after the reduced interior cross-sectional area. In some implementations, the reduced interior cross-sectional area of the fluid channel 302 over at least a volume or region within the fluid channel 302 is positioned such that the blades 310 of the paddle wheel device 308 pass through this reduced cross-sectional area as the paddle wheel device rotates. The reduced interior cross-sectional area of the fluid channel 302, in some embodiments, aligns with the paddle wheel aperture 305 and the paddle wheel device 308. The increased velocity of the fluid proximate the paddle wheel device 308 correspondingly increases the rate of rotation of the paddle wheel device 308. This increased rotational speed of the paddle wheel device 308 results in the detection of the one or more one or more magnetic elements 314 at a correspondingly increased rate, which in some instances, allows for a more accurate measurement of fluid flow through the flow sensor system 110, particularly at lower fluid flow rates through the irrigation system.

Figure 22:
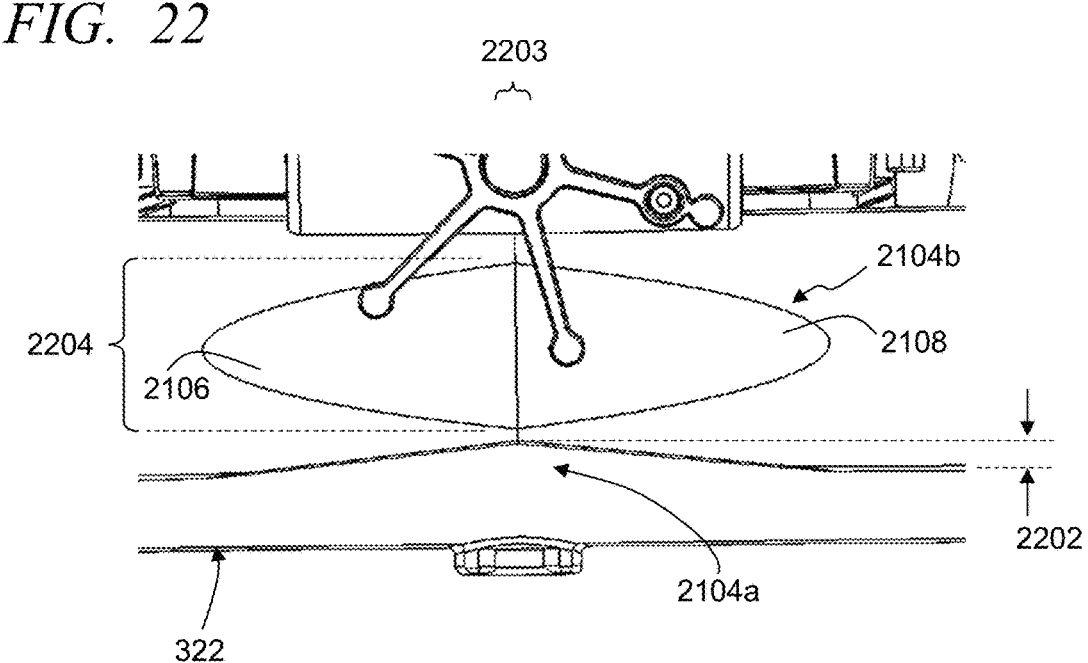
FIG. 22 shows a zoomed in view of a portion of the cross-sectional view of the exemplary fluid channel of FIG. 21, in accordance with some embodiments.
Figure 23A:
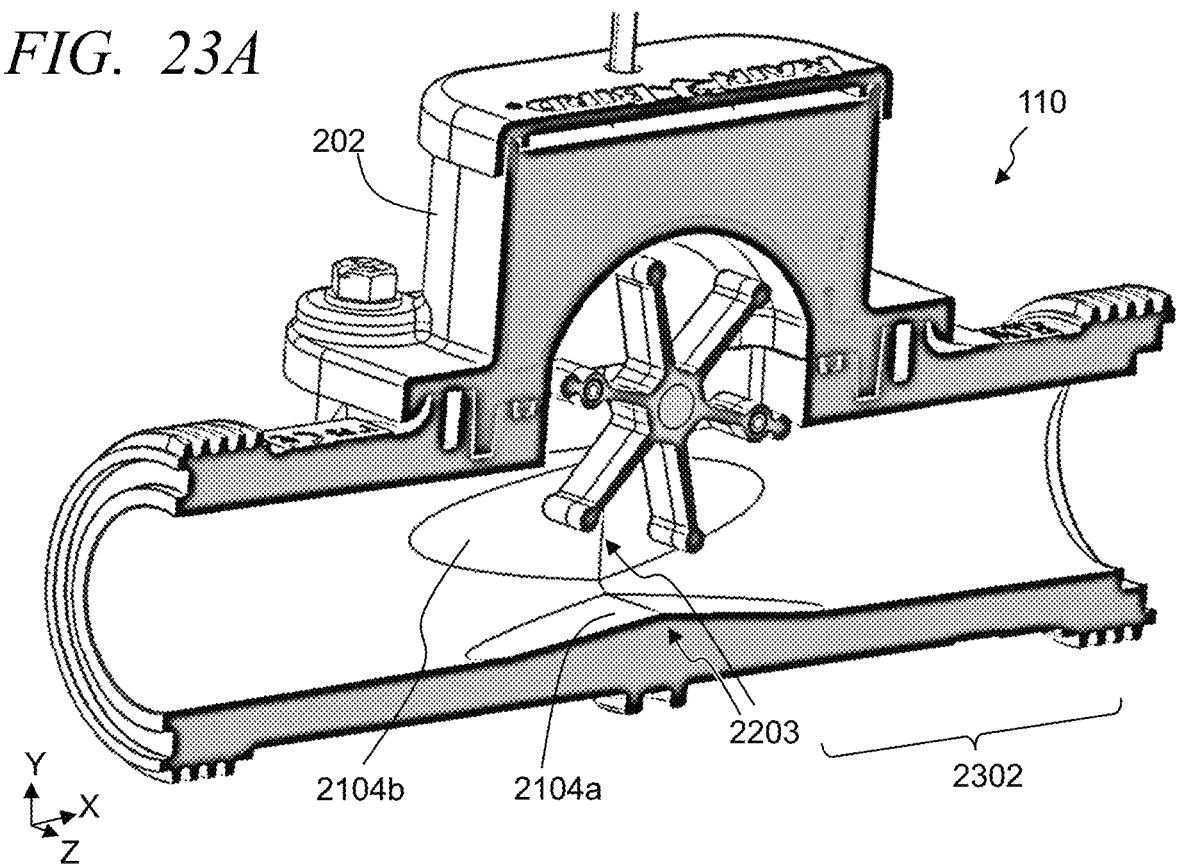
FIGS. 23A-23B illustrate angled, cross-sectional views of flow sensor systems, in accordance with some embodiments.
Figure 23B:
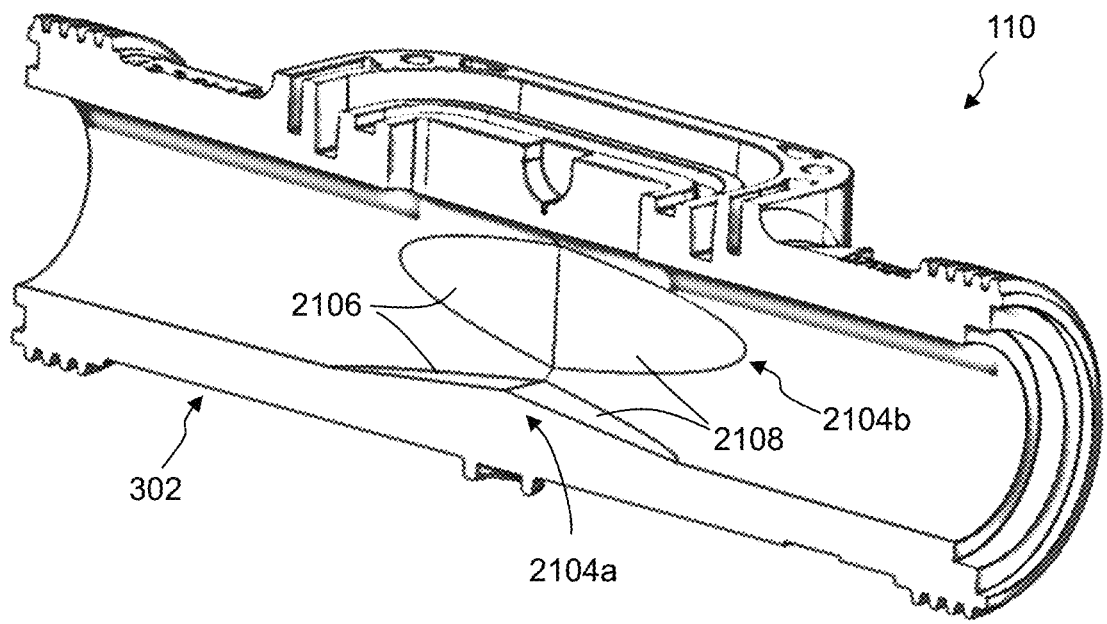
Figure 24:
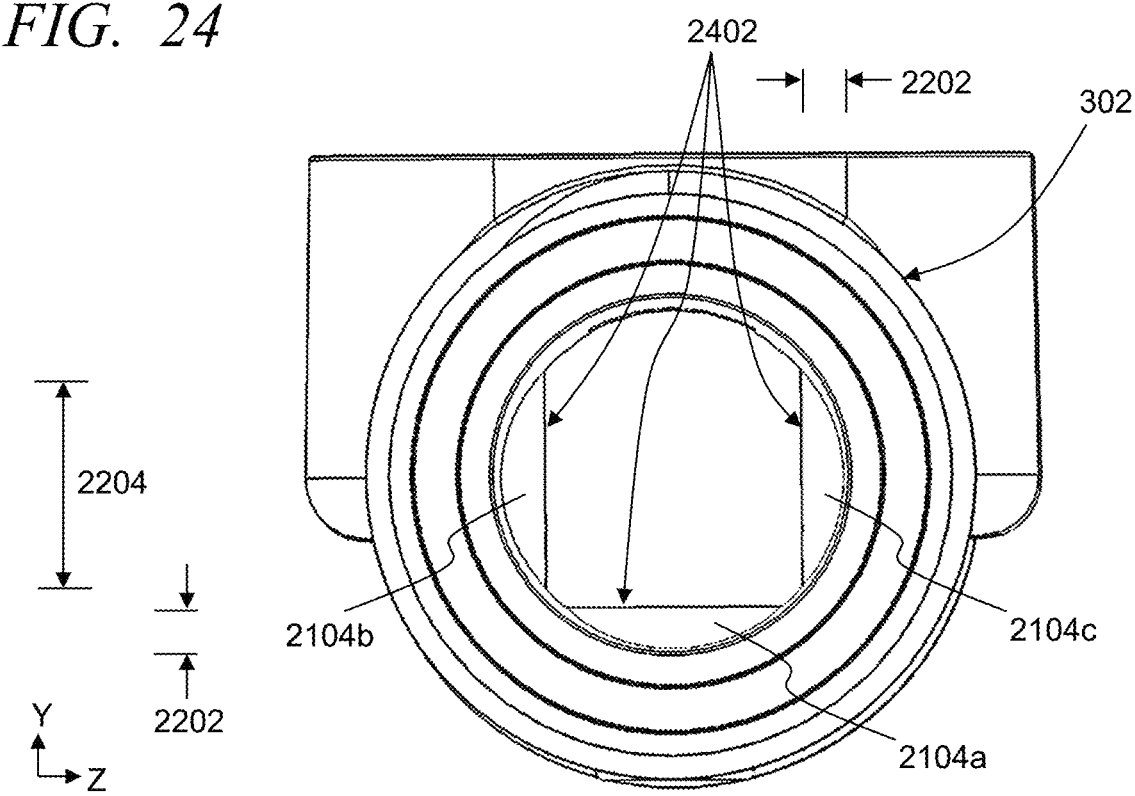
FIG. 24 illustrates a simplified cross-sectional view, along a widthwise axis, of an exemplary flow sensor system, in accordance with some embodiments.

FIG. 22 shows a zoomed in view of a portion of the cross-sectional view of the exemplary fluid channel 302 of FIG. 21, in accordance with some embodiments. FIGS. 23A-23B illustrate angled, cross-sectional views of flow sensor systems 110, in accordance with some embodiments. FIG. 24 illustrates a simplified cross-sectional view, along a widthwise axis (e.g., a Y-axis), of an exemplary flow sensor system 110, in accordance with some embodiments. Referring to FIGS. 21-24, in some embodiments, the fluid channel 302 comprises one or more fluid accelerators or acceleration ramps 2104a-c positioned within an interior of the fluid channel 302. Further, the one or more acceleration ramps 2104a-c are positioned proximate the paddle wheel device 308 and typically aligned with and/or centered with the paddle wheel aperture 305. The acceleration ramp 2104a-c reduces the cross-sectional area of the interior of the fluid channel 302 by the thickness 2202 or height of the acceleration ramp 2104a-c. One or more acceleration ramps are typically positioned along the length of the fluid channel 302 to align a peak area 2203 of the acceleration ramp having a maximum thickness 2202 with the rotational axis of the paddle wheel device. Further, in some embodiments, multiple acceleration ramps can be aligned each with a peak area 2203 at a maximum thickness aligned with the peak areas 2203 of the other of the multiple acceleration ramps, creating a pinch point and the cross-sectional area of an interior of the fluid channel 302 is cooperatively reduced based on the widths 2204 and the thicknesses 2202 of the acceleration ramps 2104a-c.

In some embodiments, the acceleration ramps 2104a-c each comprise a central peak area 2203, region or axis, an upstream ramp portion 2106, and a downstream ramp portion 2108. Each of the upstream ramp portion 2106 and the downstream ramp portion 2108 can taper away from the central peak area 2203 decreasing in thickness 2202 further from the peak area. The rate of change of thickness and/or tapering can, in some implementations, be configured to reduce or eliminate turbulence and other affects that can interfere with the flow of the fluid through the flow sensor system 110. In some embodiments, a length 2107 of the upstream ramp portion 2106 is substantially equal to a length 2109 of the downstream ramp portion 2108. Additionally, the reduced cross-sectional area, in some embodiments, is positioned so that the accelerated flow is maximized at the interface location with the paddle wheel device 308 and does not have an abrupt edge that could cause turbulent flow in this reduced cross-sectional, necked down area of the fluid channel 302.

The one or more acceleration ramps 2104a-c can be positioned on and/or formed within the wall 2101 of the fluid channel 302 in substantially any orientation to achieve the desired reduction in cross-sectional area of the fluid channel. In some embodiments, a single acceleration ramp 2104a is formed in a wall 2101 of the fluid channel 302 opposite the paddle wheel device 308. In other embodiments, a pair of opposing acceleration ramps 2104b-c can be secured on and/or formed in the wall 2101 of the fluid channel 302 on opposite sides of the paddle wheel device 308. In some embodiments, the multiple acceleration ramps are positioned orthogonally and include a first acceleration ramp 2104a secured with and/or formed in the wall 2101 of the fluid channel 302 opposite the paddle wheel device 308, a second acceleration ramp 2104b formed in the wall 2101 of the fluid channel 302 about 90 degrees orientation from the first acceleration ramp 2104a, and a third acceleration ramp 2104c formed in the wall 2101 of the fluid channel 302 about 90 degrees orientation from the first acceleration ramp and about 180 degrees orientation relative to the second acceleration ramp 2104b. Other orientations and/or configurations can be utilized to achieve the desired fluid flow rate at the position of the paddle wheel device 308.

The amount of reduction in the cross-sectional area of the fluid channel 302 can depend on one or more factors, such as but not limited to sensitivity of the sensor circuitry, the expected rotational velocity of the paddle wheel device, the diameter of the interior of the fluid channel 302, a threshold minimum flow rate to be detected by the sensor system, a threshold maximum flow rate to be detected by the sensor system, an expected maximum and/or minimum pressure within the fluid channel 302, flow disturbance thresholds (e.g., eddy currents, cavitation, etc.), pressure thresholds of flow sensor system 110 and/or the irrigation system 100, materials of the components of the flow sensor system 110, other such factors, or a combination of two or more of such factors. For example, in some embodiments, the one or more acceleration ramps 2104a-c cooperatively result in a total reduction in cross-sectional area of the interior of the fluid channel 302 of between 10%-50%, and often between 15%-25%.

The exterior fluid surface 2402 of the acceleration ramps 2104a-c and/or ramp portions 2106, 2108 can be flat, concave curved, convex curved, or other relevant surface to achieve a desired increased fluid flow rate and/or reduction in cross-sectional area of the interior of the fluid channel 302 to achieve an intended rotational speed of the paddle wheel device 308 at a minimum threshold fluid flow rate through the flow sensor system 110 and/or irrigation conduits 106. Further, the rate of tapering and/or the angle of the upstream and downstream ramp portions 2106, 2108 can depend on the expected fluid flow, length of the fluid channel 302, effects of on the fluid (e.g., eddy currents, turbulence, cavitation, etc.), and/or other such factors. In some embodiments, the angle of taper can be between 5 and 20 degrees, and in some instances less than about 10 degrees. Further, the angle of taper may vary along the length of the upstream and downstream ramp portions 2106, 2108 to achieve a desired flow rate and reduce and/or compensate for potential adverse effects on the flow (e.g., eddy currents, turbulence, etc.). Similarly, the upstream and/or downstream ramp portions 2106, 2018 of the acceleration ramps 2104*a-c* may include multiple regions with different angles of taper.

The dimensions of the acceleration ramps can be substantially any size to achieve the intended fluid acceleration. In some instances, the length 2107, 2109 of one or both of the upstream and downstream ramp portions 2106, 2108, and/or thickness 2202 of the acceleration ramps are proportional to the dimensions of the interior of the fluid channel 302. In some embodiments, the length of the acceleration ramps is approximately 20-50% of the length of the fluid channel 302. In other implementations, however, the length of the acceleration ramps may be 80% or more of a length of the fluid channel. In some implementations, the diameter of the interior of the fluid channel may be formed to gradually taper beginning proximate the lateral ends of the fluid channel 302 over a first portion 2302 of the length of the fluid channel 302, and transition at the acceleration ramps 2104*a-c* to one or more steeper angles of taper over the upstream ramp portion 2106 and/or downstream ramp portions 2108 of the acceleration ramps approaching the peak area 2203. A thickness 2202 of one or more of the acceleration ramps at the peak area 2203 can, in some embodiments, be about 5%-30% of the diameter of the interior of the fluid channel 302, and in some instances between 8-20% of the diameter of the interior of the fluid channel 302. The peak area 2203 may correspond to a line, while in other instances the peak area may be a curved surface, have a flattened surface or other shape to achieve a desired flow rate and/or reduce adverse fluid flow effects (e.g., eddy currents, turbulence, etc.). In some embodiments, the width 2204 of the acceleration ramps 2104*a-c* at about the peak area 2203 or area is between 30-75% of a diameter of the interior of the fluid channel 302, and in instances is between about 60-70% of a diameter of the interior of the fluid channel 302. The width decreases further from the peak area 2203 as the thickness 2202 reduces further from the peak area.

In some embodiments, acceleration ramps 2104*a-c* can be formed through injection molding as part of an injection molding of the fluid channel 302, tooled, three-dimensionally printed with the 3-D printing of the fluid channel 302, inserted and secured within the interior of the fluid channel 302 (e.g., adhesive, heat welding, etc.), pressure fit, snap fit, other such methods or a combination of two or more of such methods. Further, the acceleration ramps 2104*a-c*, the fluid channel 302 and/or an insert into the fluid channel that includes the acceleration ramps can be formed from substantially any relevant material that can be cooperated with and/or formed as part of the fluid channel 302, such as but not limited to, plastic, polyvinyl chloride (PVC), glass, nylon and/or mineral reinforced PVC, silicon, carbon, metal, brass, ceramics, glass filled, nylon filled and/or mineral filled polypropylene, other such material, or a combination of two or more of such materials.

In some embodiments, the one or more acceleration ramps 2104*a-c* provide a narrowing of a dimension of the flow path and/or the cross-sectional area of the fluid channel 302 in a volume through which at least a portion of the blades of the paddle wheel device 308 rotate. The narrowing and/or reduced cross-sectional area increases pressure and a rate of flow of the fluid at the blades of the paddle wheel device over a fluid channel that does not include the acceleration ramps. In some applications, such as at lower flow rates the increased pressure and/or flow rate provide improved low flow performance of the detected rate of flow by the flow sensor systems 110 (e.g., flows of less about than 2 gallons per minute (GPM) when a diameter of the fluid channel 302 (without the acceleration ramps) is approximate 1 inch). Further, the increased rate of flow through reduced cross-sectional area does not adversely affect the sensed flow at higher flows and the flow sensor system provides accurate flow rate measurements across a range of flow rates. It was identified that at low flow rates, it is possible with some flow sensor systems that a paddle wheel device does not uniformly rotate and leads to lower accuracy measurements. The incorporation of one or more acceleration ramps 2104*a-c* increases flow pressure at the paddle wheel device 308 with the cross-sectional volume of the flow path reduced at the location of paddle wheel device. Some embodiments include three acceleration ramps 2104*a-c* that are secured with and/or formed in a fluid channel wall 2101 of the wall 2101 of the fluid channel 302 resulting in a narrowing and reduction of a cross-sectional area of the fluid channel along a portion of the length of the fluid channel 302 at a volume through which the blades of the paddle wheel device rotate. In some embodiments, one or more of the one or more acceleration ramps 2104*a-c* include an upstream ramp portion 2106 that increases in height or thickness toward a peak area 2203 of the acceleration ramp, and a downstream ramp portion 2108 that decreases in height or thickness extending away from the peak area 2203. The acceleration ramps, in some implementations, evenly decrease and increase in thickness or height to limit or avoid introducing turbulence. In some embodiments, the downstream ramp portion 2108 is symmetrical relative to the upstream ramp portion 2106 of the acceleration ramps 2104*a-c*. This provides more pressure on the paddle wheel device 308 and improves low flow measurements.

In some embodiments, the flow sensor system 110 is configured to wirelessly communicate with one or more irrigation controllers 102, one or more portable user computing device 132, one or more central irrigation controllers 130, and/or other system components. Such wireless communication enables to flow sensor system 110 to be positioned remote from the irrigation controller 102 and/or other components while still providing flow sensor data. Similarly, the wireless communication in part enables the flow sensor system 110 to be positioned in locations that might otherwise be difficult and/or costly to position the flow sensor system.

Figure 25:
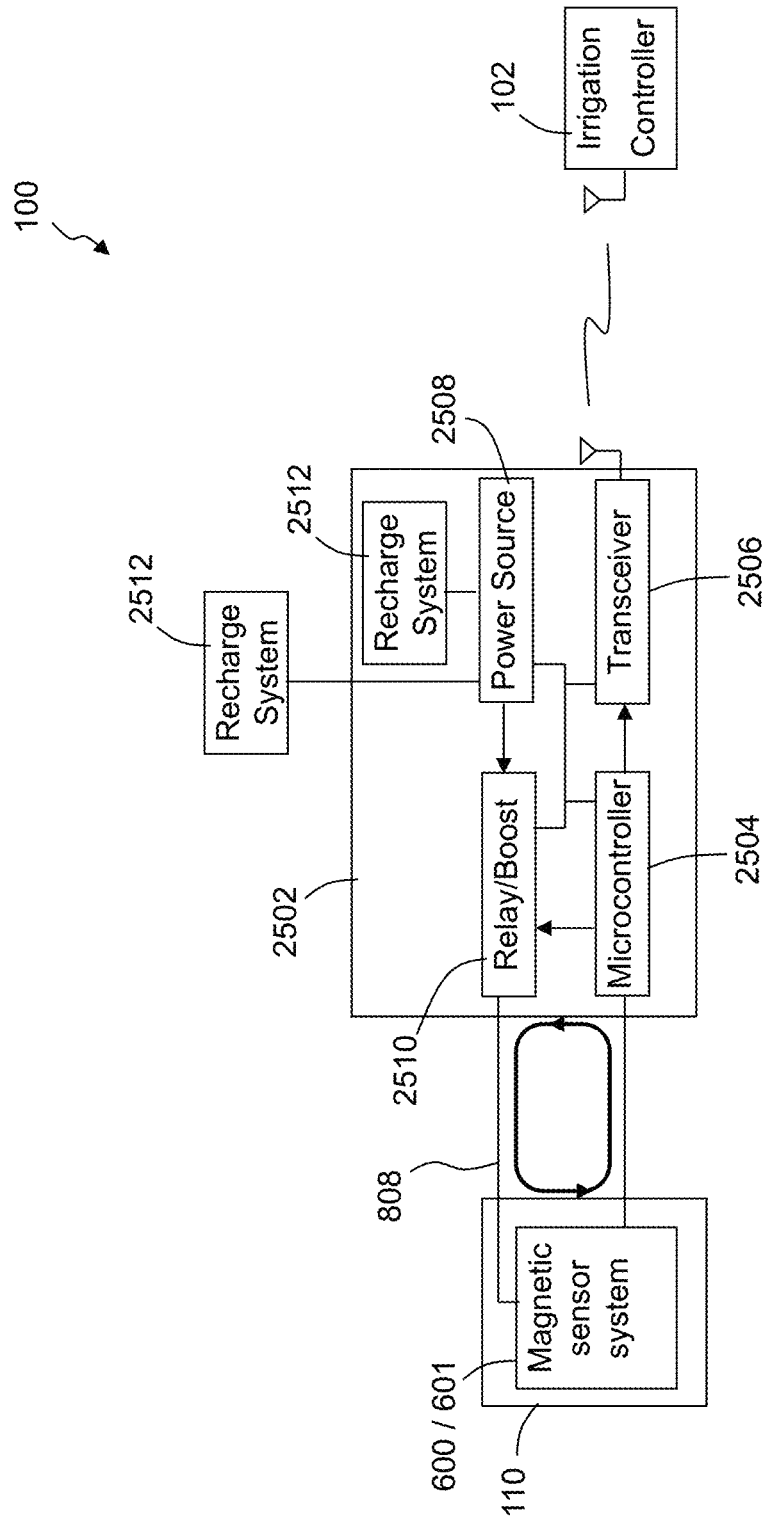
FIG. 25 illustrates a simplified block diagram of an exemplary irrigation system, in accordance with some embodiments.

FIG. 25 illustrates a simplified block diagram of an exemplary irrigation system 100, in accordance with some embodiments. The irrigation system includes a flow sensor system 110 coupled with an external wireless interface module 2502 that is configured to wirelessly communicate with one or more remote irrigation controllers 102, other sensor systems, central irrigation controllers 130, portable user computing devices 132, and/or other components that are configured to communicate over one or more predefined wireless communication protocols. The flow sensor system 110 is similar to the flow sensor systems describes above, such as similar to the flow sensor system described with reference to FIGS. 8A-8C.

The wireless interface module 2502 is external to and separate from the flow sensor system 110. In some instances, the wireless interface module 2502 is external to and configured to be secured with and/or couple to the housing 202 and/or conduit portion 322 of the flow sensor system. The interface module 2502 is configured to couple with and form part of the current loop 808 to supply electrical power to and receive sensor data from the flow sensor system 110. In some embodiments, the interface module 2502 comprises some of the circuitry of the irrigation controller 102 described with reference to FIG. 8C to interface with the flow sensor system.

In some embodiments, the interface system 2502 includes at least one module control circuit 2504 that is electronically coupled with the current loop 808 and configured to detect the temporarily change to the current in the current loop in response to the sensor output from the magnetic sensor system 600/601 transitioning between the active and non-active states. Again, the flow rate of the water corresponds to the frequency of the transitions between the first current flow value and the second current flow value. Based on the detected changes, the module control circuit 2504 is programmed to calculate a flow rate of the water through the fluid channel as a function of the frequency of the transitions between the first current flow value and the second current flow value. In some embodiments, the module control circuit 2504 executes programming to apply one or more algorithms, tables, functions and the like to calculate a flow rate, such as utilizing one or more K-factor values each corresponding to tested rates of flow as described above and/or other known techniques. The module control circuit 2504 can be implemented through one or more microcontrollers, processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, services, interfaces, logging, reporting, etc. For example, some or all of the module control circuit 2504 and/or the interface system 2500 of FIG. 25 can be implemented through a system similar to the system 1000 of FIG. 10.

The interface system 2502 further includes one or more wireless transceivers 2506 that is communicatively coupled with the module control circuit 2502. The module control circuit 2502 is configured to cause the wireless transceiver to wirelessly communicate flow rate data specifying the flow rate. In some embodiments, the module control circuit detects one or more threshold changes in current and/or voltage and communicates the detected threshold changes as sensor data. The module control circuit 2502 is configured to utilize the wireless transceiver 2506 to wirelessly transmit the determined flow rate information, which can be received and utilized by one or more irrigation controllers 102, one or more portable user computing device 132, one or more central irrigation controllers 130, and/or other system components. For example, the irrigation controller is configured to receive through an irrigation controller wireless transceiver the flow rate data wirelessly transmitted from the interface module. In some embodiments, the module control circuit is configured to package the determined flow rate information over time into data packets.

The wireless communication utilized can be BLUETOOTH, WIFI, cellular, spread spectrum modulation techniques, LoRa (Long Range), low-power wide-area network modulation standard, LoRaWAN, other such wireless communication protocols or a combination of two or more such wireless communication protocols to communicate with an irrigation controller 102, a portable user computing device 132 (e.g., a smartphone or tablet, which in some instances is running an irrigation application (APP)), other sensors, a local router and/or modem, and/or other such devices. The irrigation controller transceiver, in some embodiments, establishes a wireless communication network to which the interface system and/or transceiver 2506 joins. In other implementations, the transceiver 2506 implements the wireless network that the irrigation controller joins. Further, the interface system 2502, in some embodiments, communicates via one or more wide area distributed communication networks (e.g., Internet), with an irrigation controller 102, a portable user computing device 132, a central irrigation controller 130, other servers and/or services, and/or other devices. In some embodiments, the interface system 2502 includes a button and/or other activator that is configured to be activated by a user to initiate pairing of the interface system 2502 with one or more other devices (e.g., irrigation controller 102, portable user computing device 132, modem, etc.), and/or implement other functions (e.g., initiate a factory reset (long press), activate a test mode (e.g., sequence of multiple presses), etc.). In some embodiments, the interface system 2502 includes a user interface (e.g., buttons and/or display), one or more LEDs (e.g., bi-color LEDs) that are activated to show one or more statuses of the flow sensor system (e.g., status of one or more connections wireless connections, wireless pairing status, one or more error conditions, active state, sleep state, etc.) and/or other such inputs and information outputs. In some embodiments, the interface system 2502 additionally or alternatively includes a hardware connector (e.g., two-wire, USB, USB-C, ethernet, etc.) enabling wired coupling with the irrigation controller, other sensor and/or other components.

The interface module 2502 typically further includes one or more electrical power sources 2508 that provides power to the module control circuit 2504 and wireless transceiver 2506. In some embodiments, the power source 2508 further supplies electrical current and/or voltage to the current loop 808 and the flow sensor system 110, and is utilized to provide the change in current in the current loop. Accordingly, in some embodiments, the interface module 2502 is self-powered, and powers the flow sensor system 110 enabling the flow sensor system 110 and interface module 2502 to operate independent of the irrigation controller 102. In some embodiments, the interface module 2502 includes an optional relay 2510, regulator and/or buck boost converter circuit in supplying a sufficient current and/or power level to the flow sensor system. For example, the module control circuit 2504 may operate at about 5 volts, while a voltage of between 8-15 VDC at a current of between 1-4 mA is supplied to the flow senor system 110 through the current loop 808. The buck boost converter can boost the voltage and/or current from the module control circuit 2504. The power source 2508, in some embodiments, includes one or more rechargeable devices, such as but not limited to one or more rechargeable batteries, one or more capacitors and/or capacitive systems, other such rechargeable power sources or a combination of two or more of such rechargeable power sources. Further, some embodiments include one or more recharge systems 2512 and/or couples with one or more recharge systems 2512 (e.g., solar panels, wind turbine, fluid turbine, other such sources, or a combination of two or more sources). Some embodiments further utilize pulses on the current loop 808 to capture charge, such as through one or more capacitors. Additionally or alternatively, a generator may be cooperated with the magnetic sensor system to generate power from the rotation of the paddle wheel device 308. Some embodiments include other power sources, such as removable, replaceable and/or disposable batteries (e.g., 9-V battery, D battery, AA battery, and/or other such batteries). The disposable batteries, in some applications, operate as back-up power sources that are utilized only when a stored charge in the rechargeable power source is below a threshold power level and one or more actions are to be implemented.

Figure 26:
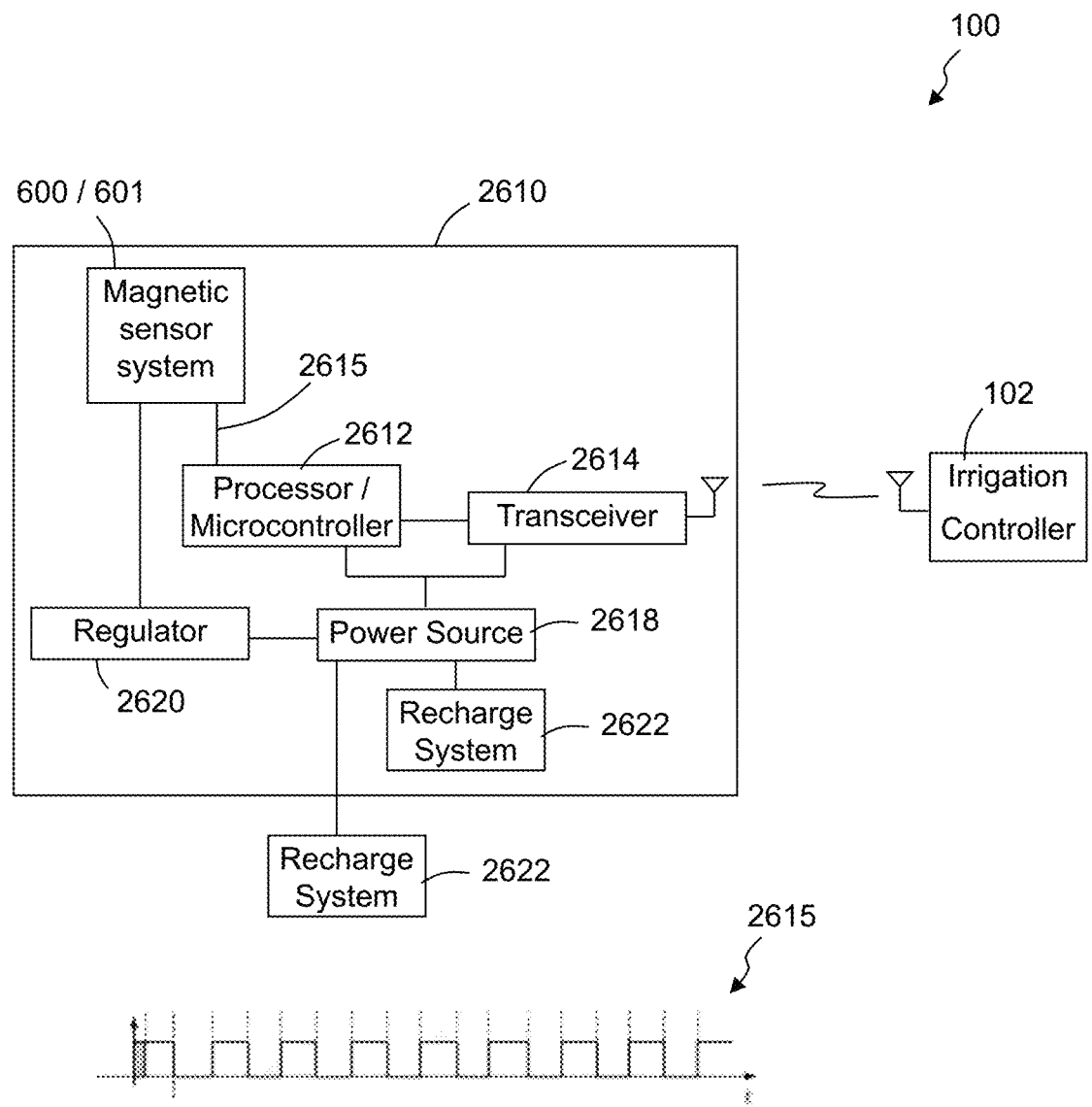
FIG. 26 illustrates a simplified block diagram of an exemplary flow sensor system in communication with an irrigation controller, in accordance with some embodiments.

Some embodiments incorporate the wireless communication directly into the flow sensor system 110. FIG. 26 illustrates a simplified block diagram of an exemplary flow sensor circuitry 2610 of an exemplary flow sensor system 110 in communication with an irrigation controller 102, in accordance with some embodiments. The flow sensor system includes one or more sensor control circuits 2612 coupled with one or more magnetic sensor systems 600/601 and/or other sensors. The magnetic sensor system 600/601 is configured to provide a sensor output comprising changes in state and/or pulses 2615 corresponding to a rate of rotation of the first magnetic element. In some embodiments, for example, the magnetic sensor system 600 includes one or more Hall effect sensors, such as a Hall effect sensor, dual channel Hall effect sensor, other such magnetic sensors or a combination of two or more magnetic sensors. The sensor control circuit 2612 is configured to detect a change in state, pulses 2615 or other such outputs from the magnetic sensor system 600/601. The sensor control circuit, in some implementations, determines a frequency of the magnetic sensor output and/or changes in state of the magnetic sensor output. Based on the frequency, the sensor control circuit 2612 is configured to determine the rate of flow of the fluid through the flow sensor system 110. For example, in some embodiments, the sensor control circuit comprises one or more microcontrollers with firmware that when executed is configured to count pulses and/or timing of the changes in state of the output of the magnetic sensor system, and determines the frequency of the pulses. In some instances, for example, the sensor control circuit applies one or more algorithms, tables, functions and the like to calculate a flow rate, such as utilizing one or more K-factor values each corresponding to tested rates of flow as described above and/or other known techniques. The sensor control circuit 2612 can be implemented through one or more microcontrollers, processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, services, interfaces, logging, reporting, etc. For example, some or all of the sensor control circuit 2612 can be implemented through a system similar to the system 1000 of FIG. 10.

In other embodiments, the flow sensor system includes a motor magnetically coupled to the paddle wheel device 308. The motor is turned by the paddle wheel device, and the sensor control circuit can be configured to monitor the rate of rotation (e.g., rpms) of the motor that is proportional to the flow rate. In some implementations, the motor can further generate power than can be locally stored and used by the sensor system.

The flow sensor circuitry 2610 further includes one or more wireless transceivers 2614 that communicatively couples with the sensor control circuit 2612. The sensor control circuit 2612 is configured to control the wireless transceiver 2614 to wirelessly communicate the flow rate data identifying the determined rate of flow of the fluid. In some embodiments, the sensor control circuit 2612 is configured to package the determined flow rate data over time into data packets and control the wireless transmission of the data packets through one or more of the transceivers 2614.

The wireless communication utilized can be BLUETOOTH, WIFI, cellular, spread spectrum modulation techniques, LoRa (Long Range) low-power wide-area network modulation standard, LoRaWAN, other such wireless communication protocols or a combination of two or more such wireless communication protocols to communicate with an irrigation controller 102, a portable user computing device 132 (e.g., a smartphone or tablet, which in some instances is running an irrigation application (APP)), other sensors, a local router and/or modem, and/or other such devices. The flow rate information is configured to be received and utilized by one or more irrigation controllers 102, one or more portable user computing device 132, one or more central irrigation controllers 130, and/or other system components. The irrigation controller transceiver, in some embodiments, establishes a wireless communication network to which the flow sensor system and/or flow sensor transceiver 2614 joins. In other implementations, the flow sensor transceiver 2614 implements the wireless network that the irrigation controller joins. Further, the wireless flow sensor system, in some embodiments, communicates via one or more wide area distributed communication networks (e.g., Internet), with an irrigation controller 102, a portable user computing device 132, a central irrigation controller 130, other servers and/or services, and/or other devices. In some embodiments, the flow sensor system includes a button and/or other activator that is configured to be activated by a user to initiate pairing of the flow sensor circuitry 2610 with one or more other devices (e.g., irrigation controller 102, portable user computing device 132, modem, etc.), and/or implement other functions (e.g., initiate a factory reset (long press), activate a test mode (e.g., sequence of multiple presses), etc.). In some embodiments, the flow sensor system includes a user interface (e.g., buttons and/or display), one or more LEDs (e.g., bi-color LEDs) that are activated to show one or more statuses of the flow sensor system (e.g., status of one or more connections wireless connections, wireless pairing status, one or more error conditions, active state, sleep state, etc.) and/or other such inputs and information outputs. In some embodiments, the flow sensor system additionally includes a hardwire connector (e.g., two-wire, USB, USB-C, ethernet, etc.) enabling wired coupling with the irrigation controller, other sensor and/or other components.

The flow sensor circuitry further includes one or more electrical power sources 2618 that provides power to at least the sensor control circuit 2612 and wireless transceiver 2614. In some embodiments, the power source 2618 further supplies electrical power to the magnetic sensor system 600/601. Accordingly, in some implementations, flow sensor system is self-powered and can operate independent of the irrigation controller 102. The flow sensor circuitry 2610 optionally further includes one or more voltage regulators 2620 and/or voltage supply circuit that regulates the voltage to provide a more consistent and/or constant voltage to the magnetic sensor system.

The sensor control circuit 2612, in some implementations, further controls the supply of power and/or turns on and off the magnetic sensor system and/or other components of the flow sensor system. The control of power can include transitioning the flow sensor system between one or more states of operation that utilize different amounts of power. For example, in some instances, the flow sensor control circuit triggers a sleep state to prevent power to be supplied to the magnetic sensor system 600/601 and/or other components of the flow sensor system. The sleep state may include increasing a duration between when the transceiver attempts to receive communications and/or communicates information. Additionally or alternatively, the sensor control circuit can induce a shut-down and/or winter state that prevents power to substantially all components of the system during an extended period of time (e.g., weeks, or months). In some instances, the flow sensor control circuit 2612 may periodically activate the transceiver during the shut-down period and reactivate the flow sensor circuitry in response to an activation signal from the irrigation controller or other device authorized to reactivate the flow sensor system.

The power source 2618, in some embodiments, includes one or more rechargeable devices, such as but not limited to one or more rechargeable batteries, one or more capacitors and/or capacitive systems, other such rechargeable power sources or a combination of two or more of such rechargeable power sources. Further, some embodiments include one or more recharge systems 2622 and/or couples with one or more recharge systems 2622 (e.g., solar panels, wind turbine, fluid turbine, other such sources, or a combination of two or more sources). Some embodiments further utilize pulses from the magnetic sensor system 600/601 to capture charge the rechargeable power source, such as through one or more capacitors. Additionally or alternatively, a generator may be cooperated with the magnetic sensor system and/or positioned proximate the rotational path of the one or more magnetic elements to generate power from the rotation of the paddle wheel device 308. Some embodiments include other power sources, such as removable, replaceable and/or disposable batteries (e.g., 9-V battery, D battery, AA battery, and/or other such commercially available batteries). The disposable batteries, in some applications, operate as backup power sources that are utilized only when a stored charge in the rechargeable power source is below a threshold power level and one or more actions are to be implemented.

Although not illustrated in FIG. 26, the flow sensor circuitry 2610 is cooperated with a flow sensor system that has a structure similar to the flow sensor system of at least FIGS. 2-3B and includes a housing formed as part of or is secured with a fluid channel that comprises a first port 304 (e.g., an inlet or upstream port) and an second port 306 (e.g., outlet or downstream port). Typically, the flow sensor circuitry is secured within a water-tight sealed portion of the housing outside of the fluid channel and proximate to a pathway of the magnetic elements. The fluid channel is configured to transport fluid between the inlet port and the outlet port. The inlet port and the outlet port are configured to couple with a respective upstream conduit and downstream conduit of a fluid path of an irrigation system 100 to transport water to irrigation distribution devices 108 that are configured to distribute water over a geographic area at an irrigation site. The fluid sensor system further includes a paddle wheel device 308 that comprises a set of blades 310 that are configured to rotate about an axis due to a fluid flowing through the fluid channel. One or more of the blades of the set of the blades comprises a respective magnetic element 314. Further, as described above, the paddle wheel device is positioned relative to the fluid channel such that at least a portion of each of the blades of the set of blades sequentially extends into the fluid channel as the blades rotate about the axis to be contacted by the fluid flowing through the fluid sensor system and force the rotation of the paddle wheel device.

Some embodiments provides systems and methods of obtaining a rate of fluid flow through an irrigation conduit and/or irrigation system, comprising: detecting, by a magnetic sensor positioned within a sealed portion of a housing of an irrigation flow sensor system and proximate blades of a paddle wheel device of the irrigation flow sensor system while not being exposed to a fluid passing through a fluid channel secured with the housing and into which at least a portion of each of the blades of the set of blades of the paddle wheel device sequentially extend as the blades rotate about an axis in response to the irrigation fluid flowing through the fluid channel of the irrigation flow sensor system, a first magnetic element cooperated with a first blade of the blades of the paddle wheel device as the first magnetic element moves along a rotational pathway as the first magnetic element rotates about the axis; and controlling a switch coupled with the magnetic sensor and a current loop to control current within the current loop comprising: receiving a sensor output from the magnetic sensor at the switch; and causing the switch to transition between a non-active state and an active state to temporarily change the current to a first current flow value through the current loop in response to a change to a first state of the sensor output from the magnetic sensor and causing the current in the current loop to vary between a second current flow value when the switch is not active in the non-active state and the first current flow value when the switch is in the active state based on the first state of the sensor output from the magnetic sensor, wherein a frequency of the transitions between the second current flow value and the first current flow value correspond to a flow rate of the fluid flowing through the flow conduit.

In some embodiments, the method of sensing the fluid flow further comprises forcing, through a timeout circuit electrically coupled with the switch, the switch from the active state to the non-active state overriding the first state of the sensor output and causing a change from the first current flow value to the second current flow value within the current loop when the first magnetic element is within a threshold distance of the magnetic sensor for more than a threshold period of time. Some embodiments output, through a communications interface coupled with the current loop and configured to enable an external irrigation controller to communicatively couple with the flow sensor system, flow rate data corresponding to the frequency of the transitions between the second current flow value and the first current flow value within the current loop that corresponds to the flow rate of the fluid flowing through the flow conduit. The method, in some embodiments, further comprises: protecting the switch from an input voltage at the communications interface of the flow sensor system that is greater than a first voltage threshold; and protecting the switch from an input current received at the communications interface that is greater than a first current threshold. Some implementations generate, through a voltage supply circuit electrically coupled with the magnetic sensor and the communications interface, a substantially constant voltage; and supply the substantially constant voltage to the magnetic sensor to power the magnetic sensor. The controlling the switch can include controlling the switch to transition between the non-active state and active state comprises activating a first transistor coupled with an output of the magnetic sensor in response to each change to the first state of the sensor output based on each of the detections by the magnetic sensor that the first magnetic element passes the magnetic sensor and causing the transition to the active state and the transition to the first current flow value within the current loop.

In some embodiments, the controlling the switch to transition between the non-active state and active state comprises activating a first transistor coupled with an output of the magnetic sensor in response to the triggering of a change to the first state of the sensor output based on each of the detections by the magnetic sensor that the first magnetic element passes the magnetic sensor and causing the transition to the active state and the transition to the first current flow value within the current loop; and the overriding the first current flow value can comprise activating a second transistor coupled with a gate of the first transistor, and overriding the activation of the first transistor by the magnetic sensor when the sensor output from the magnetic sensor is active at the first state, corresponding to the first magnetic element being within the threshold distance of the magnetic sensor, for more than the threshold period of time. An activation of the second transistor can comprise activating the second transistor based on a resistance-capacitance (RC) time constant of an RC circuit coupled with the second transistor, wherein the RC time constant of the RC circuit defines the threshold period of time. Some embodiments expose the paddle wheel device when at least the sealed portion of the housing is removed from the fluid channel; and enable the removal of the paddle wheel device when the sealed portion of the housing is removed from the fluid channel. In some embodiments, the magnetic sensor comprises a Hall effect sensor configured to change the sensor output to a second state in response to a second magnetic element, secured with a second blade of the set of the blades of the paddle wheel device, passing the Hall effect sensor and being detected by the Hall effect sensor following the activation of the sensor output to the first state in response to the first magnetic element being detected by the Hall effect sensor. A flow direction output is generated, in some embodiments. The flow direction output indicates a direction of flow of fluid through the flow sensor system.

Some embodiments provide irrigation systems, comprising: an irrigation controller comprising a plurality of drive circuits and a control circuit coupled with the drive circuits to control the activation of the drive circuits; a plurality of valves communicatively coupled with one of the plurality of drive circuits and controlled by the activation of the corresponding one of the drive circuits, wherein each of the plurality of valves is cooperated with one of multiple different fluid conduits through which water passes; a plurality of irrigation distribution devices fluidly cooperated with one of the plurality of fluid conduits and configured to distribute water over a corresponding portion of an area to be irrigated; and an irrigation flow sensor system comprising: a housing forming at least a portion of a fluid channel configured to cooperate between two of the plurality of fluid conduits and to transport fluid between a first port and a second port; a paddle wheel device comprising a set of blades configured to rotate about an axis due to the water flowing through the fluid channel, wherein at least a first blade of the set of the blades comprises a magnetic element, and wherein the paddle wheel device is positioned relative to the fluid channel such that at least a portion of each of the blades sequentially extends into the fluid channel as the blades of the set of blades rotate about the axis; a magnetic sensor within a sealed portion of the housing outside of the fluid channel and proximate to a pathway of the magnetic element as the magnetic element and blades rotate about the axis, wherein the magnetic sensor is configured to provide a sensor output at a first state every time the magnetic element passes the magnetic sensor; and a switch coupled to the magnetic sensor, wherein the switch is coupled to a current loop, wherein the switch in an active state is configured to temporarily change the current to a first current flow value in the current loop in response to the sensor output from the magnetic sensor being in the first state such that the current loop varies between a second current flow value when the switch is not active in a non-active state and the first current flow value when the switch is in the active state based on the first state of the sensor output from the magnetic sensor, wherein a frequency of the transitions between the second current flow value and the first current flow value correspond to a flow rate of the water; wherein the control circuit is configured to determine the flow rate of the water through the fluid channel as a function of the frequency of the transitions between the second current flow value and the first current flow value, and adjust an irrigation schedule based on of the flow rate of the water. The irrigation system, in some implementations, further comprising: a wireless interface module external to and separate from the housing, wherein the interface module couples with and forms part of the current loop and comprises a module control circuit electronically coupled with the current loop and configured to determine the flow rate of the water through the fluid channel as a function of the frequency of the transitions between the second current flow value and the first current flow value; and wherein the interface module further comprises a wireless transceiver communicatively coupled with the module control circuit, and the module control circuit is configured to cause the wireless transceiver to wirelessly communicate flow rate data specifying the flow rate.

In some embodiments, the irrigation controller comprises a second wireless transceiver communicatively coupled with the control circuit, wherein the control circuit is configured to receive, through the second wireless transceiver, the flow rate data wirelessly transmitted from the interface module. The interface module, in some implementations, further comprises a power source configured to supply power to the irrigation flow sensor system and enable the current flow in the current loop.

Irrigation flow sensor systems are provided in some embodiments that comprise: a housing secured with a fluid channel, wherein the fluid channel comprises a first port and a second port and is configured to transport fluid between the first port and the second port, wherein the first port is configured to couple with a first conduit of a fluid path, and the second port is configured to couple with a second conduit of the fluid path of an irrigation system to transport water to irrigation distribution devices configured to distribute water over a geographic area; a paddle wheel device comprising a set of blades configured to rotate about an axis due to a fluid flowing through the fluid channel, wherein at least a first blade of the set of the blades comprises a first magnetic element, and wherein the paddle wheel device is positioned relative to the fluid channel such that at least a portion of each of the blades of the set of blades sequentially extends into the fluid channel as the blades rotate about the axis; a magnetic sensor system within a sealed portion of the housing outside of the fluid channel and positioned proximate to a pathway of the first magnetic element as the first magnetic element rotates about the axis, wherein the magnetic sensor system is configured to provide a sensor output comprising changes in state corresponding to a rate of rotation of the first magnetic element; a sensor control circuit coupled with the magnetic sensor system, wherein the sensor control circuit is configured to detect the changes in state of the sensor output, determine a frequency of the changes in state of the magnetic sensor output, determine a rate of flow of the fluid as a function of the changes in state of the sensor output; and a wireless transceiver communicatively coupled with the sensor control circuit, wherein the sensor control circuit controls the wireless transceiver to wirelessly communicate flow rate data.

Exemplary processes and/or methods are representatively described above based on one or more flow diagrams, timing diagrams and/or diagrams representing sequences of actions and/or communications that include one or more steps, subprocesses, communications and/or other such representative divisions of the processes, methods, etc. These steps, subprocesses or other such actions can be performed in different sequences without departing from the spirit of the processes, methods and apparatuses. Additionally or alternatively, one or more steps, subprocesses, actions, etc. can be added, removed or combined in some implementations.

While the invention herein disclosed has been described by means of specific embodiments, examples and applications thereof, numerous modifications and variations could be made thereto by those skilled in the art without departing from the scope of the invention set forth in the claims.

What is claimed is:

1. An irrigation flow sensor system, comprising:
    a housing secured with a fluid channel, wherein the fluid channel comprises a first port and a second port and is configured to transport fluid between the first port and the second port, wherein the first port is configured to couple with a first conduit of a fluid path, and the second port is configured to couple with a second conduit of the fluid path of an irrigation system to transport water to irrigation distribution devices configured to distribute water over a geographic area;
    a paddle wheel device comprising a set of blades configured to rotate about an axis due to a fluid flowing through the fluid channel, wherein at least a first blade of the set of the blades comprises a first magnetic element, and wherein the paddle wheel device is positioned relative to the fluid channel such that at least a portion of each of the blades of the set of blades sequentially extends into the fluid channel as the blades rotate about the axis;
    a magnetic sensor within a sealed portion of the housing outside of the fluid channel and proximate to a pathway of the first magnetic element as the first magnetic element rotates about the axis, wherein the magnetic sensor is configured to provide a sensor output at a first state every time the first magnetic element passes the magnetic sensor;
    a switch coupled to the magnetic sensor, wherein the switch is coupled to a current loop, wherein the switch in an active state is configured to temporarily change a current to a first current flow value in the current loop in response to the sensor output from the magnetic sensor being in the first state such that the current loop varies between a second current flow value when the switch is not active in a non-active state and the first current flow value when the switch is in the active state based on the first state of the sensor output from the magnetic sensor, wherein a frequency of the transitions between the second current flow value and the first current flow value correspond to a flow rate of the fluid.

2. The flow sensor system of claim 1, further comprising:
    a timeout circuit electrically coupled with the switch and configured to force the switch from the active state to the non-active state overriding the first state of the sensor output and cause a change from the first current flow value to the second current flow value within the current loop when the first magnetic element is within a threshold distance of the magnetic sensor for more than a threshold period of time.

3. The flow sensor system of claim 2, further comprising:
    a communications interface coupled with the current loop and configured to enable an external irrigation controller to communicatively couple with the flow sensor system and receive flow rate data corresponding to the frequency of the transitions between the second current flow value and the first current flow value within the current loop that corresponds to the flow rate of the fluid.

4. The flow sensor system of claim 3, wherein the current loop comprises a voltage protection circuit configured to protect the switch from an input voltage received at the communications interface that is greater than a first voltage threshold; and a current protection circuit configured to protect the switch from an input current received at the communications interface that is greater than a first current threshold.

5. The flow sensor system of claim 3, further comprising:
    a voltage supply circuit electrically coupled with the magnetic sensor and the communications interface and configured to generate a substantially constant voltage that is supplied to the magnetic sensor to power the magnetic sensor.

6. The flow sensor system of claim 2, wherein:
    the switch comprises a first transistor coupled with an output of the magnetic sensor, wherein the first transistor is activated to cause the transition to the active state and to cause the transition to the first current flow value within the current loop in response to a change to the first state of the sensor output from the magnetic sensor triggered in response to each detection by the magnetic sensor that the first magnetic element being detected by the magnetic sensor; and
    the timeout circuit comprises a second transistor coupled with a gate of the first transistor and configured to override the activation of the first transistor by the magnetic sensor when the sensor output from the magnetic sensor is active at the first state, corresponding to the first magnetic element being within the threshold distance of the magnetic sensor, for more than the threshold period of time.

7. The flow sensor system of claim 6, wherein the timeout circuit comprises a resistance-capacitance (RC) circuit comprising at least a timeout resistor coupled with a timeout capacitor, wherein the RC circuit couples with the second transistor and an RC time constant of the RC circuit defines the threshold period of time.

8. The flow sensor system of claim 1, wherein:
    the switch comprises a first transistor coupled with an output of the magnetic sensor, wherein the first transistor is activated to cause the transition to the active state and to cause the transition to the first current flow value within the current loop in response to each change to the first state of the sensor output from the magnetic sensor triggered in response to each detection by the magnetic sensor that the first magnetic element passes the magnetic sensor.

9. The flow sensor system of claim 1, wherein at least the sealed portion of the housing is removable from the fluid channel, wherein when the sealed portion of the housing is removed from the fluid channel the paddle wheel device is exposed and enabling removal of the paddle wheel device.

10. The flow sensor system of claim 1, wherein the magnetic sensor comprises a Hall effect sensor; and
    the paddle wheel device comprising second magnetic element secured with a second blade of the set of the blades of the paddle wheel device;

wherein the Hall effect sensor changes the sensor output to a second state in response to the second magnetic element passing the Hall effect sensor following the activation of the sensor output to the first state in response to the first magnetic element being detected by the Hall effect sensor.

11. The flow sensor system of claim 1, further comprising:
a conduit portion secured with the housing, wherein the fluid flows through the conduit portion;
an upstream conduit coupling and a downstream conduit coupling, each configured to couple with respective irrigation conduits;
an upstream union locking ring configured to secure the upstream conduit coupling with the conduit portion;
a downstream union locking ring configured secure the downstream conduit coupling with the conduit portion;
a filter positioned at least partially within the conduit portion; and
an O-ring secured within an O-ring cavity formed in the conduit portion and between the conduit portion and the conduit coupling, wherein the filter is secured between the conduit portion and the upstream conduit coupling with a filter head of the filter being positioned with a portion of a lateral surface of the filter head biasing the O-ring into the O-ring cavity establishing a fluid tight seal.

12. The flow sensor system of claim 1, wherein the paddle wheel device comprises a central bore and a separate axle that extends through the central bore and with a first portion of the axle and a second portion of the axle exposed on opposite sides of the paddle wheel device.

13. The flow sensor system of claim 12, wherein the axle is formed from a ceramic.

14. The flow sensor system of claim 12, further comprising:
a pair of recesses each configured to receive one of the first exposed portion and the second exposed portion of the axle, wherein each of the pair of recesses has at least one of a diameter that is greater than a diameter of the axle and a depth that is greater than the diameter of the axle.

15. The flow sensor system of claim 1, wherein each of the blades of the set of blades comprises an enhanced region positioned at a distal end of the blade away from an axis of the paddle wheel device, wherein the enhanced region comprises an increased thickness relative to a thickness of the blade between the enhanced region and a central hub region of the paddle wheel device.

16. The flow sensor system of claim 15, wherein a first magnetic element is positioned within the enhanced region of the first blade.

17. The flow sensor system of claim 1, further comprising:
a conduit portion secured with the housing, wherein the fluid flows through the conduit portion;
wherein the paddle wheel device comprises a pair of protruding posts each protruding from opposite sides of the central hub region and are aligned with a rotational axis of the paddle wheel device and forming a fixed axle upon which the paddle wheel device rotates; and
bushings each cooperated with one post of the pair of posts, wherein the bushings are configured to fit within respective recesses formed in the conduit portion.

18. The flow sensor system of claim 17, wherein one or both of the paddle wheel device and the bushings are formed from a ceramic.

19. The flow sensor system of claim 1, further comprising:
a wireless transceiver configured to wireless communicate flow rate data corresponding to the flow rate of fluid.

20. The flow sensor system of claim 1, wherein the housing comprises
a lid portion that secures with the housing encloses an interior cavity of the housing;
wherein the lid portion comprises a wire positioning protrusion that extends a distance from an inner lid surface of the lid portion and further comprises a wire retaining recess formed in the wire positioning protrusion separated by a length of the wire positioning protrusion from the inner lid surface of the lid portion.

21. The flow sensor system of claim 20, wherein the housing further comprises:
a wire routing channel comprising one or more routing walls formed in the housing and positioned along and separated from one or more lateral walls of the housing, wherein the wire routing channel is configured to receive and route a wire coupled with a sensor circuit, comprising the magnetic sensor, switch and current loop, through the housing to cooperate with the wire positioning protrusion and extend out through the lid portion.

22. The flow sensor system of claim 1, further comprising a magnetic sensor system comprising the magnetic sensor, and further configured to generate a flow direction output indicating a direction of flow of the fluid flowing through the fluid channel.

23. The flow sensor system of claim 22, wherein the magnetic sensors system comprises a dual channel Hall effect sensor.

24. The flow sensor system of claim 1, wherein the fluid channel comprises a first acceleration ramp within an interior of the fluid channel and positioned proximate the paddle wheel device, wherein the first acceleration ramp reduces an interior cross-sectional area of the fluid channel of at least a volume within the fluid channel through which the blades, of the set of blades of the paddle wheel device, pass while the paddle wheel device rotates.

25. The flow sensors system of claim 1, wherein the fluid channel comprises multiple acceleration ramps within an interior of the fluid channel and positioned proximate the paddle wheel device, wherein each of the multiple acceleration ramps reduces an interior cross-sectional area of the fluid channel proximate the paddle wheel device, and wherein each of the multiple acceleration ramps comprises a central peak area, an upstream ramp portion that tapers away from the central peak area decreasing in thickness, and a downstream ramp portion that tapers away from the central peak area decreasing in thickness, and wherein a length of the upstream ramp portion is substantially equal to a length of the downstream ramp portion.

26. The flow sensors system of claim 1, wherein the fluid channel comprises multiple acceleration ramps within an interior of the fluid channel and positioned proximate the paddle wheel device, wherein each of the multiple acceleration ramps reduces an interior cross-sectional area of the fluid channel proximate the paddle wheel device, and wherein each of the multiple acceleration ramps comprises a first acceleration ramp formed in a wall of the fluid channel opposite the paddle wheel device, a second acceleration ramp formed in the wall of the fluid channel about 90 degrees orientation from the first acceleration ramp, and a third acceleration ramp formed in the wall of the fluid channel about 90 degrees orientation from the first acceleration ramp and about 180 degrees orientation relative to the second acceleration ramp.

27. The flow sensor system of claim 1, further comprising: a communications interface coupled with the current loop and configured to enable an external wireless interface module to communicatively couple with the flow sensor system, and receive power through the communications interface from the external interface module.

28. The flow sensor system of claim 27, wherein communications interface are configured to enable the transitions between the second current flow value and the first current flow value correspond to the flow rate of the fluid to be detectable by the external interface module.

29. A method of obtaining a rate of fluid flow through an irrigation conduit, comprising:

detecting, by a magnetic sensor positioned within a sealed portion of a housing of an irrigation flow sensor system and proximate blades of a paddle wheel device of the irrigation flow sensor system while not being exposed to a fluid passing through a fluid channel secured with the housing and into which at least a portion of each of the blades of the set of blades of the paddle wheel device sequentially extend as the blades rotate about an axis in response to the irrigation fluid flowing through the fluid channel of the irrigation flow sensor system, a first magnetic element cooperated with a first blade of the blades of the paddle wheel device as the first magnetic element moves along a rotational pathway as the first magnetic element rotates about the axis; and controlling a switch coupled with the magnetic sensor and a current loop to control current within the current loop comprising:

receiving a sensor output from the magnetic sensor at the switch; and causing the switch to transition between a non-active state and an active state to temporarily change the current to a first current flow value through the current loop in response to a change to a first state of the sensor output from the magnetic sensor and causing the current in the current loop to vary between a second current flow value when the switch is not active in the non-active state and the first current flow value when the switch is in the active state based on the first state of the sensor output from the magnetic sensor, wherein a frequency of the transitions between the second current flow value and the first current flow value correspond to a flow rate of the fluid flowing through the flow conduit.

* * * * *